US007429634B2

(12) United States Patent
Brant et al.

(10) Patent No.: US 7,429,634 B2
(45) **Date of Patent: *Sep. 30, 2008**

(54) POLYMER PRODUCTION AT SUPERCRITICAL CONDITIONS

(75) Inventors: Patrick Brant, Seabrook, TX (US); Gerhard Franz Luft, Muhltal (DE); John Richard Shutt, Tervuren (BE); Lawrence Carl Smith, Houston, TX (US); Douglas J. McLain, Zachary, LA (US); Terry J. Burkhardt, Huntley, IL (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/433,889

(22) Filed: May 12, 2006

(65) Prior Publication Data

US 2006/0211832 A1 Sep. 21, 2006

Related U.S. Application Data

(63) Continuation of application No. 10/667,585, filed on Sep. 22, 2003, now Pat. No. 7,354,979.

(60) Provisional application No. 60/412,541, filed on Sep. 20, 2002.

(51) Int. Cl.

| | |
|---|---|
| ***C08F 2/02*** | (2006.01) |
| ***C08F 2/04*** | (2006.01) |
| ***C08F 2/06*** | (2006.01) |
| ***C08F 4/6192*** | (2006.01) |

(52) U.S. Cl. ......................... 526/64; 526/113; 526/114; 526/118; 526/119; 526/127; 526/134; 526/160; 526/161; 526/172; 526/351

(58) Field of Classification Search .................. 526/64, 526/113, 114, 118, 119, 127, 134, 160, 161, 526/172, 351

See application file for complete search history.

(56) References Cited

U.S. PATENT DOCUMENTS

| | | | | |
|---|---|---|---|---|
| 5,969,062 | A * | 10/1999 | Moll et al. | 526/127 |
| 6,124,231 | A | 9/2000 | Fritze et al. | |
| 6,255,410 | B1 * | 7/2001 | Shigekauzu et al. | 526/68 |
| 6,482,902 | B1 | 11/2002 | Bohnen et al. | |
| 6,492,473 | B1 * | 12/2002 | Canich et al. | 526/117 |
| 6,689,847 | B2 * | 2/2004 | Mawson et al. | 526/116 |
| 6,881,800 | B2 | 4/2005 | Friedersdorf | |
| 7,279,536 | B2 | 10/2007 | Brant et al. | |
| 7,319,125 | B2 | 1/2008 | Arjunan et al. | |
| 7,354,979 | B2 | 4/2008 | Brant et al. | |
| 2001/0044506 | A1 * | 11/2001 | Mehta et al. | 526/65 |
| 2004/0158015 | A1 * | 8/2004 | Senninger | 526/255 |
| 2006/0025545 | A1 | 2/2006 | Brant et al. | |
| 2007/0255018 | A1 | 11/2007 | Brant | |
| 2008/0090974 | A1 | 4/2008 | Brant et al. | |

FOREIGN PATENT DOCUMENTS

| | | |
|---|---|---|
| EP | 1 231 226 | 8/2002 |
| JP | 10-045834 | 2/1998 |

OTHER PUBLICATIONS

Bergemann et al., Journal of Molecular Catalysis A: Chemical 105 (1996) 87-91.*

Bergemann et al., Journal of Molecular Catalysis A: Chemical 102 (1995) 1-5.*

Gotz et al., MAO-Free Metallocene Based Catalysts in High Pressure Polymerization of Ethylene and 1-Hexene, Chem. Eng. Technol., 1998, vol. 21, No. 12, pp. 954-958.

U.S. Appl. No. 60/937,929, filed Jun. 29, 2007, entitled Fouling Prevention in Polymerization Reactors, Kiss et al.

U.S. Appl. No. 61/004,336, filed Nov. 27, 2007, entitled Method for Determining the Properties of Hydrocarbon Reservoirs from Geophysical Data, Deffenbaugh et al.

U.S. Appl. No. 11/854,936, filed Sep. 13, 2007, entitled Polymer Production At Supercritical Conditions, Friedersdorf et al.

U.S. Appl. No. 12/002,509, filed Dec. 17, 2007, entitled Process for Fluid Phase In-Line Blending of Polymers, Kiss et al.

U.S. Appl. No. 12/016,346, filed Jan. 18, 2008, entitled Production Of Propylene-Based Polymers, Canich et al.

U.S. Appl. No. 12/098,907, filed Apr. 7, 2008, entitled Super-Solution Homogenous Propylene Polymerization, Brant et al.

* cited by examiner

*Primary Examiner*—Roberto Rábago

(57) ABSTRACT

This invention relates to a process to polymerize olefins comprising contacting, in a polymerization system, olefins having three or more carbon atoms with a catalyst compound, activator, optionally comonomer, and optionally diluent or solvent, at a temperature above the cloud point temperature of the polymerization system and a pressure no lower than 10 MPa below the cloud point pressure of the polymerization system, where the polymerization system comprises any comonomer present, any diluent or solvent present, the polymer product, where the olefins having three or more carbon atoms are present at 40 weight % or more.

86 Claims, 11 Drawing Sheets

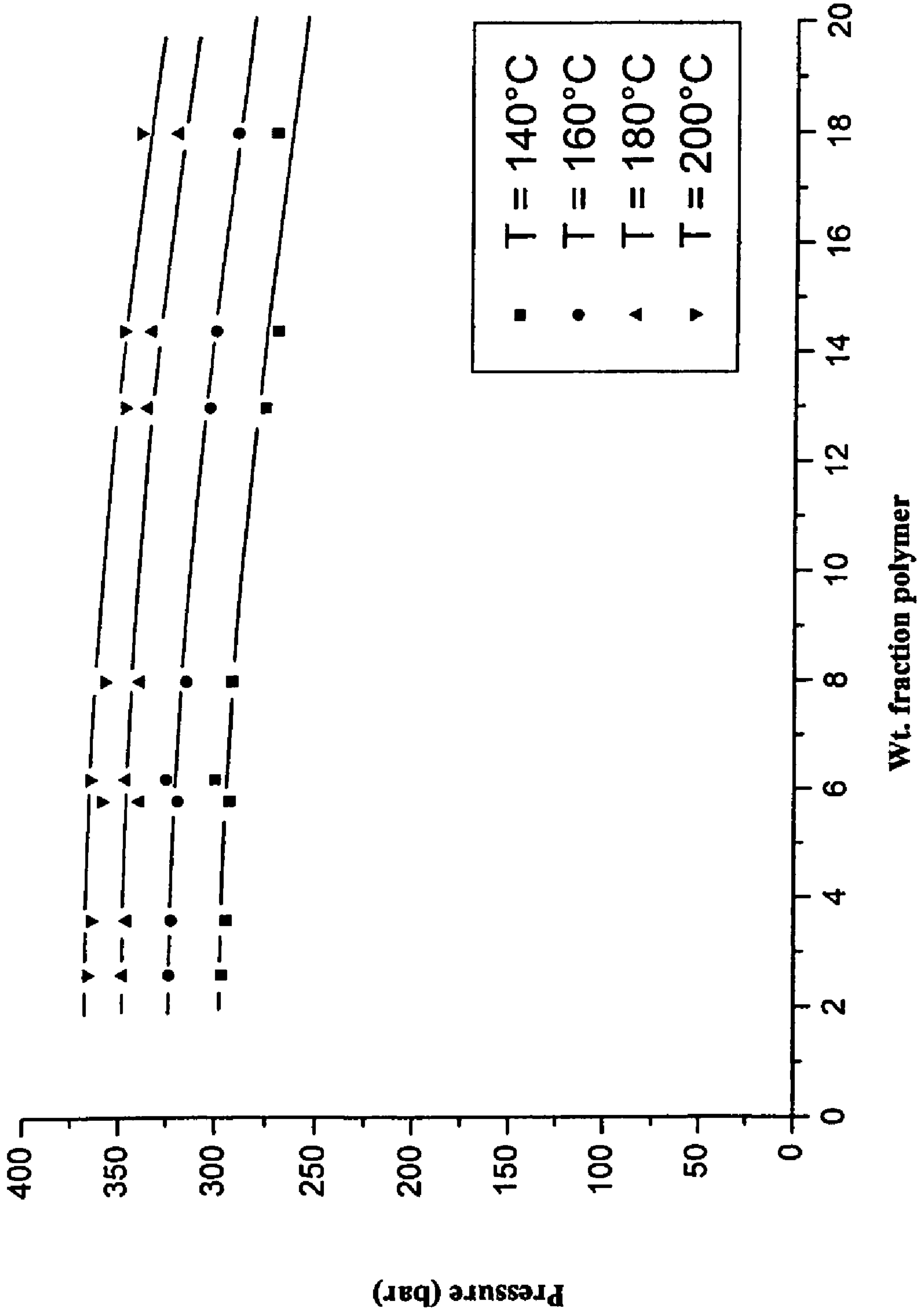
Fig. 2 Cloud point isotherms, Polymer Achieve 1635

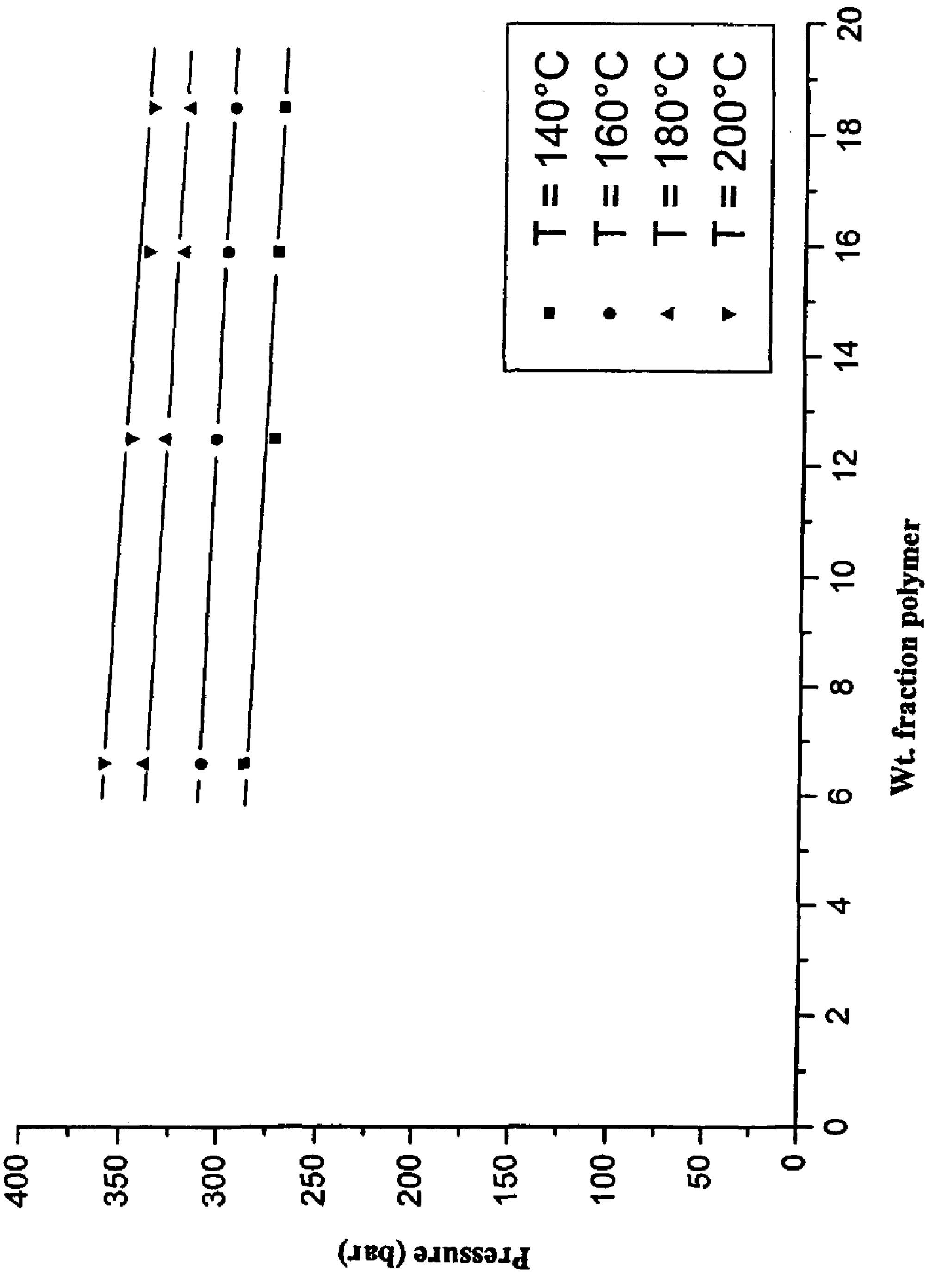
Fig. 3 Cloud point isotherms, Polymer PP 45379

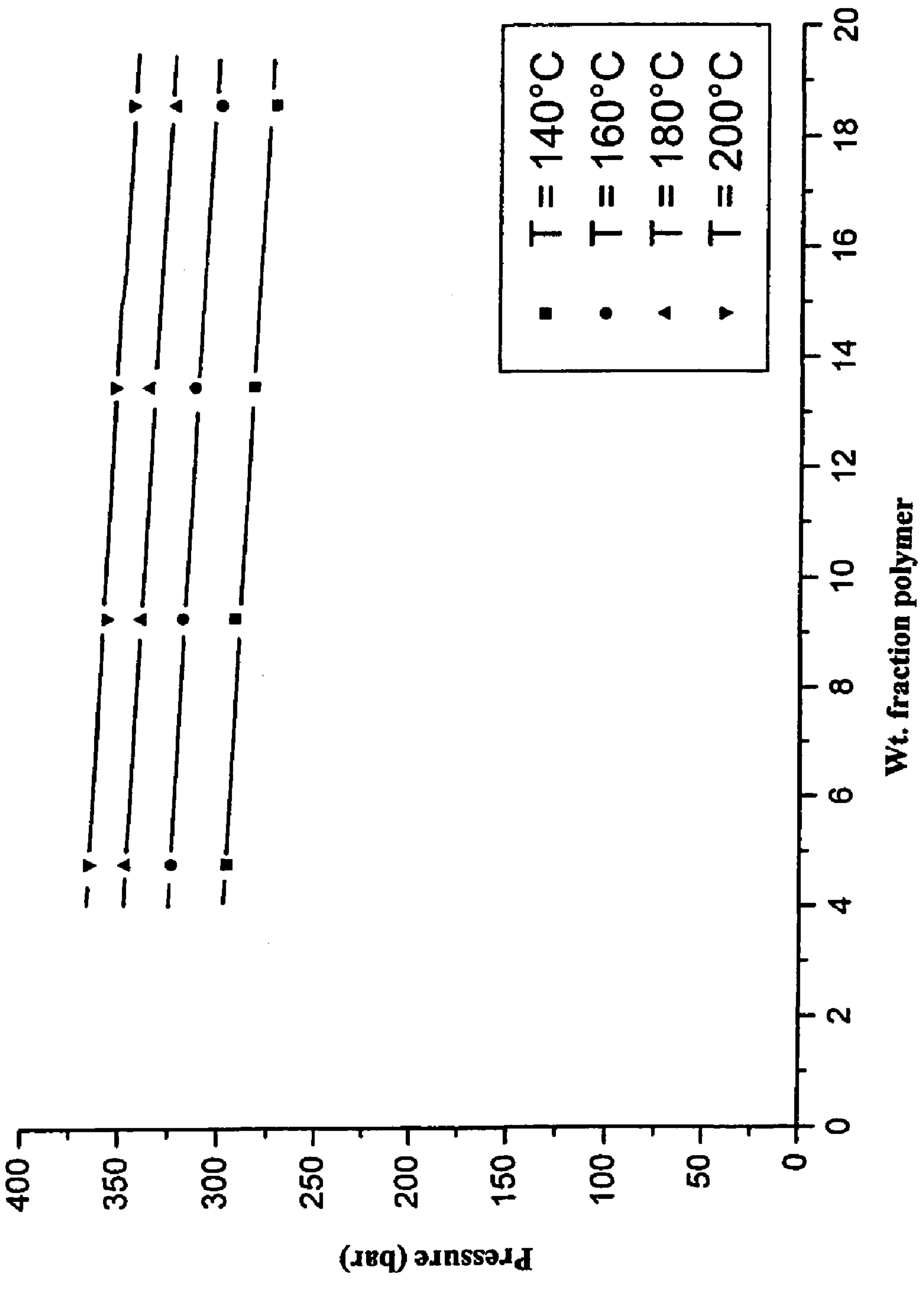
Fig. 4 Cloud point isotherms, Polymer PP 4062

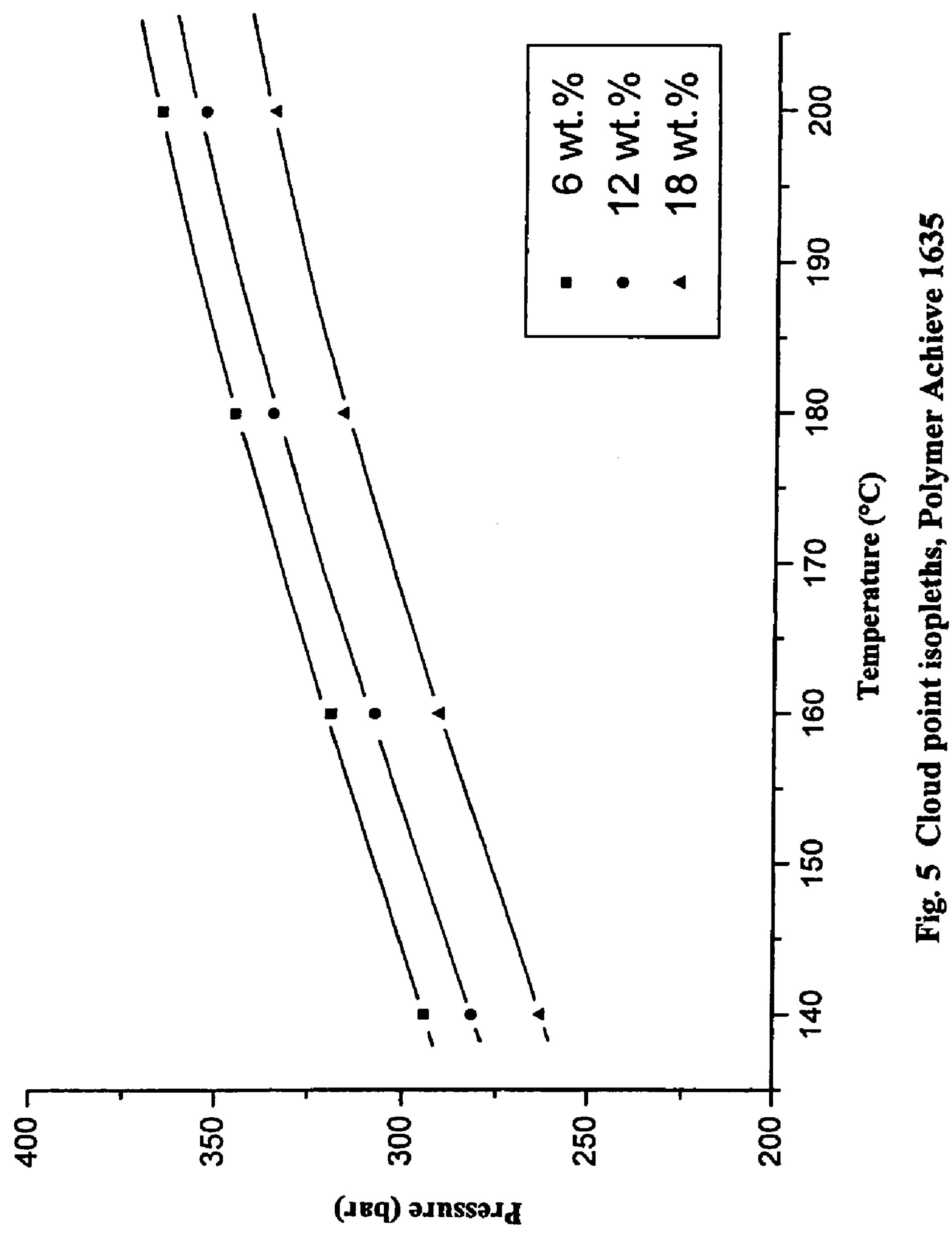
Fig. 5 Cloud point isopleths, Polymer Achieve 1635

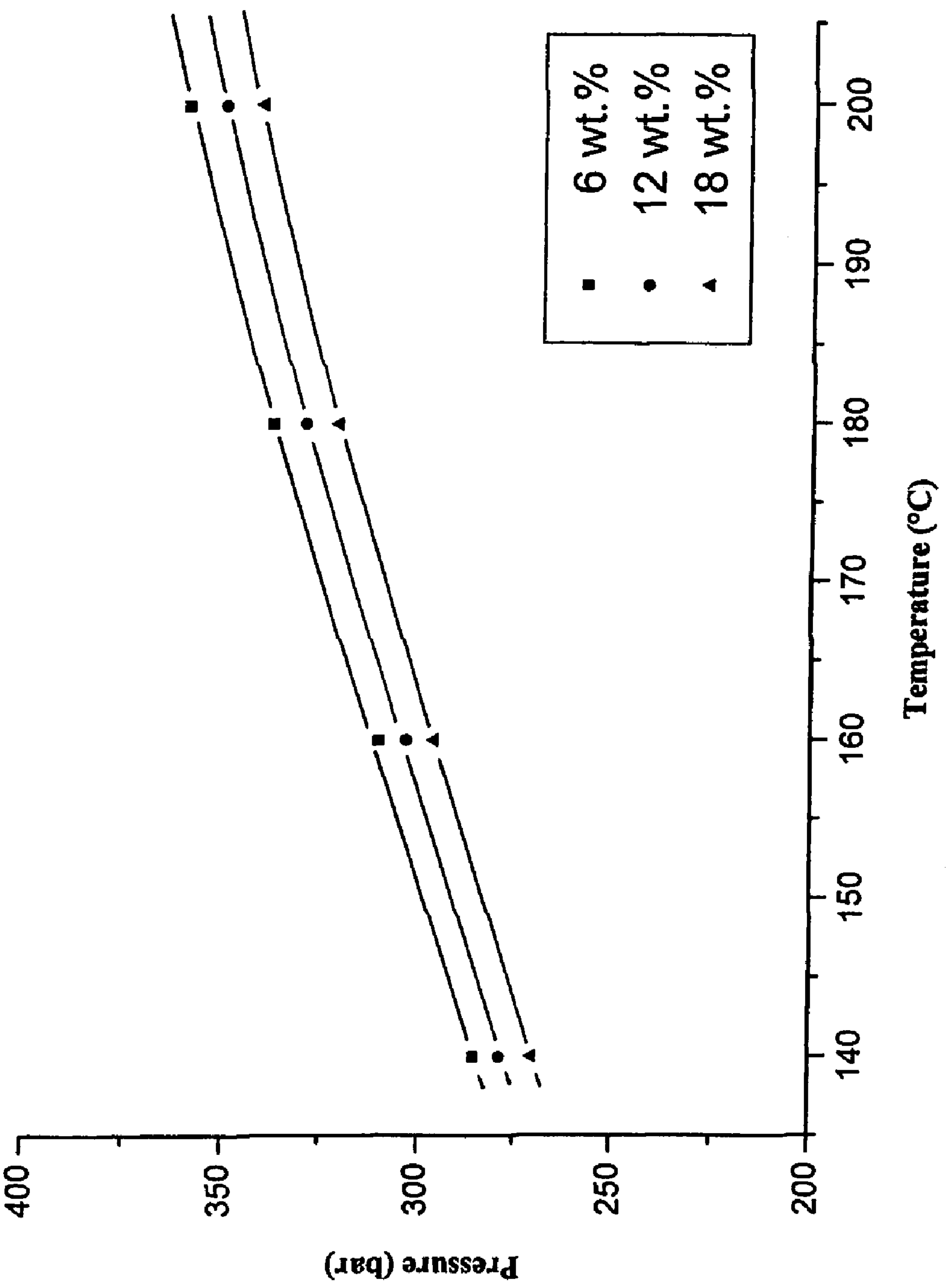
Fig. 6 Cloud point isopleths, Polymer PP 45379

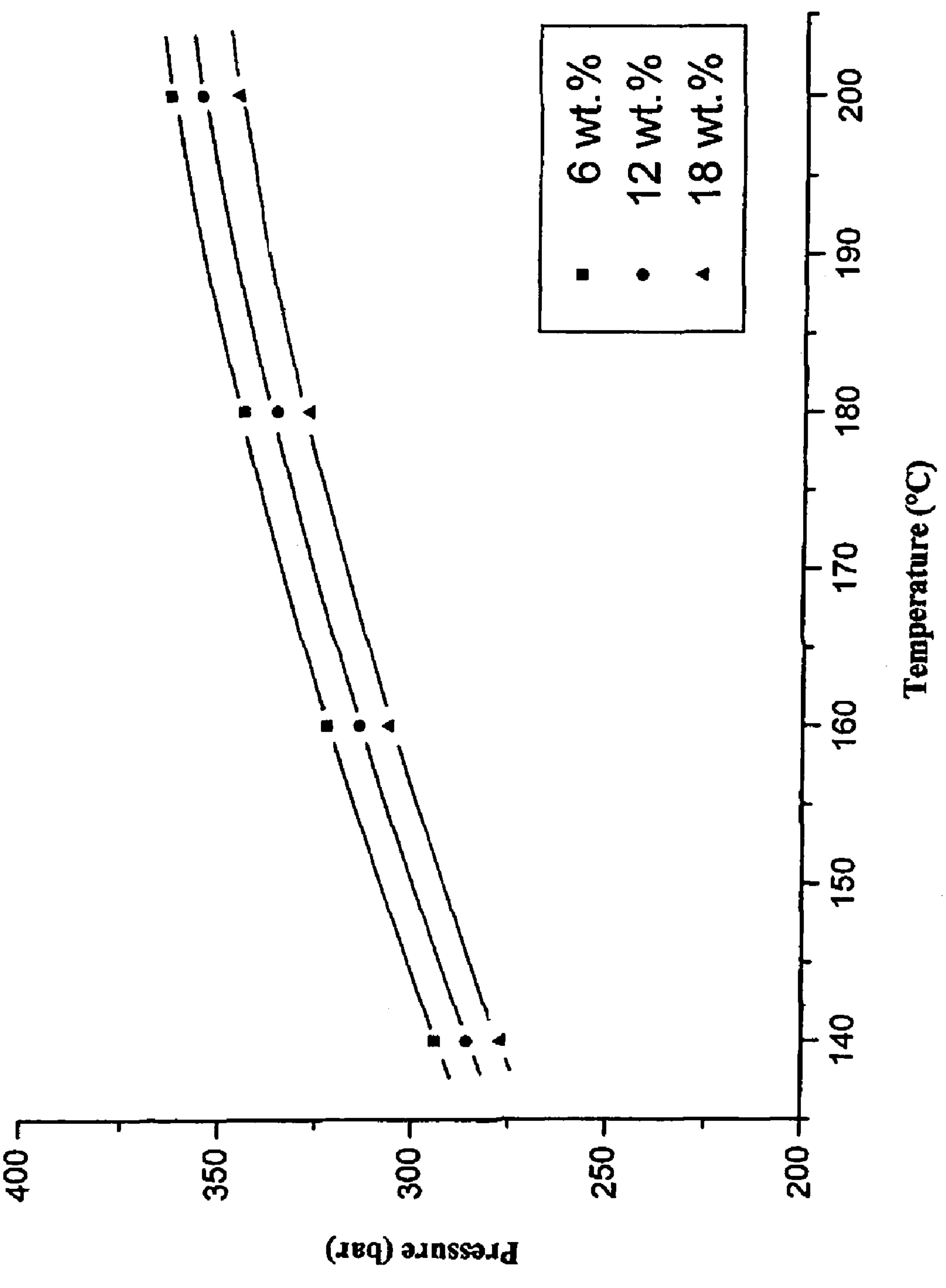
Fig. 7 Cloud point isopleths, Polymer PP 4062

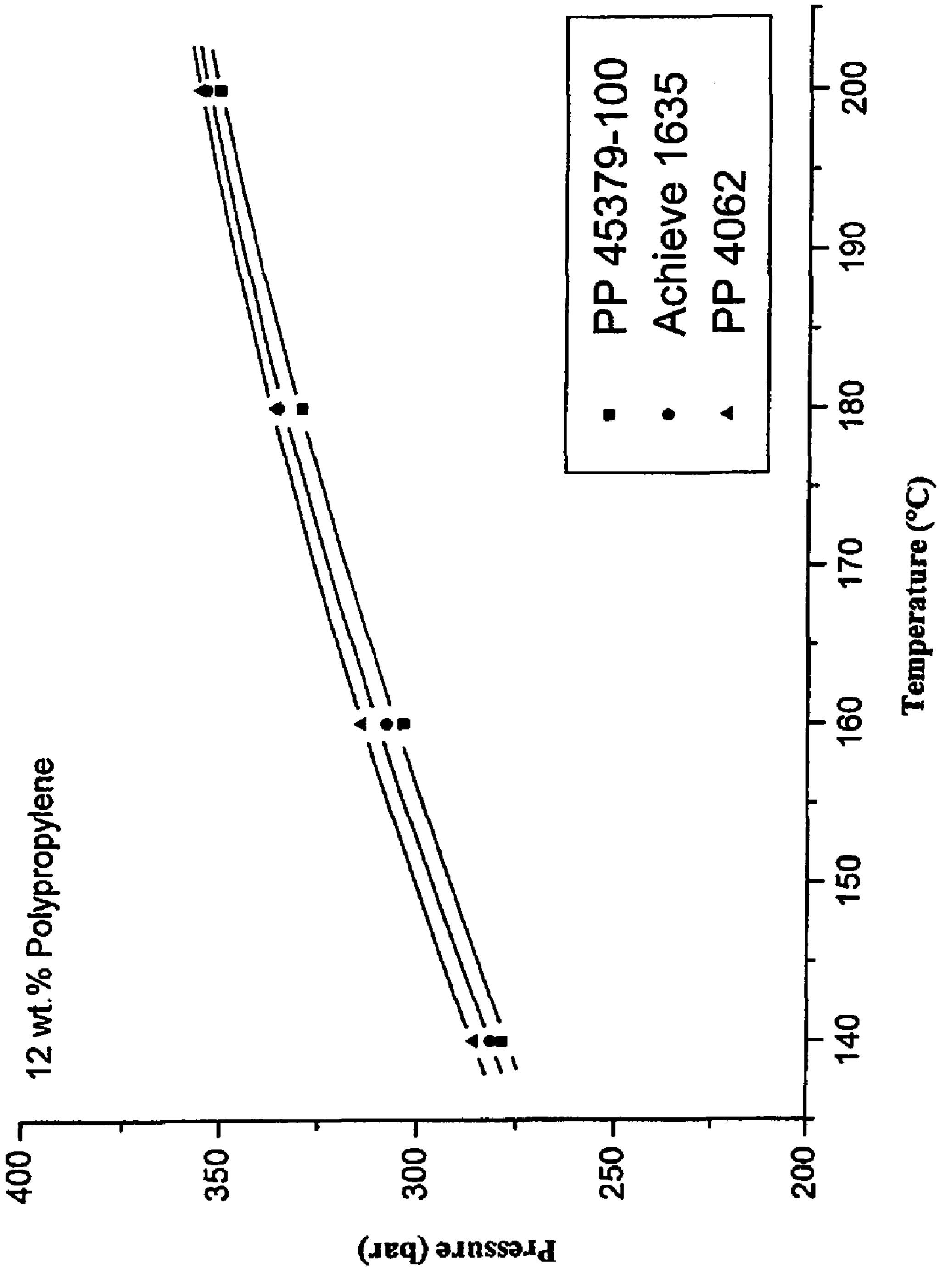
Fig. 8 Comparison of isopleths
Weight fraction of polymer: 12 wt%

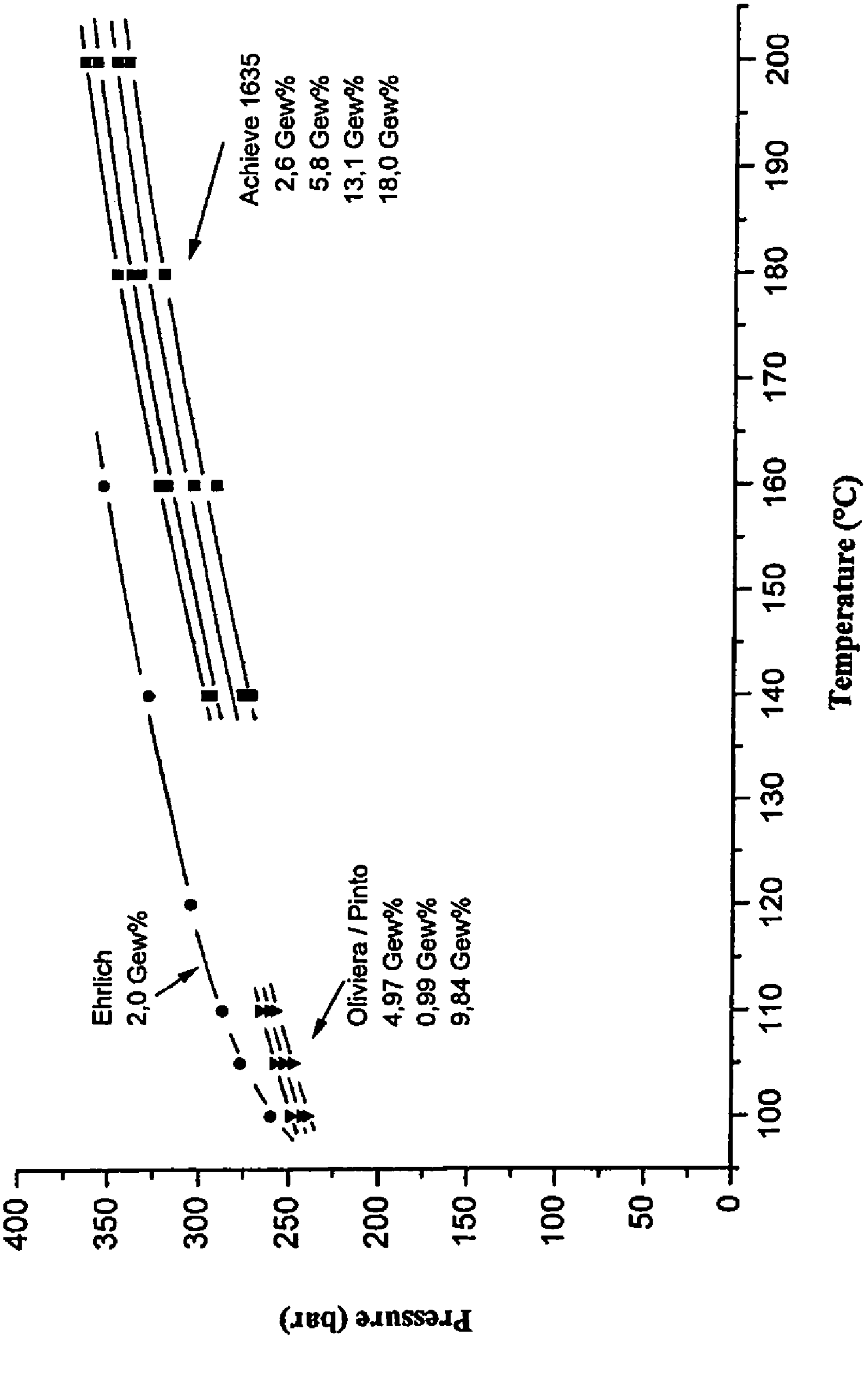
Fig. 9 Comparison with Literature Data (Achieve 1635)

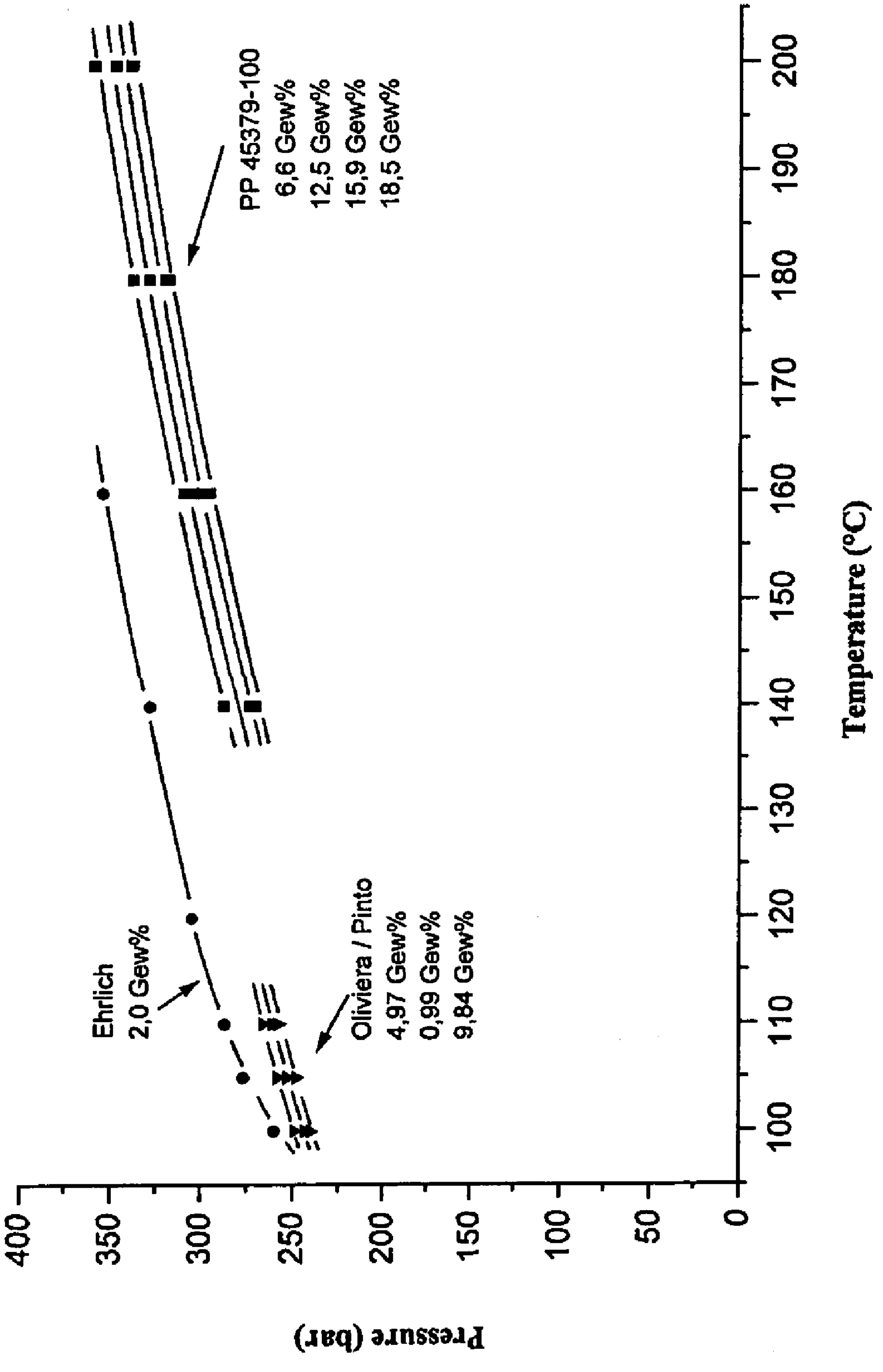
Fig. 10 Comparison with Literature Data (PP 45379)

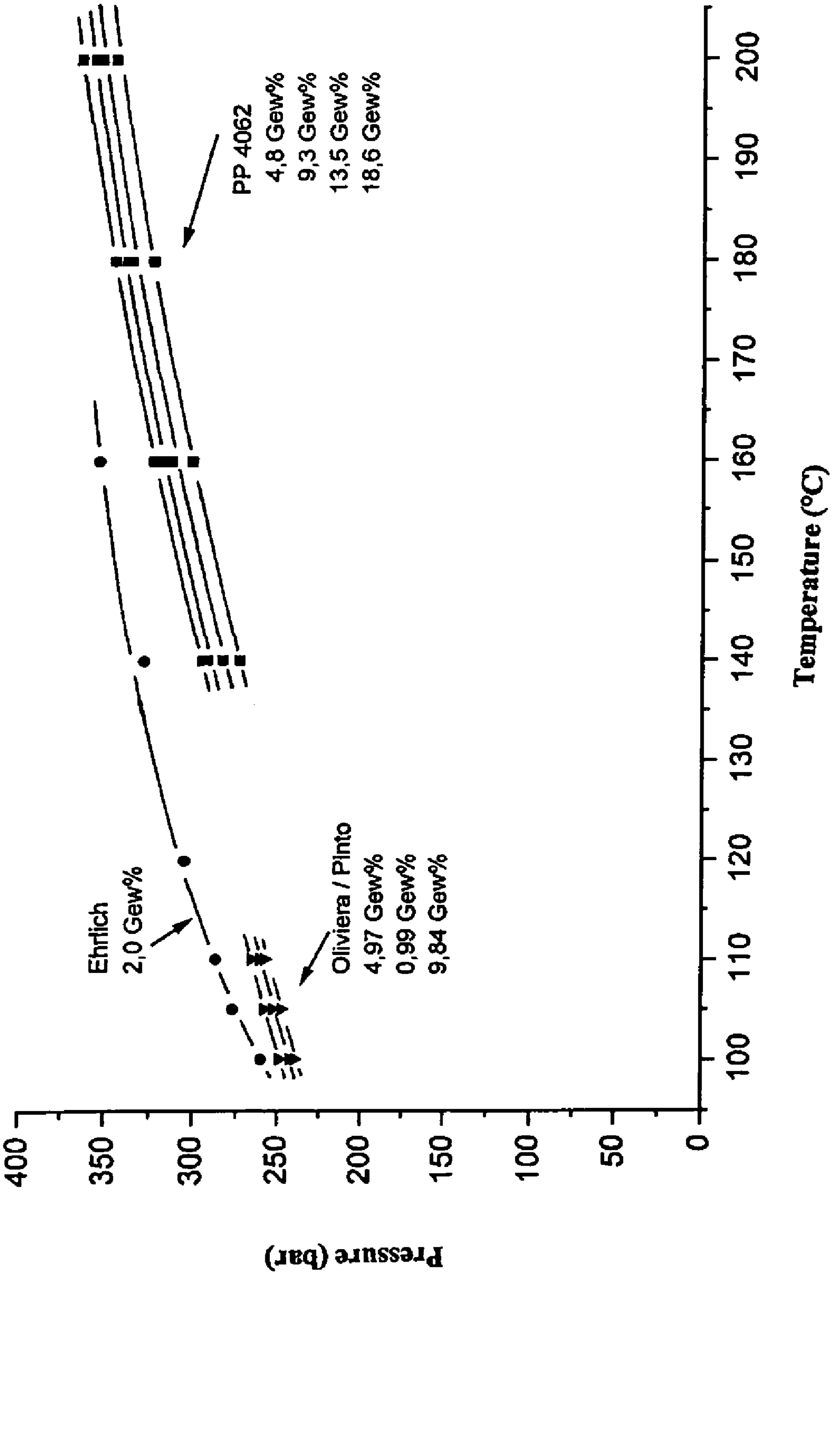
Fig. 11 Comparison with Literature Data (PP 4062)

POLYMER PRODUCTION AT SUPERCRITICAL CONDITIONS

PRIORITY CLAIMS

This application is a continuation of U.S. application having Ser. No.: 10/667,585 filed on Sep. 22, 2003, now U.S. Pat. No. 7,354,979 which claims benefit of US provisional application having Ser. No. 60/412,541, filed on Sep. 20, 2002.

FIELD OF THE INVENTION

This invention relates to polymerization of olefin monomers having three or more carbon atoms under supercritical conditions.

BACKGROUND

Since the mid-1980s metallocene catalysts have been used in high-pressure reactors—mainly for producing ethylene-backbone polymers including ethylene copolymers with monomers of one or more of propylene, butene, and hexene, along with other specialty monomers such as 4-methyl-1,5-hexadiene. For example U.S. Pat. No. 5,756,608, granted to Langhausen et al., reports a process for polymerizing $C_2$ to $C_{10}$ 1-alkenes using bridged metallocene catalysts. Polypropylene production in high pressure conditions has, however, been seen as impractical and unworkable at temperatures much above the propylene critical point. A process to produce commercially useful polypropylene in a high pressure system would provide advantages, such as increased reactivity, or increased catalyst productivity, or higher throughput, or shorter residence times, etc. Likewise new polypropylene polymers are also in constant need for the preparation of new and improved products. Thus there is a need in the art to develop new processes capable of greater efficiency and manufacture of new polypropylene polymers.

In addition there is also a need for polymerization processes that are flexible enough to be used with other monomers. For example a high pressure process to make polybutene or polyhexene is also desirable.

U.S. Pat. No. 6,084,041, granted to Andtsjö et al., discloses supercritical propylene polymerization under relatively mild conditions (90-100° C. and less than 6.89 MPa pressure) using supported Ziegler-Natta and metallocene catalysts. This patent does not relate to propylene copolymerization at temperatures or pressures much higher than described above. It also does not specifically disclose bulk propylene polymerization using soluble, unsupported metallocene catalysts.

U.S. Pat. No. 5,969,062 granted to Mole et al., describes a process for preparing ethylene copolymers with α-olefins in which polymerization is carried out at a pressure between 100-350 MPa and at a temperature from 200-280° C. The catalyst is based on a tetramethylcyclopentadienyl titanium complex.

U.S. Pat. No. 5,408,017 describes an olefin polymerization catalyst for use at polymerization temperatures of 140° C.-160° C., or greater. Mainly, temperatures exceeding the melting point temperature and approaching the polymer decomposition temperature are said to yield high productivity.

WO 93/11171 discloses a polyolefin production process that comprises continuously feeding olefin monomer and a metallocene catalyst system into a reactor. The monomer is continuously polymerized to provide a monomer-polymer mixture. Reaction conditions keep this mixture at a pressure below the system's cloud-point pressure. These conditions create a polymer-rich and a monomer-rich phase and maintain the mixture's temperature above the polymer's melting point.

U.S. Pat. No. 6,355,741 discloses a process for producing polyolefins having a bimodal molecular weight distribution. The process comprises producing a first polyolefin fraction in a first loop reactor. The process couples this first loop reactor to a second loop reactor that prepares a second polyolefin fraction. At least one of the loops uses supercritical conditions.

WO 92/14766 describes a process comprising the steps of (a) continuously feeding olefinic monomer and a catalyst system, with a metallocene component and a cocatalyst component, to the reactor; (b) continuously polymerizing that monomer in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the reactor.

U.S. Pat. No. 5,326,835 describes bimodal polyethylene production. This invention's first reactor stage is a loop reactor in which polymerization occurs in an inert, low-boiling hydrocarbon. After the loop reactor, the reaction medium transits into a gas-phase reactor where gas-phase ethylene polymerization occurs. The polymer produced appears to have a bimodal molecular weight distribution.

CA 2,118,711 (equivalent to DE 4,130,299) describes propylene polymerization at 149° C. and 1510 bar using $(CH_3)_2C$(fluorenyl)(cyclopentadienyl)zirconium dichloride complex, methylalumoxane and trimethylaluminum. Catalyst activity is reported to be 8380 gPP/g Ic' h. The $M_w$ is reported to be 2,000. CA 2,118,711 also describes propylene polymerization with ethylene at 190° C. and 1508 bar using $(CH_3)_2C$(fluorenyl)(cyclopentadienyl)zirconium dichloride complex, methylalumoxane and trimethylaluminum. Catalyst activity is reported to be 24358 g Polymer/gIc' hr. The $M_w$ is reported to be 10,000.

Other references of interest include:

*Olefin Polymerization Using Highly Congested ansa-Metallocenes under High Pressure: Formation of Superhigh Molecular Weight Polyolefins*, Suzuki, et al., Macromolecules, 2000, 33, 754-759, EP 1 123 226, WO 00 12572, WO 00 37514, EP 1 195 391, U.S. Pat. No. 6,355,741, and *Ethylene Bis(Indenyl) Zirconocenes . . .* , Schaverien, C. J. et al., Organometallics, ACS, Columbus Ohio, vol 20, no. 16, August 2001, pg 3436-3452, WO 96/34023, WO 97/11098, U.S. Pat. No. 5,084,534, U.S. Pat. No. 2,852,501, WO 93/05082, EP 129 368 B1, WO 97/45434, JP 96-208535 199660807, U.S. Pat. No. 5,096,867, WO 96/12744, U.S. Pat. No. 5,408,017, U.S. Pat. No. 5,084,534, U.S. Pat. No. 6,225,432, WO 02/090399, EP 1 195 391, WO 02/50145, US 2002 013440, WO 01/46273, EP 1 008 607, JP-1998-110003A, U.S. Pat. No. 6,562,914, and JP-1998-341202B2.

Another item of interest is an abstract obtained from the Borealis website that states:

Barbo Loefgren, E. Kokko, L. Huhtanen, M Lahelin, Petri Lehmus, Udo Stehling. "Metallocene-PP produced under supercritical conditions." 1st Bluesky Conference on Catalytic Olefin Polymerization, 17.-20.6.2002, Sorrento, Italy., ( ), 2002. "mPP produced in bulk conditions (100% propylene), especially at elevated temperature and under supercritical conditions, shows rheological behaviour indicative for small amounts of LCB in the polymer. This is a feature that can be utilized to produce mPP with enhanced melt strength under industrially meaningful conditions."

SUMMARY

This invention relates to a process to polymerize olefins comprising contacting, in a polymerization system, olefin monomers having three or more carbon atoms with a catalyst compound, an activator, optionally comonomer, and optionally diluent or solvent, at a temperature above the cloud point temperature of the polymerization system and a pressure no lower than 10 MPa below the cloud point pressure of the polymerization system and less than 150 MPa, where the polymerization system comprises the monomers, any comonomer present, any diluent or solvent present, the polymer product, and where the olefin monomers having three or more carbon atoms are present at 40 weight % or more.

This invention also relates to polymers produced herein including a propylene polymer having a 1,3 regio defect population of greater than 5 per 10,000 monomer units, a melting point of 145° C. or more, an g' of 0.97 or less and an Mw greater than 20,000.

This invention also relates to polymers produced herein including a propylene polymer having a 1,3 regio defect population of greater than 5 per 10,000 monomer units, a melting point of 145° C. or more, an g' of 0.97 or more and an Mw greater than 20,000.

FIGURE DESCRIPTION

FIG. 2 Shows cloud point isotherms for Polymer Achieve™ 1635.

FIG. 3 Shows cloud point isotherms for Polymer PP 45379 dissolved in bulk propylene.

FIG. 4 Shows cloud point isotherms for Polymer PP 4062 dissolved in bulk propylene.

FIG. 5 Shows cloud point isopleths for Polymer Achieve™ 1635 dissolved in bulk propylene.

FIG. 6 Shows cloud point isopleths for Polymer PP 45379 dissolved in bulk propylene.

FIG. 7 Shows cloud point isopleths for Polymer PP 4062 dissolved in bulk propylene.

FIG. 8 Shows a comparison of isopleths for PP 45379, Achieve™ 1635, and PP 4062 dissolved in bulk propylene.

Figure 1:
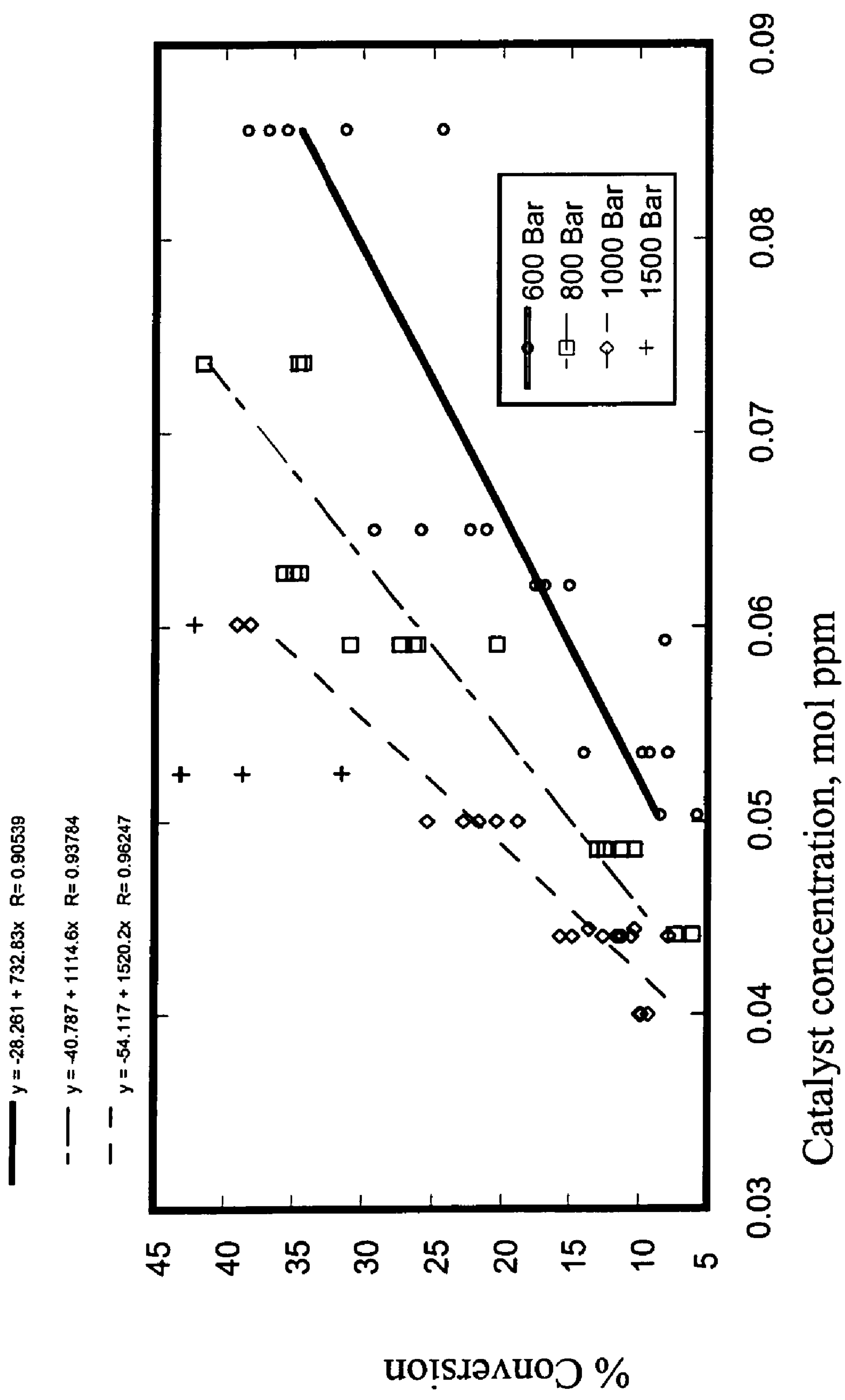
FIG. 1 Shows that conversion increases with increasing catalyst concentration and with increasing pressure.

FIGS. 9, 10 and 11 Show a comparison with literature data as described in J. Vladimir Oliveira, C. Dariva and J. C. Pinto, Ind. Eng, Chem. Res. 29, 2000, 4627

DEFINITIONS

For purposes of this invention and the claims thereto:

1. A catalyst system is defined to be the combination of a catalyst compound and an activator.
2. The cloud point is the pressure below which, at a given temperature, the polymerization system becomes turbid as described in J. Vladimir Oliveira, C. Dariva and J. C. Pinto, Ind. Eng, Chem. Res. 29, 2000, 4627. For purposes of this invention and the claims thereto, the cloud point is measured by shining a helium laser through the selected polymerization system in a cloud point cell onto a photocell and recording the pressure at the onset of light scattering for a given temperature.
3. A higher α-olefin is defined to be an olefin having 4 or more carbon atoms.
4. Use of the term "polymerization" encompasses any polymerization reaction such as homopolymerization and copolymerization.
5. A copolymerization encompasses any polymerization reaction of two or more monomers.
6. The new numbering scheme for the Periodic Table Groups is used as published in Chemical and Engineering News, 63(5), 27 (1985).
7. When a polymer is referred to as comprising an olefin, the olefin present in the polymer is the polymerized form of the olefin.
8. An oligomer is defined to be compositions having 2-75 mer units.
9. A polymer is defined to be compositions having 76 or more mer units.
10. The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is trisobutylaluminum, MAO is methylalumoxane, pMe is para-methyl, flu is fluorenyl, cp is cyclopentadienyl.

As used herein, the term "slurry polymerization" means a polymerization process that involves at least two phases, e.g., in which particulate, solid polymer (e.g., granular) is formed in a liquid, supercritical, or vapor polymerization medium, or in a liquid/vapor polymerization medium.

As used herein, the term "bulk polymerization" means a polymerization process in which the polymerization medium is predominantly monomer and contains less than 50 wt % of solvent or diluent.

DETAILED DESCRIPTION

This invention relates to a process to polymerize olefins comprising contacting, in a polymerization system, olefin monomers having three or more carbon atoms with a metallocene catalyst compound, a bisamide catalyst compound or a bisimide catalyst compound, an activator, optionally comonomer, and optionally diluent or solvent, at a temperature above the cloud point temperature of the polymerization system and a pressure no lower than 10 MPa below the cloud point pressure of the polymerization system and less than 150 MPa, where the polymerization system comprises the monomers, any comonomer present, any diluent or solvent present, the polymer product, and where the olefin monomers are present in the polymerization system at 40 weight % or more.

For illustration, cloud point curves are shown in FIGS. 2-10 for three different polypropylene samples having different molecular weights and crystallinities dissolved in propylene (at 18 weight %). (Achieve 1635 PP is a commercially available metallocene catalyzed isotactic polypropylene having an Melt Flow Index ($I_{10}/I_2$-ASTM 1238, 190° C., 2.16 kg) of 32 dg/min available from ExxonMobil Chemical Company, Houston, Tex. ESCORENE PP 4062 is a commercially available isotactic polypropylene having an MFI of 3.7 dg/min, available from ExxonMobil Chemical Company, Houston, Tex. PP 45379 is an isotactic polypropylene having an MFI of 300 dg/min produced using a supported metallocene in a slurry polymerization process.

For purposes of this invention and the claims thereto polymerization system is defined to be monomer(s) plus comonomers plus solvent/diluent plus polymer.

In a preferred embodiment, the polymerization system comprises less than 20 wt % aromatic hydrocarbons. Preferably less than 20 wt % toluene.

Preferably, the temperature of the polymerization system is 3° C. or more above the cloud point temperature for the polymerization system, alternately 5° C. or more, alternately 10° C. or more, alternately 15° C. or more, alternately 20° C.

or more, alternately 25° C. or more, alternately 30° C. or more. Even more preferably the temperature is between 140 and 220° C., preferably 145 and 200° C., preferably 150 and 190° C., preferably 150 to 180° C., preferably 140 to 170° C.

Preferably the pressure of the polymerization system is no lower than 10 MPa below the cloud point pressure of the polymerization system, preferably no lower than 5 MPa below the cloud point pressure, preferably above the cloud point pressure, preferably 5 MPa or more above the cloud point pressure, preferably 50 MPa or more, preferably 100 MPa. Preferably the pressure is 5 MPa or more, preferably 10 MPa or more, more preferably up to 350 MPa. Even more preferably the pressure is between 15 and 200 MPa, preferably 20 and 150 MPa, preferably 25 and 100 MPa, preferably 30 and 75 MPa, most preferably between 25 and 50 MPa.

Preferably solvent and or diluent is present in the polymerization system at 0 to 50 wt %, preferably 0 to 25 wt %, preferably 0 to 20, preferably 0 to 15 preferably 0 to 10 preferably 0 to 5, preferably, 0 to 4, preferably 0 to 3, preferably 0 to 2, preferably 0 to 1 wt %.

In a preferred embodiment the olefin monomers are present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more.

In a preferred embodiment propylene is present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more.

In a preferred embodiment propylene and up to 30 mol % of one or more comonomers are present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more.

In particularly preferred embodiments the temperature of the polymerization system is between 140 and 170° C. and the pressure of the polymerization system is between 15 and 60 MPa. In further particularly preferred embodiments the temperature of the polymerization system is between 140 and 170° C. and the pressure of the polymerization system is between 20 and 60 MPa. In further particularly preferred embodiments the temperature of the polymerization system is between 140 and 170° C. and the pressure is of the polymerization system between 25 and 60 MPa. In further particularly preferred embodiments the temperature of the polymerization system is between 140 and 170° C. and the pressure of the polymerization system is between 30 and 60 MPa.

The processes of this invention occur in a supercritical polymerization medium, preferably above the cloud point of the medium. A supercritical state exists for a substance when the substance's temperature and pressure are above its critical point. When the pressure or temperature exceeds the critical state, the fluid is in its supercritical state. The critical pressure and critical temperature of a fluid may be altered by combining it with another fluid, such as a diluent or anther monomer. Thus, for the purposes of this invention and the claims thereto a supercritical polymerization medium is the state where the polymerization medium is present at a temperature above the critical temperature and critical pressure of the medium.

For purposes of this invention and the claims thereto, the critical temperatures (Tc) and critical pressures (Pc) are found in the Handbook of Chemistry and Physics, David R. Lide, Editor-in-Chief, 82nd edition 2001-2002, CRC Press, LLC. New York, 2001. In particular the Tc and Pc of various molecules are defined to be:

| Name | Tc (° K) | Pc (MPa) | Name | Tc (° K) | Pc (MPa) |
|---|---|---|---|---|---|
| Hexane | 507.6 | 3.025 | Propane | 369.8 | 4.248 |
| Isobutane | 407.8 | 3.640 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-butene | 419.5 | 4.02 | Propylene | 364.9 | 4.60 |
| 1-pentene | 464.8 | 3.56 | Cyclopentene | 506.5 | 4.80 |
| Pentane | 469.7 | 3.370 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K = 0° C.

In a preferred embodiment, the combined volume of monomer(s) and solvent/diluent comprises at least 50 wt % of neat monomer, preferably at least 60 vol % neat monomer, more preferably at least 70 vol %, more preferably at least 80 vol %, more preferably at least 90 vol %, more preferably at least 95 vol %.

In some embodiments, optional comonomer, diluents or other fluids are present in the polymerization medium along with the monomer. Diluents, comonomers and other fluids each modify the media's critical point; and hence, alter the pressure-temperature regime within which a particular medium is in a supercritical state. Diluents, comonomers and other fluids each also modify the phase behavior of the polymerization medium; and hence, alter the pressure-temperature regime within which a particular medium is single phased. Consequently, a two component reaction medium can have two phases above its critical point.

While this disclosure speaks of two phases for neat propylene with dissolved polypropylene converting to a single phase above the reaction mixture's cloud point, the reality is that the phase behavior is more complicated, especially when the reaction medium is more complicated than neat propylene. This added complication can show up anytime the reaction medium contains an additional component, such as a diluent.

The terms "two-phase polymerization system" or "two-phase polymerization medium" mean a system having two and, preferably, only two phases. In certain embodiments, the two phases are referenced as a "first phase" and a "second phase." In certain embodiments, the first phase is or includes a "monomer phase," which includes monomers and may also include solvent and some or all of the product of polymerization. Preferably, however, the monomer phase does not include the polymer product. That is, for example in a propylene polymerization, the monomer phase can be referred to as the "propylene phase." In certain embodiments, the second phase is or includes a solid phase, which may include products of polymerization, e.g., macromers and polymer product, but not monomers, e.g., propylene. None of the parts of the catalyst system are considered to be part of the polymerization system, although certain parts of the catalyst system can obviously be solid, e.g., supported catalysts. Furthermore, it is contemplated that parts of the catalyst system may be liquid or vapor or part of the vapor/liquid phase that exists in certain embodiments of the process.

Some embodiments select the temperature and pressure so that the polymer produced in the reaction and the reaction medium that solvates it remain single phased, i.e. above the reaction medium's cloud point with that polymer. Other embodiments select the temperature and pressure so that the reaction medium remains supercritical, but at a pressure below the polymer's cloud point in the particular reaction medium. This results in a two phase reaction medium: a polymer rich phase and a polymer lean phase. Some embodiments that are below the polymer's cloud point nonetheless operate above the polymer's crystallization temperature.

Preferred diluents for use in the present invention include one or more of $C_1$-$C_{24}$ alkanes, such as ethane, propane, n-butane, i-butane, n-pentane, i-pentane, n-hexane, toluene, cyclohexane, xylene, mixed hexanes and cyclopentane. Some embodiments select a diluent from hydrocarbon diluents. In some preferred embodiments the diluent comprises one or more of ethane, propane, and isobutane. In some preferred embodiments the diluent is recyclable.

Preferred diluents also include $C_6$ to $C_{150}$ isoparaffins, preferably $C_6$ to $C_{100}$ isoparaffins, preferably $C_6$ to $C_{25}$ isoparaffins, more preferably $C_8$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, and between 10 and 24 in another embodiment, and from 10 to 15 in yet another embodiment. Various isomers of each carbon number will typically be present. The isoparaffins may also include cycloparaffins with branched side chains, generally as a minor component of the isoparaffin. Preferably the density (ASTM 4052, 15.6/15.6° C.) of these isoparaffins ranges from 0.70 to 0.83 g/cm$^3$; the pour point is −40° C. or less, preferably −50° C. or less, the viscosity (ASTM 445, 25° C.) is from 0.5 to 20 cSt at 25° C.; and the average molecular weights in the range of 100 to 300 g/mol. Suitable isoparaffins are commercially available under the tradename ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins. Other suitable isoparaffins are also commercial available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, preferred diluents include $C_5$ to $C_{25}$ n-paraffins, preferably $C_5$ to $C_{20}$ n-paraffins, preferably $C_5$ to $C_{15}$ n-paraffins having less than 0.1%, preferably less than 0.01% aromatics. Suitable n-paraffins are commercially available under the tradename NORPAR (ExxonMobil Chemical Company, Houston Tex.), and are sold commercially as NORPAR series of n-paraffins. In another embodiment preferred diluents include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, preferably $C_5$ to $C_{18}$, preferably $C_5$ to $C_{12}$. They contain very low levels of aromatic hydrocarbons, preferably less than 0.1, preferably less than 0.01 aromatics. Suitable dearomatized aliphatic hydrocarbons are commercially available under the tradename EXXSOL (ExxonMobil Chemical Company, Houston Tex.), and are sold commercially as EXXSOL series of dearomaticized aliphatic hydrocarbons.

In another embodiment the diluent comprises up to 20 weight % of oligomers of $C_6$ to $C_{14}$ olefins and/or oligomers of linear olefins having 6 to 14 carbon atoms, more preferably 8 to 12 carbon atoms, more preferably 10 carbon atoms having a Kinematic viscosity of 10 or more (as measured by ASTM D 445); and preferably having a viscosity index ("VI"), as determined by ASTM D-2270 of 100 or more.

In another embodiment the diluent comprises up to 20 weight % of oligomers of $C_{20}$ to $C_{1500}$ paraffins, preferably $C_{40}$ to $C_{1000}$ paraffins, preferably $C_{50}$ to $C_{750}$ paraffins, preferably $C_{50}$ to $C_{500}$ paraffins. In another embodiment the diluent comprises up to 20 weight % of oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the tradenames Synfluid™ available from ChevronPhillips Chemical Co. in Pasedena Tex., Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

With regard to propylene polymerization media, preferred monomers and diluents are those that are soluble in and inert to propylene and any other polymerization components at the polymerization temperatures and pressures.

As mentioned above, the polymerization processes described herein are run under supercritical conditions. This characteristic provides a lower pressure and temperature limit—the critical temperature and pressure of the reaction medium. Temperature and pressure are also constrained on the upper end. The upper temperature range is the decomposition or ceiling temperature of polypropylene. The following temperatures, in ° C., are useful lower temperature limits for all invention processes: 130, 140, 150, 160, and 170. The following temperatures, in ° C., are useful upper temperature limits for all invention processes: 190, 210, 220, 230, 240, and 250.

In another preferred embodiment the polymerization temperature is from 92 to 330° C., preferably 95 to 250° C., more preferably 100 to 200° C., more preferably 105 to 150° C., more preferably 120 to 160° C. more preferably 120 to 140° C., more preferably 140 to 160° C.

Theoretically, pressure can go as high as can be commercially contained. More practically, pressure is limited by the desired properties of the resulting polypropylene. The following pressures, in MPa, are useful lower pressure limits for all invention processes: 4.62, 5, 10, 15, 30, 50, 60, 80, 100, 120, 140, 150, 160, 180, 200, 250, 260, 300, 330, 350, 400, 440, 500, and 600. The following pressures, in MPa, are useful upper pressure limits for all invention processes: 10, 15, 30, 50, 60, 80, 100, 120, 140, 150, 160, 180, 200, 250, 260, 300, 330, 350, 400, 440, 500, 600, and 1000 MPa.

In a preferred embodiment the polymerization pressure is from 4.6 to 1000 MPa, preferably 15 to 500 MPa, more preferably 15 to 400 MPa, more preferably 15 to 300 MPa, more preferably 15 to 250 MPa, more preferably 15 to 200 MPa, more preferably 15 to 400 MPa, more preferably 15 to 190 MPa, more preferably 154.6 to 180 MPa, more preferably 15 to 170 MPa. In another embodiment the lower limit in all of the above ranges is 20 MPa, rather than 15 MPa. In another embodiment the lower limit in all of the above ranges is 25 MPa, rather than 15 MPa. In another embodiment the lower limit in all of the above ranges is 30 MPa, rather than 15 MPa.

In another embodiment the lower limit in all of the above ranges is 40 MPa, rather than 15 MPa. In another embodiment the lower limit in all of the above ranges is 50 MPa, rather than 15 MPa.

It is expected that any temperature range can be combined with any pressure range, provided that the chosen temperature and pressure are such that the reaction medium is above its cloud point (or within 10 MPa of the cloud point).

Temperatures above 140° C. and pressures between 100-150 MPa are particularly useful.

Monomers

The process described herein can be used to polymerize any monomer having three or more carbon atoms. Preferred monomers include propylene, butene, hexene, decene and octene.

In a preferred embodiment the processes of this invention are used to polymerize any unsaturated monomer or monomers. Preferred monomers include $C_3$ to $C_{100}$ olefins, preferably $C_3$ to $C_{60}$ olefins, preferably $C_3$ to $C_{40}$ olefins preferably $C_3$ to $C_{20}$ olefins, preferably $C_3$ to $C_{12}$ olefins. In some embodiments preferred monomers include linear, branched or cyclic alpha-olefins, preferably $C_3$ to $C_{100}$ alpha-olefins, preferably $C_3$ to $C_{60}$ alpha-olefins, preferably $C_3$ to $C_{40}$ alpha-olefins preferably $C_3$ to $C_{20}$ alpha-olefins, preferably $C_3$ to $C_{12}$ alpha-olefins. Preferred olefin monomers may be one or more of propylene, butene, pentene, hexene, heptene, octene, nonene, decene, dodecene, 4-methyl-pentene-1, 3-methyl pentene-1, 3,5,5-trimethyl hexene 1, and 5-ethyl-1-nonene.

In another embodiment the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, norbornene, and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Non-limiting examples of preferred polar unsaturated monomers include 6-nitro-1-hexene, N-methylallylamine, N-allylcyclopentylamine, N-allylhexylamine, methyl vinyl ketone, ethyl vinyl ketone, 5-hexen-2-one, 2-acetyl-5-norbornene, 7-syn methoxymethyl-5-norbornen-2-one, acrolein, 2,2-dimethyl-4-pentenal, undecylenic aldehyde, 2,4-dimethyl-2,6-heptadienal, acrylic acid, vinylacetic acid, 4-pentenoic acid, 2,2-dimethyl-4-pentenoic acid, 6-heptenoic acid, trans-2,4-pentadienoic acid, 2,6-heptadienoic acid, nona-fluoro-1-hexene, allyl alcohol, 7-octene-1,2-diol, 2-methyl-3-buten-1-ol, 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[9.5.1.1$^{3,9}$.1$^{5,15}$.1$^{7,13}$] octasiloxane, 2-benzoyl-5-norbornene, allyl 1,1,2,2,-tetrafluoroethyl ether, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, allyl disulfide, ethyl acrylate, methyl acrylate.

In a preferred embodiment the processes described herein may be used to produce homopolymers or copolymers. (For the purposes of this invention and the claims thereto a copolymer may comprise two, three, four or more different monomer units.) Preferred polymers produced herein include homopolymers or copolymers of any of the above monomers. In a preferred embodiment the polymer is a homopolymer of any $C_3$ to $C_{12}$ alpha-olefin. Preferably the polymer is a homopolymer of propylene. In another embodiment the polymer is a copolymer comprising propylene and ethylene, preferably the copolymer comprises less than 40 weight % ethylene, more preferably less than 30 weight % ethylene, preferably the copolymer comprises less than 20 weight % ethylene, more preferably less than 10 weight % ethylene. In another embodiment the polymer is a copolymer comprising propylene and one or more of any of the monomers listed above. In another preferred embodiment the copolymers comprises one or more diolefin comonomers, preferably one or more $C_2$ to $C_{40}$ diolefins.

In another preferred embodiment the polymer produced herein is a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. Preferably the polymer produced herein is a copolymer of propylene and one or more of ethylene, butene, pentene, hexene, heptene, octene, nonene, decene, dodecene, 4-methyl-pentene-1, 3-methyl pentene-1, and 3,5,5-trimethyl hexene 1.

In a preferred embodiment the copolymers described herein comprise at least 50 mole % of a first monomer and up to 50 mole % of other monomers.

In another embodiment, the polymer comprises:

a first monomer present at from 40 to 95 mole %, preferably 50 to 90 mole %, preferably 60 to 80 mole %, and a comonomer present at from 5 to 40 mole %, preferably 10 to 60 mole %, more preferably 20 to 40 mole %, and a termonomer present at from 0 to 10 mole %, more preferably from 0.5 to 5 mole %, more preferably 1 to 3 mole %.

In a preferred embodiment the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclohexene, cyclooctene, hexadiene, cyclohexadiene and the like.

In a preferred embodiment the comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1, 3-methylpentene-1, 4-methylpentene-1, cyclopentadiene, and cyclohexene.

In a preferred embodiment the termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, un-decene, dodecene, hexadecene, butadiene, hexadiene, heptadiene, pentadiene, octadiene, nonadiene, decadiene, dodecadiene, styrene, 3,5,5-trimethyl hexene-1, 3-methylpentene-1, 4-methylpentene-1, cyclopentadiene, and cyclohexene.

In a preferred embodiment the polymers described above further comprise one or more dienes at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In another embodiment the processes describe herein are used to produce propylene copolymers with other monomer units, such as ethylene, other α-olefin, α-olefinic diolefin, or non-conjugated diolefin monomers, for example $C_4$-$C_{20}$ olefins, $C_4$-$C_{20}$ diolefins, $C_4$-$C_{20}$ cyclic olefins, $C_8$-$C_{20}$ styrenic olefins. Other unsaturated monomers besides those specifically described above may be copolymerized using the invention processes, for example, styrene, alkyl-substituted styrene, ethylidene norbornene, norbornadiene, dicyclopentadiene, vinylcyclohexane, vinylcyclohexene, acrylates, and other olefinically-unsaturated monomers, including other cyclic olefins, such as cyclopentene, norbornene, and alkyl-substituted norbornenes. Copolymerization can also incorporate α-olefinic macromonomers produced in-situ or added from another source. Some invention embodiments limit the copolymerization of α-olefinic macromonomers to macromonomers with 2000 or less mer units. U.S. Pat. No. 6,300,451 discloses many useful comonomers. That disclosure refers to comonomers as “a second monomer”.

In another embodiment, when propylene copolymers are desired, the following monomers can be copolymerized with propylene: ethylene, but-1-ene, hex-1-ene, 4-methylpent-1-ene, dicyclopentadiene, norbornene, $C_4$-$C_{2000}$, $C_4$-$C_{200}$, or $C_4$-$C_{40}$ linear or branched, α,ω-dienes; $C_4$-$C_{2000}$, $C_4$-$C_{200}$, or $C_4$-$C_{40}$ cyclic olefins; and $C_4$-$C_{2000}$, $C_4$-$C_{200}$, or $C_4$-$C_{40}$ linear or branched α-olefins.

Other Primary Monomer

Some invention processes polymerize but-1-ene ($T_c$=146.5° C.; $P_c$=3.56 MPa), pent-1-ene ($T_c$=191.8; $P_c$=3.56 MPa), hex-1-ene ($T_c$=230.8; $P_c$=3.21 MPa), and 3-methyl-but-1-ene ($T_c$=179.7; $P_c$=3.53 MPa) using these monomers or mixtures comprising the monomers at supercritical conditions as the reaction medium or solvent. These processes can employ at least one of but-1-ene, pent-1-ene, or 3-methyl-but-1-ene as monomer. These processes can also employ reaction media that comprise but-1-ene, pent-1-ene, or 3-methyl-but-1-ene. These processes can employ reaction media that contain greater than 50 wt % of but-1-ene, pent-1-ene, or 3-methyl-but-1-ene. Of course, these compounds can be freely mixed with each other and with propylene as monomer, bulk reaction media, or both.

Catalyst Systems

The processes described herein are preferably used with a catalyst system comprising a single site type catalyst compounds in combination with an activator. A catalyst system is defined to be the combination of at least one catalyst compound and at least one activator.

Catalyst Compounds

Catalyst compounds that may be used in the processes of this invention include any catalyst compound that can polymerize monomers under supercritical polymerization conditions. Such catalyst compounds typically do not decompose at polymerization temperatures.

In a preferred embodiment, the processes described herein can use any olefin polymerization catalyst capable of polymerizing propylene if that catalyst is sufficiently active under invention polymerization conditions. Thus, Group-3-10 transition metals can form suitable polymerization catalysts. A suitable olefin polymerization catalyst will be able to coordinate to, or otherwise associate with, an alkenyl unsaturation.

Particularly useful catalyst compounds that may be used in the practice of this invention include metallocene catalyst compounds represented by formulae I and II.

$$L_z(Cp)(Q)M^mX_n \qquad \text{Formula I}$$

where:

Cp is a substituted or unsubstituted cyclopentadienyl ring, a substituted or unsubstituted indenyl ring or a substituted or unsubstituted fluorenyl ring;

Q is a heteroatom containing group;

z is 0 or 1;

L is a bridging group connecting Cp to Q,

M is a Group 4, 5, or 6 transition metal;

m is 3, 4, 5 or 6;

X is a halogen or a substituted or unsubstituted hydrocarbyl group, a substituted or unsubstituted hydrocarboxy group, or a substituted or unsubstituted heteroatom containing group; and n is m minus 2.

In a preferred embodiment, z is 1, L is represented by the formula: RqSi—where each R is, independently, a substituted or unsubstituted $C_1$ to $C_{20}$ hydrocarbyl group and q is 1, 2, 3 or 4; and Q is a nitrogen containing group, preferably a hydrocarbyl group substituted with nitrogen.

In a preferred embodiment, the metallocene catalyst compound is represented by the formula II: $L_z(Cp)_2M^mX_n$ where:

each Cp is independently a substituted or unsubstituted cyclopentadienyl ring, a substituted or unsubstituted indenyl ring or a substituted or unsubstituted fluorenyl ring;

z is 0 or 1;

L is a bridging group connecting Cp to Cp,

M is a Group 4, 5, or 6 transition metal;

m is 3, 4, 5 or 6;

X is a halogen or a substituted or unsubstituted hydrocarbyl group, a substituted or unsubstituted hydrocarboxy group, or a substituted or unsubstituted heteroatom containing group; and n is m minus 2.

In a preferred embodiment, z is 1, L is represented by the formula: RqSi— where each R is, independently, a substituted or unsubstituted $C_1$ to $C_{20}$ hydrocarbyl group and q is 1, 2, 3 or 4; and both Cp groups are indenyl rings substituted at the 2 and 4 positions.

For purposes of this invention and the claims thereto:

The term "hydrocarbyl radical" is sometimes used interchangeably with "hydrocarbyl" throughout this document. For purposes of this disclosure, "hydrocarbyl radical" encompasses $C_1$-$C_{50}$ radicals. These radicals can be linear, branched, or cyclic including polycyclic. These radicals can be saturated, partially unsaturated or fully unsaturated, and when cyclic, may be aromatic or non-aromatic.

Substituted hydrocarbyl radicals are radicals in which at least one hydrogen atom has been replaced with a heteroatom or with at least one functional group such as $NR''_2$, OR", $PR''_2$, SR", $BR''_2$, $SiR''_3$, $GeR''_3$ and the like or where at least one non-hydrocarbon atom or group has been inserted within the hydrocarbyl radical, such as O, S, NR", PR", BR", $SiR''_2$, $GeR''_2$, and the like, where R" is independently a hydrocarbyl or halocarbyl radical. The functional group can be an organometalloid radical.

Halocarbyl radicals are radicals in which one or more hydrocarbyl hydrogen atoms have been substituted with at least one halogen or halogen-containing group (e.g. F, Cl, Br, I).

Substituted halocarbyl radicals are radicals in which at least one hydrocarbyl hydrogen or halogen atom has been substituted with at least one functional group such as $NR''_2$, OR", $PR''_2$, SR", $BR''_2$, $SiR''_3$, $GeR''_3$ and the like or where at least one non-carbon atom or group has been inserted within the halocarbyl radical such as O, S, NR", PR", BR", $SiR''_2$, $GeR''_2$, and the like where R" is independently a hydrocarbyl or halocarbyl radical provided that at least one halogen atom remains on the original halocarbyl radical. The functional group can be an organometalloid radical.

In some embodiments, the hydrocarbyl radical is independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, ethenyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, or triacontynyl isomers. For this disclosure, when a radical is listed it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-diemthylphenyl, 2,5-dimethylphenyl, 2,6-diphenylmethyl, 3,4-dimethylphenyl, and 3,5-dimethylphenyl.

Preferred metallocene compounds include a group of suitable catalysts based on mono- or bis-cyclopentadiene. Useful compounds include transition metal compounds comprising extractable ligands described in U.S. Pat. No. 5,198,401 and WO 92/00333. Syntheses of these compounds are well known from the published literature.

Additional descriptions of metallocene compounds with, or that can be alkylated to contain, at least one ligand abstractable to form catalytically active transition-metal cations appear in the patent literature. (e.g., EP-A-0 129 368, U.S. Pat. Nos. 4,871,705, 4,937,299, 5,324,800, 5,470,993, 5,491,246, 5,512,693, EP-A-0 418 044, EP-A-0 591 756, WO-A-92/00333, WO-A-94/01471 and WO 97/22635.) Such metallocenes can be described as mono- or biscyclopentadienyl-substituted Group-3, -4, -5, or -6 transition metals. The transition metal ligands may themselves be substituted with one or more groups, and the ligands may bridge to each other or bridge through a heteroatom to the transition metal. Embodiments in which the cyclopentadienyl rings (including substituted, cyclopentadienyl-based, fused-ring systems, such as indenyl, fluorenyl, azulenyl, or their substituted analogs), when bridged to each other, are lower-alkyl substituted ($C_1$-$C_6$) in the 2 position (with or without a similar 4-position substituent in the fused ring) are useful. The cyclopentadienyl rings may additionally comprise alkyl, cycloalkyl, aryl, alkylaryl, and arylalkyl substituents, the latter as linear, branched, or cyclic structures including multi-ring structures, for example, those of U.S. Pat. Nos. 5,278,264 and 5,304,614. In some embodiments, such substituents should each have essentially hydrocarbyl characteristics and will typically contain up to 30 carbon atoms, and may contain heteroatoms, such as 1 to 5 non-hydrogen or non-carbon atoms, e.g., N, S, O, P, Ge, B and Si. A chemical entity is referred to as being substituted when at least one of its hydrogen atom has been replaced with a functional group or when at least one non-hydrocarbon atom or group has been inserted within it.

The following describe useful catalyst systems in invention processes: U.S. Pat No. 06,365,763, U.S. Pat No. 06,365,764, U.S. Pat No. 06,369,254, U.S. Pat No. 06,384,144, U.S. Pat No. 06,388,118, U.S. Pat No. 06,391,989, U.S. Pat No. 06,391,991, U.S. Pat No. 06,399,533, U.S. Pat No. 06,403,737, and U.S. Pat No. 06,410,661.

Preferred metallocene catalyst compounds useful in this invention are represented by the formula:

$$L_A L_B L_{Ci} MDE$$

where M is a Group-3-10 metal; $L_A$ is a substituted or unsubstituted, cyclopentadienyl or heterocyclopentadienyl ligand connected to M; and $L_B$ is a ligand as defined for $L_A$, or is a heteroatom ligand connected to M. $L_A$ and $L_B$ may connect to each other through a Group-13-16-element-containing bridge. $L_{Ci}$ is an optional, neutral, non-oxidizing ligand connected to M (i equals 0 to 3); and D and E are the same or different labile ligands, optionally bridged to each other, $L_A$, or $L_B$. Each of D and E are connected to M. Some embodiments select M to be a member of the Group-3-6 transition metals. Other embodiments select M to be a Group-4 transition metal. Some embodiments select M to be Ti, Zr, or Hf. $L_A$ and $L_B$ are sometimes called ancillary ligands because they are believed to help the metal center retain the correct electronic and geometric structure for olefin polymerizations.

Function typically constrains D and E in at least two ways: (1) upon activation, either the D-M or E-M connection breaks; and (2) monomer inserts between whichever of D-M or E-M remains. D and E are typically chosen to maximize these functions.

Cyclopentadienyl also encompasses fused-ring systems including but not limited to indenyl and fluorenyl radicals. Also, the use of heteroatom-containing rings or fused rings, where a non-carbon, Group-13-16 atom replaces a ring carbon is within the term "cyclopentadienyl" for this specification. See, for example, the background and illustrations of WO 98/37106, having priority with U.S. Ser. No. 08/999,214, filed Dec. 29, 1997, now U.S. Pat. No. 6,451,938 and WO 98/41530, having priority with U.S. Ser. No. 09/042,378, filed Mar. 13, 1998, now abandoned. Substituted cyclopentadienyl structures can have one or more hydrogen atoms replaced by a hydrocarbyl, hydrocarbylsilyl, or similar heteroatom-containing structure. Hydrocarbyl structures specifically include $C_1$-$C_{30}$ linear, branched, and cyclic alkyl, and aromatic fused and pendant rings. These rings may also be substituted with ring structures.

Preferred metallocene catalyst compounds also include the mono- and biscyclopentadienyl compounds such as those listed and described in U.S. Pat. Nos. 5,017,714, 5,324,800, and WO 92/00333 and EP-A-0 591 756.

Additional exemplary metallocene-type catalysts include those metallocene compounds represented by the formula:

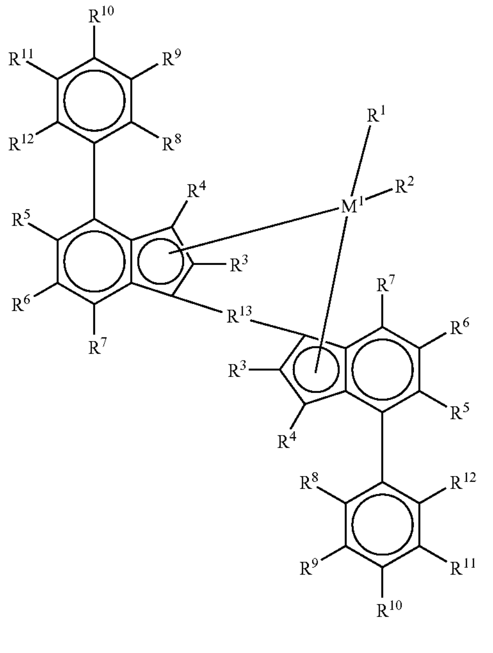

In the above structure, $M^1$ is selected from titanium, zirconium, hafnium, vanadium, niobium, tantalum, chromium, molybdenum, or tungsten.

$R^1$ and $R^2$ are identical or different and are selected from hydrogen atoms, $C_1$-$C_{10}$ alkyl groups, $C_1$-$C_{10}$ alkoxy groups, $C_6$-$C_{10}$ aryl groups, $C_6$-$C_{10}$ aryloxy groups, $C_2$-$C_{10}$ alkenyl groups, $C_2$-$C_{40}$ alkenyl groups, $C_7$-$C_{40}$ arylalkyl groups, $C_7$-$C_{40}$ alkylaryl groups, $C_8$-$C_{40}$ arylalkenyl groups, OH groups or halogen atoms; or conjugated dienes that are optionally substituted with one or more hydrocarbyl, tri(hydrocarbyl)silyl groups or hydrocarbyl, tri(hydrocarbyl)silylhydrocarbyl groups. The conjugated diene can contain up to 30 atoms not counting hydrogen.

$R^3$-$R^{12}$ are the same or different and are selected from hydrogen atoms, halogen atoms, $C_1$-$C_{10}$ halogenated or unhalogenated alkyl groups, $C_6$-$C_{10}$ halogenated or unhalogenated aryl groups, $C_2$-$C_{10}$ halogenated or unhalogenated alkenyl groups, $C_7$-$C_{40}$ halogenated or unhalogenated arylalkyl groups, $C_7$-$C_{40}$ halogenated or unhalogenated alkylaryl groups, $C_8$-$C_{40}$ halogenated or unhalogenated arylalkenyl groups, $-NR'_2$, $-SR'$, $-OR'$, $-OSiR'_3$ or $-PR'_2$ radicals in which R' is one of a halogen atom, a $C_1$-$C_{10}$ alkyl group, or a $C_6$-$C_{10}$ aryl group; or two or more adjacent radicals $R^5$ to $R^7$ together with the atoms connecting them can form one or more rings.

$R^{13}$ is selected from

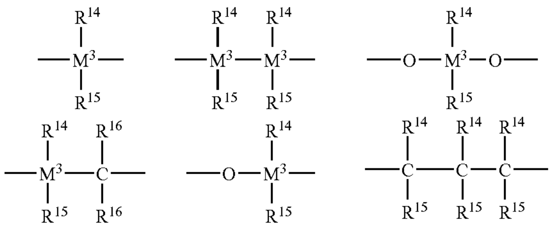

$-B(R^{14})-$, $-Al(R^{14})-$, $-Ge-$, $-Sn-$, $-O-$, $-S-$, $-SO-$, $-SO_2-$, $-N(R^{14})-$, $-CO-$, $-P(R^{14})-$ $-P(O)(R^{14})-$, $-B(NR^{14}R^{15})-$ and $-B[N(SiR^{14}R^{15}R^{16})_2]-$. $R^{14}$, $R^{15}$ and $R^{16}$ are each independently selected from hydrogen, halogen, $C_1$-$C_{20}$ alkyl groups, $C_6$-$C_{30}$ aryl groups, $C_1$-$C_{20}$ alkoxy groups, $C_2$-$C_{20}$ alkenyl groups, $C_7$-$C_{40}$ arylalkyl groups, $C_8$-$C_{40}$ arylalkenyl groups and $C_7$-$C_{40}$ alkylaryl groups, or $R^{14}$ and $R^{15}$, together with the atom(s) connecting them, form a ring; and $M^3$ is selected from carbon, silicon, germanium and tin.

Alternatively, $R^{13}$ is represented by the formula:

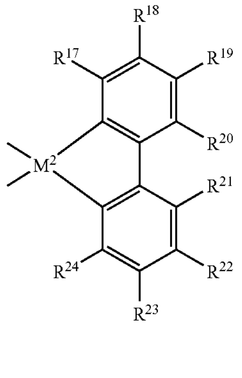

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin.

$R^8$, $R^9$, $R^{10}$ $R^{11}$ and $R^{12}$ can be identical or different and have the meanings stated for $R^3$ to $R^7$.

In a preferred embodiment dimethylsilyl(tetramethylcyclopentadienyl)(dodecylamido)titanium dichloride is used as a polymerization catalyst. Mono-cyclopentadienyl-substituted metallocene catalyst compounds with excess MAO as the activator form a preferred catalyst system. Some polymers produced by these systems may have different tacticities than those produced at lower temperatures and pressures.

Preferred catalyst compounds useful in this invention include:

dimethylsiladiyl(2-methyl, 4-[3',5'-di-tbutylphenyl]indenyl)$_2$ zirconium dichloride;

dimethylsiladiyl(2-ethyl, 4-[3',5'-di-tbutylphenyl]indenyl)$_2$ zirconium dichloride;

dimethylsiladiyl(2-n-propyl, 4-[3',5'-di-tbutylphenyl]indenyl)$_2$zirconium dichloride;

dimethylsiladiyl(2-iso-propyl, 4-[3',5'-di-tbutylphenyl]indenyl)$_2$zirconium dichloride;

dimethylsiladiyl(2-n-butyl, 4-[3',5'-di-tbutylphenyl]indenyl)$_2$ zirconium dichloride;

dimethylsiladiyl(2-iso-butyl, 4-[3',5'-di-tbutylphenyl]indenyl)$_2$zirconium dichloride;

dimethylsiladiyl(2-sec-butyl, 4-[3',5'-di-tbutylphenyl]indenyl)$_2$zirconium dichloride;

dimethylsiladiyl(2-tert-butyl, 4-[3',5'-di-tbutylphenyl]indenyl)$_2$zirconium dichloride;

dimethylsiladiyl(2-methyl, 4-[3',5'-di-tbutylphenyl]indenyl)$_2$ hafnium dichloride;

dimethylsiladiyl(2-ethyl, 4-[3',5'-di-tbutylphenyl]indenyl)$_2$ hafnium dichloride;

dimethylsiladiyl(2-n-propyl, 4-[3',5'-di-tbutylphenyl]indenyl)$_2$hafnium dimethylsiladiyl(2-iso-propyl, 4-[3',5'-di-tbutylphenyl]indenyl)$_2$hafnium dichloride;

dimethylsiladiyl(2-butyl, 4-[3',5'-di-tbutylphenyl]indenyl)$_2$ hafnium dichloride;

9-silafluorendiyl(2-methyl, 4-[3',5'-di-tbutylphenyl]indenyl)$_2$ zirconium dichloride;

9-silafluorendiyl(2-ethyl, 4-[3',5'-di-tbutylphenyl]indenyl)$_2$ zirconium dichloride;

9-silafluorendiyl(2-n-propyl, 4-[3',5'-di-tbutylphenyl]indenyl)$_2$zirconium dichloride;

9-silafluorendiyl(2-iso-propyl, 4-[3',5'-di-tbutylphenyl]indenyl)$_2$zirconium dichloride;

9-silafluorendiyl(2-n-butyl, 4-[3',5'-di-tbutylphenyl]indenyl)$_2$ zirconium dichloride;

9-silafluorendiyl(2-iso-butyl, 4-[3',5'-di-tbutylphenyl]indenyl)$_2$zirconium dichloride;

9-silafluorendiyl(2-sec-butyl, 4-[3',5'-di-tbutylphenyl]indenyl)$_2$zirconium dichloride;

9-silafluorendiyl(2-tert-butyl, 4-[3',5'-di-tbutylphenyl]indenyl)$_2$zirconium dichloride;

9-silafluorendiyl(2-methyl, 4-[3',5'-di-tbutylphenyl]indenyl)$_2$ hafnium dichloride;

9-silafluorendiyl(2-ethyl, 4-[3',5'-di-tbutylphenyl]indenyl)$_2$ hafnium dichloride;

9-silafluorendiyl(2-n-propyl, 4-[3',5'-di-tbutylphenyl]indenyl)$_2$hafnium dichloride;

9-silafluorendiyl(2-iso-propyl, 4-[3',5'-di-tbutylphenyl]indenyl)$_2$hafnium dichloride;

9-silafluorendiyl(2-n-butyl, 4-[3',5'-di-tbutylphenyl]indenyl)$_2$ hafnium dichloride;

9-silafluorendiyl(2-iso-butyl, 4-[3',5'-di-tbutylphenyl]indenyl)$_2$hafnium dichloride;

9-silafluorendiyl(2-sec-butyl, 4-[3',5'-di-tbutylphenyl]indenyl)$_2$hafnium dichloride;

9-silafluorendiyl(2-tert-butyl, 4-[3',5'-di-tbutylphenyl]indenyl)$_2$hafnium dichloride;

dimethylsiladiyl(2-methyl, 4-[3',5'-di-tbutylphenyl]indenyl)$_2$ zirconium dimethyl;

dimethylsiladiyl(2-ethyl, 4-[3',5'-di-tbutylphenyl]indenyl)$_2$ zirconium dimethyl;

dimethylsiladiyl(2-n-propyl, 4-[3',5'-di-tbutylphenyl]indenyl)$_2$zirconium dimethyl;

dimethylsiladiyl(2-iso-propyl, 4-[3',5'-di-tbutylphenyl]indenyl)$_2$zirconium dimethyl;

dimethylsiladiyl(2-n-butyl, 4-[3',5'-di-tbutylphenyl]indenyl)$_2$ zirconium dimethyl;

dimethylsiladiyl(2-iso-butyl, 4-[3',5'-di-tbutylphenyl]indenyl)$_2$zirconium dimethyl;

dimethylsiladiyl(2-sec-butyl, 4-[3',5'-di-tbutylphenyl]indenyl)$_2$zirconium dimethyl;

dimethylsiladiyl(2-tert-butyl, 4-[3',5'-di-tbutylphenyl]indenyl)$_2$zirconium dimethyl;

dimethylsiladiyl(2-methyl, 4-[3',5'-di-tbutylphenyl]indenyl)$_2$ hafnium dimethyl;

dimethylsiladiyl(2-ethyl, 4-[3',5'-di-tbutylphenyl]indenyl)$_2$ hafnium dimethyl;

dimethylsiladiyl(2-n-propyl, 4-[3',5'-di-tbutylphenyl]indenyl)$_2$hafnium dimethyl dimethylsiladiyl(2-iso-propyl, 4-[3',5'-di-tbutylphenyl]indenyl)$_2$hafnium dimethyl;

dimethylsiladiyl(2-n-butyl, 4-[3',5'-di-tbutylphenyl]indenyl)$_2$ hafnium dimethyl;

dimethylsiladiyl(2-iso-butyl, 4-[3',5'-di-tbutylphenyl]indenyl)$_2$hafnium dimethyl;

dimethylsiladiyl(2-sec-butyl, 4-[3',5'-di-tbutylphenyl]indenyl)$_2$hafnium dimethyl;

dimethylsiladiyl(2-tert-butyl, 4-[3',5'-di-tbutylphenyl]indenyl)$_2$hafnium dimethyl;

9-silafluorendiyl(2-methyl, 4-[3',5'-di-tbutylphenyl]indenyl)$_2$ zirconium dimethyl;

9-silafluorendiyl(2-ethyl, 4-[3',5'-di-tbutylphenyl]indenyl)$_2$ zirconium dimethyl;

9-silafluorendiyl(2-n-propyl, 4-[3',5'-di-tbutylphenyl]indenyl)$_2$zirconium dimethyl;

9-silafluorendiyl(2-iso-propyl, 4-[3',5'-di-tbutylphenyl]indenyl)$_2$zirconium dimethyl;

9-silafluorendiyl(2-n-butyl, 4-[3',5'-di-tbutylphenyl]indenyl)$_2$ zirconium dimethyl;

9-silafluorendiyl(2-iso-butyl, 4-[3',5'-di-tbutylphenyl]indenyl)$_2$zirconium dimethyl;

9-silafluorendiyl(2-sec-butyl, 4-[3',5'-di-tbutylphenyl]indenyl)$_2$zirconium dimethyl;

9-silafluorendiyl(2-tert-butyl, 4-[3',5'-di-tbutylphenyl]indenyl)$_2$zirconium dimethyl;

9-silafluorendiyl(2-methyl, 4-[3',5'-di-tbutylphenyl]indenyl)$_2$ hafnium dimethyl;

9-silafluorendiyl(2-ethyl, 4-[3',5'-di-tbutylphenyl]indenyl)$_2$ hafnium dimethyl;

9-silafluorendiyl(2-n-propyl, 4-[3',5'-di-tbutylphenyl]indenyl)$_2$hafnium dimethyl;

9-silafluorendiyl(2-iso-propyl, 4-[3',5'-di-tbutylphenyl]indenyl)$_2$hafnium dimethyl;

9-silafluorendiyl(2-n-butyl, 4-[3',5'-di-tbutylphenyl]indenyl)$_2$ hafnium dimethyl;

9-silafluorendiyl(2-iso-butyl, 4-[3',5'-di-tbutylphenyl]indenyl)$_2$hafnium dimethyl;

9-silafluorendiyl(2-sec-butyl, 4-[3',5'-di-tbutylphenyl]indenyl)$_2$hafnium dimethyl;

9-silafluorendiyl(2-tert-butyl, 4-[3',5'-di-tbutylphenyl]indenyl)$_2$hafnium dimethyl;

dimethylsiladiyl(2-methyl, 4-[3',5'-bis-trifluoromethylphenyl]indenyl)$_2$zirconium dichloride;
dimethylsiladiyl(2-ethyl, 4-[3',5'-bis-trifluoromethylphenyl]indenyl)$_2$zirconium dichloride;
dimethylsiladiyl(2-n-propyl, 4-[3',5'-bis-trifluoromethylphenyl]indenyl)$_2$zirconium dichloride;
dimethylsiladiyl(2-iso-propyl, 4-[3',5'-bis-trifluoromethylphenyl]indenyl)$_2$zirconium dichloride;
dimethylsiladiyl(2-n-butyl, 4-[3',5'-bis-trifluoromethylphenyl]indenyl)$_2$zirconium dichloride;
dimethylsiladiyl(2-iso-butyl, 4-[3',5'-bis-trifluoromethylphenyl]indenyl)$_2$zirconium dichloride;
dimethylsiladiyl(2-sec-butyl, 4-[3',5'-bis-trifluoromethylphenyl]indenyl)$_2$zirconium dichloride;
dimethylsiladiyl(2-tert-butyl, 4-[3',5'-bis-trifluoromethylphenyl]indenyl)$_2$zirconium dichloride;
dimethylsiladiyl(2-methyl, 4-[3',5'-bis-trifluoromethylphenyl]indenyl)$_2$hafnium dichloride;
dimethylsiladiyl(2-ethyl, 4-[3',5'-bis-trifluoromethylphenyl]indenyl)$_2$hafnium dichloride;
dimethylsiladiyl(2-n-propyl, 4-[3',5'-bis-trifluoromethylphenyl]indenyl)$_2$hafnium dichloride;
dimethylsiladiyl(2-iso-propyl, 4-[3',5'-bis-trifluoromethylphenyl]indenyl)$_2$hafnium dichloride;
dimethylsiladiyl(2-n-butyl, 4-[3',5'-bis-trifluoromethylphenyl]indenyl)$_2$hafnium dichloride;
dimethylsiladiyl(2-iso-butyl, 4-[3',5'-bis-trifluoromethylphenyl]indenyl)$_2$hafnium dichloride;
dimethylsiladiyl(2-sec-butyl, 4-[3',5'-bis-trifluoromethylphenyl]indenyl)$_2$hafnium dichloride;
dimethylsiladiyl(2-tert-butyl, 4-[3',5'-bis-trifluoromethylphenyl]indenyl)$_2$hafnium dichloride;
9-silafluorendiyl(2-methyl, 4-[3',5'-bis-trifluoromethylphenyl]indenyl)$_2$zirconium dichloride;
dimethylsiladiyl(2-ethyl, 4-[3',5'-bis-trifluoromethylphenyl]indenyl)$_2$hafnium dichloride;
9-silafluorendiyl(2-n-propyl, 4-[3',5'-bis-trifluoromethylphenyl]indenyl)$_2$zirconium dichloride;
9-silafluorendiyl(2-iso-propyl, 4-[3',5'-bis-trifluoromethylphenyl]indenyl)$_2$zirconium dichloride;
9-silafluorendiyl(2-n-butyl, 4-[3',5'-bis-trifluoromethylphenyl]indenyl)$_2$zirconium dichloride;
9-silafluorendiyl(2-iso-butyl, 4-[3',5'-bis-trifluoromethylphenyl]indenyl)$_2$zirconium dichloride;
9-silafluorendiyl(2-sec-butyl, 4-[3',5'-bis-trifluoromethylphenyl]indenyl)$_2$zirconium dichloride;
9-silafluorendiyl(2-tert-butyl, 4-[3',5'-bis-trifluoromethylphenyl]indenyl)$_2$zirconium dichloride;
9-silafluorendiyl(2-methyl, 4-[3',5'-bis-trifluoromethylphenyl]indenyl)$_2$hafnium dichloride;
9-silafluorendiyl(2-ethyl, 4-[3',5'-bis-trifluoromethylphenyl]indenyl)$_2$hafnium dichloride;
9-silafluorendiyl(2-n-propyl, 4-[3',5'-bis-trifluoromethylphenyl]indenyl)$_2$ hafnium dichloride;
9-silafluorendiyl(2-iso-propyl, 4-[3',5'-bis-trifluoromethylphenyl]indenyl)$_2$ hafnium dichloride;
9-silafluorendiyl(2-n-butyl, 4-[3',5'-bis-trifluoromethylpheny]indenyl)$_2$hafnium dichloride;
9-silafluorendiyl(2-iso-butyl, 4-[3',5'-bis-trifluoromethylphenyl]indenyl)$_2$hafnium dichloride;
9-silafluorendiyl(2-sec-butyl, 4-[3',5'-bis-trifluoromethylphenyl]indenyl)$_2$hafnium dichloride;
9-silafluorendiyl(2-tert-butyl, 4-[3',5'-bis-trifluoromethylphenyl]indenyl)$_2$hafnium dichloride;
dimethylsiladiyl(2-methyl, 4-[3',5'-bis-trifluoromethylphenyl]indenyl)$_2$zirconium dimethyl;
dimethylsiladiyl(2-ethyl, 4-[3',5'-bis-trifluoromethylphenyl]indenyl)$_2$zirconium dimethyl;
dimethylsiladiyl(2-n-propyl, 4-[3',5'-bis-trifluoromethylphenyl]indenyl)$_2$zirconium dimethyl;
dimethylsiladiyl(2-iso-propyl, 4-[3',5'-bis-trifluoromethylphenyl]indenyl)$_2$zirconium dimethyl;
dimethylsiladiyl(2-n-butyl, 4-[3',5'-bis-trifluoromethylphenyl]indenyl)$_2$zirconium dimethyl;
dimethylsiladiyl(2-iso-butyl, 4-[3',5'-bis-trifluoromethylphenyl]indenyl)$_2$zirconium dimethyl;
dimethylsiladiyl(2-sec-butyl, 4-[3',5'-bis-trifluoromethylphenyl]indenyl)$_2$zirconium dimethyl;
dimethylsiladiyl(2-tert-butyl, 4-[3',5'-bis-trifluoromethylphenyl]indenyl)$_2$zirconium dimethyl;
dimethylsiladiyl(2-methyl, 4-[3',5'-bis-trifluoromethylphenyl]indenyl)$_2$hafnium dimethyl;
dimethylsiladiyl(2-ethyl, 4-[3',5'-bis-trifluoromethylphenyl]indenyl)$_2$hafnium dimethyl; dimethylsiladiyl(2-n-propyl, 4-[3',5'-bis-trifluoromethylphenyl]indenyl)$_2$hafnium dimethyl;
dimethylsiladiyl(2-iso-propyl, 4-[3',5'-bis-trifluoromethylphenyl]indenyl)$_2$hafnium dimethyl;
dimethylsiladiyl(2-n-butyl, 4-[3',5'-bis-trifluoromethylphenyl]indenyl)$_2$hafnium dimethyl;
dimethylsiladiyl(2-iso-butyl, 4-[3',5'-bis-trifluoromethylphenyl]indenyl)$_2$hafnium dimethyl;
dimethylsiladiyl(2-sec-butyl, 4-[3',5'-bis-trifluoromethylphenyl]indenyl)$_2$hafnium dimethyl;
dimethylsiladiyl(2-tert-butyl, 4-[3',5'-bis-trifluoromethylphenyl]indenyl)$_2$hafnium dimethyl;
9-silafluorendiyl(2-methyl, 4-[3',5'-bis-trifluoromethylphenyl]indenyl)$_2$zirconium dimethyl;
dimethylsiladiyl(2-ethyl, 4-[3',5'-bis-trifluoromethylphenyl]indenyl)$_2$hafnium dimethyl;
9-silafluorendiyl(2-n-propyl, 4-[3',5'-bis-trifluoromethylphenyl]indenyl)$_2$zirconium dimethyl;
9-silafluorendiyl(2-iso-propyl, 4-[3',5'-bis-trifluoromethylphenyl]indenyl)$_2$zirconium dimethyl;
9-silafluorendiyl(2-n-butyl, 4-[3',5'-bis-trifluoromethylphenyl]indenyl)$_2$zirconium dimethyl;
9-silafluorendiyl(2-iso-butyl, 4-[3',5'-bis-trifluoromethylphenyl]indenyl)$_2$zirconium dimethyl;
9-silafluorendiyl(2-sec-butyl, 4-[3',5'-bis-trifluoromethylphenyl]indenyl)$_2$zirconium dimethyl;
9-silafluorendiyl(2-tert-butyl, 4-[3',5'-bis-trifluoromethylphenyl]indenyl)$_2$zirconium dimethyl;
9-silafluorendiyl(2-methyl, 4-[3',5'-bis-trifluoromethylphenyl]indenyl)$_2$hafnium dimethyl;
9-silafluorendiyl(2-ethyl, 4-[3',5'-bis-trifluoromethylphenyl]indenyl)$_2$hafnium dimethyl;
9-silafluorendiyl(2-n-propyl, 4-[3',5'-bis-trifluoromethylphenyl]indenyl)$_2$hafnium dimethyl;
9-silafluorendiyl(2-iso-propyl, 4-[3',5'-bis-trifluoromethylphenyl]indenyl)$_2$hafnium dimethyl;
9-silafluorendiyl(2-n-butyl, 4-[3',5'-bis-trifluoromethylphenyl]indenyl)$_2$hafnium dimethyl;
9-silafluorendiyl(2-iso-butyl, 4-[3',5'-bis-trifluoromethylphenyl]indenyl)$_2$hafnium dimethyl;
9-silafluorendiyl(2-sec-butyl, 4-[3',5'-bis-trifluoromethylphenyl]indenyl)$_2$hafnium dimethyl;
9-silafluorendiyl(2-tert-butyl, 4-[3',5'-bis-trifluoromethylphenyl]indenyl)$_2$hafnium dimethyl;
dimethylsiladiyl(2-ethyl, 4-[3',5'-di-iso-propylphenyl]indenyl)$_2$zirconium dichloride;
dimethylsiladiyl(2-n-propyl, 4-[3',5'-di-iso-propylphenyl]indenyl)$_2$zirconium dichloride dimethylsiladiyl(2-iso-propyl, 4-[3',5'-di-iso-propylphenyl] indenyl)$_2$zirconium dichloride dimethylsiladiyl(2-n-butyl, 4-[3',5'-di-iso-propylphenyl]indenyl)$_2$zirconium dichloride;

dimethylsiladiyl(2-iso-butyl, 4-[3',5'-di-iso-propylphenyl] indenyl)$_2$zirconium dichloride;

dimethylsiladiyl(2-sec-butyl, 4-[3',5'-di-iso-propylphenyl] indenyl)$_2$zirconium dichloride;

dimethylsiladiyl(2-tert-butyl, 4-[3',5'-di-iso-propylphenyl] indenyl)$_2$zirconium dichloride;

dimethylsiladiyl(2-ethyl, 4-[3',5'-di-iso-propylphenyl]indenyl)$_2$hafnium dichloride;

dimethylsiladiyl(2-n-propyl, 4-[3',5'-di-iso-propylphenyl]indenyl)$_2$hafnium dichloride;

dimethylsiladiyl(2-iso-propyl, 4-[3',5'-di-iso-propylphenyl] indenyl)$_2$hafnium dichloride;

dimethylsiladiyl(2-n-butyl, 4-[3',5'-di-iso-propylphenyl]indenyl)$_2$hafnium dichloride;

dimethylsiladiyl(2-iso-butyl, 4-[3',5'-di-iso-propylphenyl] indenyl)$_2$hafnium dichloride;

dimethylsiladiyl(2-sec-butyl, 4-[3',5'-di- iso-propylphenyl] indenyl)$_2$hafnium dichloride;

dimethylsiladiyl(2-tert-butyl, 4-[3',5'-di-iso-propylphenyl] indenyl)$_2$hafnium dichloride;

9-silafluorendiyl(2-ethyl, 4-[3',5'-di-iso-propylphenyl]indenyl)$_2$zirconium dichloride;

9-silafluorendiyl(2-n-propyl, 4-[3',5'-di-iso-propylphenyl] indenyl)$_2$zirconium dichloride;

9-silafluorendiyl(2-iso-propyl, 4-[3',5'-di-iso-propylphenyl] indenyl)$_2$zirconium dichloride;

9-silafluorendiyl(2-n-butyl, 4-[3',5'-di-iso-propylphenyl]indenyl)$_2$zirconium dichloride;

9-silafluorendiyl(2-iso-butyl, 4-[3',5'-di-iso-propylphenyl] indenyl)$_2$zirconium dichloride;

9-silafluorendiyl(2-sec-butyl, 4-[3',5'-di-iso-propylphenyl] indenyl)$_2$zirconium dichloride;

9-silafluorendiyl(2-tert-butyl, 4-[3',5'-di-iso-propylphenyl] indenyl)$_2$zirconium dichloride;

9-silafluorendiyl(2-ethyl, 4-[3',5'-di-iso-propylphenyl]indenyl)$_2$hafnium dichloride;

9-silafluorendiyl(2-n-propyl, 4-[3',5'-di-iso-propylphenyl] indenyl)$_2$hafnium dichloride;

9-silafluorendiyl(2-iso-propyl, 4-[3',5'-di-iso-propylphenyl] indenyl)$_2$hafnium dichloride;

9-silafluorendiyl(2-n-butyl, 4-[3',5'-di-iso-propylphenyl]indenyl)$_2$hafnium dichloride;

9-silafluorendiyl(2-iso-butyl, 4-[3',5'-di-iso-propylphenyl] indenyl)$_2$hafnium dichloride;

9-silafluorendiyl(2-sec-butyl, 4-[3',5'-di-iso-propylphenyl] indenyl)$_2$hafnium dichloride;

9-silafluorendiyl(2-tert-butyl, 4-[3',5'-di-iso-propylphenyl] indenyl)$_2$hafnium dichloride;

dimethylsiladiyl(2-ethyl, 4-[3',5'-di-iso-propylphenyl]indenyl)$_2$zirconium dimethyl;

dimethylsiladiyl(2-n-propyl, 4-[3',5'-di-iso-propylphenyl]indenyl)$_2$zirconium dimethyl dimethylsiladiyl(2-iso-propyl, 4-[3',5'-di-iso-propylphenyl] indenyl)$_2$zirconium dimethyl;

dimethylsiladiyl(2-n-butyl, 4-[3',5'-di-iso-propylphenyl]indenyl)$_2$zirconium dimethyl;

dimethylsiladiyl(2-isobutyl, 4-[3',5'-di-iso-propylphenyl]indenyl)$_2$zirconium dimethyl;

dimethylsiladiyl(2-sec-butyl, 4-[3',5'-di-iso-propylphenyl] indenyl)$_2$zirconium dimethyl;

dimethylsiladiyl(2-tert-butyl, 4-[3',5'-di-iso-propylphenyl] indenyl)$_2$zirconium dimethyl;

dimethylsiladiyl(2-ethyl, 4-[3',5'-di-iso-propylphenyl]indenyl)$_2$hafnium dimethyl;

dimethylsiladiyl(2-n-propyl, 4-[3',5'-di-iso-propylphenyl]indenyl)$_2$hafnium dimethyl;

dimethylsiladiyl(2-iso-propyl, 4-[3',5'-di-iso-propylphenyl] indenyl)$_2$hafnium dimethyl;

dimethylsiladiyl(2-n-butyl, 4-[3',5'-di-iso-propylphenyl]indenyl)$_2$hafnium dimethyl;

dimethylsiladiyl(2-iso-butyl, 4-[3',5'-di-iso-propylphenyl] indenyl)$_2$zirconium dimethyl;

dimethylsiladiyl(2-sec-butyl, 4-[3',5'-di-iso-propylphenyl] indenyl)$_2$zirconium dimethyl;

dimethylsiladiyl(2-tert-butyl, 4-[3',5'-di-iso-propylphenyl] indenyl)$_2$zirconium dimethyl;

9-silafluorendiyl(2-ethyl, 4-[3',5'-di-iso-propylphenyl]indenyl)$_2$zirconium dimethyl;

9-silafluorendiyl(2-n-propyl, 4-[3',5'-di-iso-propylphenyl] indenyl)$_2$zirconium dimethyl;

9-silafluorendiyl(2-iso-propyl, 4-[3',5'-di-iso-propylphenyl] indenyl)$_2$zirconium dimethyl;

9-silafluorendiyl(2-n-butyl, 4-[3',5'-di-iso-propylphenyl]indenyl)$_2$zirconium dimethyl;

9-silafluorendiyl(2-iso-butyl, 4-[3',5'-di-iso-propylphenyl] indenyl)$_2$zirconium dimethyl;

9-silafluorendiyl(2-sec-butyl, 4-[3',5'-di-iso-propylphenyl] indenyl)$_2$zirconium dimethyl;

9-silafluorendiyl(2-tert-butyl, 4-[3',5'-di-iso-propylphenyl] indenyl)$_2$zirconium dimethyl;

9-silafluorendiyl(2-ethyl, 4-[3',5'-di-iso-propylphenyl]indenyl)$_2$hafnium dimethyl;

9-silafluorendiyl(2-n-propyl, 4-[3',5'-di-iso-propylphenyl] indenyl)$_2$hafnium dimethyl;

9-silafluorendiyl(2-iso-propyl, 4-[3',5'-di-iso-propylphenyl] indenyl)$_2$hafnium dimethyl;

9-silafluorendiyl(2-n-butyl, 4-[3',5'-di-iso-propylphenyl]indenyl)$_2$hafnium dimethyl;

9-silafluorendiyl(2-iso-butyl, 4-[3',5'-di-iso-propylphenyl] indenyl)$_2$hafnium dimethyl;

9-silafluorendiyl(2-sec-butyl, 4-[3',5'-di-iso-propylphenyl] indenyl)$_2$hafnium dimethyl;

9-silafluorendiyl(2-tert-butyl, 4-[3',5'-di-iso-propylphenyl] indenyl)$_2$hafnium dimethyl;

dimethylsiladiyl(2-methyl, 4-[3',5'-di-phenylphenyl]indenyl)$_2$zirconium dichloride;

dimethylsiladiyl(2-ethyl, 4-[3',5'-di-phenylphenyl]indenyl)$_2$ zirconium dichloride;

dimethylsiladiyl(2-n-propyl, 4-[3',5'-di-phenylphenyl]indenyl)$_2$zirconium dichloride;

dimethylsiladiyl(2-iso-propyl, 4-[3',5'-di-phenylphenyl]indenyl)$_2$zirconium dichloride;

dimethylsiladiyl(2-n-butyl, 4-[3',5'-di-phenylphenyl]indenyl)$_2$zirconium dichloride;

dimethylsiladiyl(2-iso-butyl, 4-[3',5'-di-phenylphenyl]indenyl)$_2$zirconium dichloride;

dimethylsiladiyl(2-sec-butyl, 4-[3',5'-di-phenylphenyl]indenyl)$_2$zirconium dichloride;

dimethylsiladiyl(2-tert-butyl, 4-[3',5'-di-phenylphenyl]indenyl)$_2$zirconium dichloride;

dimethylsiladiyl(2-methyl, 4-[3',5'-di-phenylphenyl]indenyl)$_2$hafnium dichloride;

dimethylsiladiyl(2-ethyl, 4-[3',5'-di-phenylphenyl]indenyl)$_2$ hafnium dichloride;

dimethylsiladiyl(2-n-propyl, 4-[3',5'-di-phenylphenyl]indenyl)$_2$hafnium dichloride;

dimethylsiladiyl(2-iso-propyl, 4-[3',5'-di-phenylphenyl]indenyl)$_2$hafnium dichloride;

dimethylsiladiyl(2-n-butyl, 4-[3',5'-di-phenylphenyl]indenyl)$_2$hafnium dichloride;
dimethylsiladiyl(2-iso-butyl, 4-[3',5'-di-phenylphenyl]indenyl)$_2$hafnium dichloride;
dimethylsiladiyl(2-sec-butyl, 4-[3',5'-di-phenylphenyl]indenyl)$_2$hafnium dichloride;
dimethylsiladiyl(2-tert-butyl, 4-[3',5'-di-phenylphenyl]indenyl)$_2$hafnium dichloride;
9-silafluorendiyl(2-methyl, 4-[3',5'-di-phenylphenyl]indenyl)$_2$zirconium dichloride;
9-silafluorendiyl(2-ethyl, 4-[3',5'-di-phenylphenyl]indenyl)$_2$ zirconium dichloride;
9-silafluorendiyl(2-n-propyl, 4-[3',5'-di-phenylphenyl]indenyl)$_2$zirconium dichloride;
9-silafluorendiyl(2-iso-propyl, 4-[3',5'-di-phenylphenyl]indenyl)$_2$zirconium dichloride;
9-silafluorendiyl(2-n-butyl, 4-[3',5'-di-phenylphenyl]indenyl)$_2$zirconium dichloride;
9-silafluorendiyl(2-iso-butyl, 4-[3',5'-di-phenylphenyl]indenyl)$_2$zirconium dichloride;
9-silafluorendiyl(2-sec-butyl, 4-[3',5'-di-phenylphenyl]indenyl)$_2$zirconium dichloride;
9-silafluorendiyl(2-tert-butyl, 4-[3',5'-di-phenylphenyl]indenyl)$_2$zirconium dichloride;
9-silafluorendiyl(2-methyl, 4-[3',5'-di-phenylphenyl]indenyl)$_2$hafnium dichloride;
9-silafluorendiyl(2-ethyl, 4-[3',5'-di-phenylphenyl]indenyl)$_2$ hafnium dichloride;
9-silafluorendiyl(2-n-propyl, 4-[3',5'-di-phenylphenyl]indenyl)$_2$hafnium dichloride;
9-silafluorendiyl(2-iso-propyl, 4-[3',5'-di-phenylphenyl]indenyl)$_2$hafnium dichloride;
9-silafluorendiyl(2-n-butyl, 4-[3',5'-di-phenylphenyl]indenyl)$_2$hafnium dichloride;
9-silafluorendiyl(2-iso-butyl, 4-[3',5'-di-phenylphenyl]indenyl)$_2$hafnium dichloride;
9-silafluorendiyl(2-sec-butyl, 4-[3',5'-di-phenylphenyl]indenyl)$_2$hafnium dichloride;
9-silafluorendiyl(2-tert-butyl, 4-[3',5'-di-phenylphenyl]indenyl)$_2$hafnium dichloride;
dimethylsiladiyl(2-methyl, 4-[3',5'-di-phenylphenyl]indenyl)$_2$zirconium dimethyl;
dimethylsiladiyl(2-ethyl, 4-[3',5'-di-phenylphenyl]indenyl)$_2$ zirconium dimethyl;
dimethylsiladiyl(2-n-propyl, 4-[3',5'-di-phenylphenyl]indenyl)$_2$zirconium dimethyl;
dimethylsiladiyl(2-iso-propyl, 4-[3',5'-di-phenylphenyl]indenyl)$_2$zirconium dimethyl;
dimethylsiladiyl(2-n-butyl, 4-[3',5'-di-phenylphenyl]indenyl)$_2$zirconium dimethyl;
dimethylsiladiyl(2-iso-butyl, 4-[3',5'-di-phenylphenyl]indenyl)$_2$zirconium dimethyl;
dimethylsiladiyl(2-sec-butyl, 4-[3',5'-di-phenylphenyl]indenyl)$_2$zirconium dimethyl;
dimethylsiladiyl(2-tert-butyl, 4-[3',5'-di-phenylphenyl]indenyl)$_2$zirconium dimethyl;
dimethylsiladiyl(2-methyl, 4-[3',5'-di-phenylphenyl]indenyl)$_2$hafnium dimethyl;
dimethylsiladiyl(2-ethyl, 4-[3',5'-di-phenylphenyl]indenyl)$_2$ hafnium dimethyl;
dimethylsiladiyl(2-n-propyl, 4-[3',5'-di-phenylphenyl]indenyl)$_2$hafnium dimethyl;
dimethylsiladiyl(2-iso-propyl, 4-[3',5'-di-phenylphenyl]indenyl)$_2$hafnium dimethyl;
dimethylsiladiyl(2-n-butyl, 4-[3',5'-di-phenylphenyl]indenyl)$_2$hafnium dimethyl;
dimethylsiladiyl(2-iso-butyl, 4-[3',5'-di-phenylphenyl]indenyl)$_2$hafnium dimethyl;
dimethylsiladiyl(2-sec-butyl, 4-[3',5'-di-phenylphenyl]indenyl)$_2$hafnium dimethyl;
dimethylsiladiyl(2-tert-butyl, 4-[3',5'-di-phenylphenyl]indenyl)$_2$hafnium dimethyl;
9-silafluorendiyl(2-methyl, 4-[3',5'-di-phenylphenyl]indenyl)$_2$zirconium dimethyl;
9-silafluorendiyl(2-ethyl, 4-[3',5'-di-phenylphenyl]indenyl)$_2$ zirconium dimethyl;
9-silafluorendiyl(2-n-propyl, 4-[3',5'-di-phenylphenyl]indenyl)$_2$zirconium dimethyl;
9-silafluorendiyl(2-iso-propyl, 4-[3',5'-di-phenylphenyl]indenyl)$_2$zirconium dimethyl;
9-silafluorendiyl(2-n-butyl, 4-[3',5'-di-phenylphenyl]indenyl)$_2$zirconium dimethyl;
9-silafluorendiyl(2-iso-butyl, 4-[3',5'-di-phenylphenyl]indenyl)$_2$zirconium dimethyl;
9-silafluorendiyl(2-sec-butyl, 4-[3',5'-di-phenylphenyl]indenyl)$_2$zirconium dimethyl;
9-silafluorendiyl(2-tert-butyl, 4-[3',5'-di-phenylphenyl]indenyl)$_2$zirconium dimethyl;
9-silafluorendiyl(2-methyl, 4-[3',5'-di-phenylphenyl]indenyl)$_2$hafnium dimethyl;
9-silafluorendiyl(2-ethyl, 4-[3',5'-di-phenylphenyl]indenyl)$_2$ hafnium dichloride;
9-silafluorendiyl(2-n-propyl, 4-[3',5'-di-phenylphenyl]indenyl)$_2$hafnium dimethyl;
9-silafluorendiyl(2-iso-propyl, 4-[3',5'-di-phenylphenyl]indenyl)$_2$hafnium dimethyl;
9-silafluorendiyl(2-n-butyl, 4-[3',5'-di-phenylphenyl]indenyl)$_2$hafnium dimethyl;
9-silafluorendiyl(2-iso-butyl, 4-[3',5'-di-phenylphenyl]indenyl)$_2$hafnium dimethyl;
9-silafluorendiyl(2-sec-butyl, 4-[3',5'-di-phenylphenyl]indenyl)$_2$hafnium dimethyl;
9-silafluorendiyl(2-tert-butyl, 4-[3',5'-di-phenylphenyl]indenyl)$_2$hafnium dimethyl;
dimethylsiladiyl(2-methyl, 4-[3',5'-di-tbutylphenyl]indenyl)$_2$ $\eta^4$-1,4-diphenyl-1,3-butadiene;
dimethylsiladiyl(2-ethyl, 4-[3',5'-di-tbutylphenyl]indenyl)$_2$ $\eta^4$-1,4-diphenyl-1,3-butadiene;
dimethylsiladiyl(2-n-propyl, 4-[3',5'-di-tbutylphenyl]indenyl)$_2$ $\eta^4$-1,4-diphenyl-1,3-butadiene;
dimethylsiladiyl(2-iso-propyl, 4-[3',5'-di-tbutylphenyl]indenyl)$_2$ $\eta^4$-1,4-diphenyl-1,3-butadiene;
dimethylsiladiyl(2-n-butyl, 4-[3',5'-di-tbutylphenyl]indenyl)$_2$ $\eta^4$-1,4-diphenyl-1,3-butadiene;
dimethylsiladiyl(2-iso-butyl, 4-[3',5'-di-tbutylphenyl]indenyl)$_2$ $\eta^4$-diphenyl-1,3-butadiene;
dimethylsiladiyl(2-sec-butyl, 4-[3',5'-di-tbutylphenyl]indenyl)$_2$ $\eta^4$-1,4-diphenyl-1,3-butadiene;
dimethylsiladiyl(2-tert-butyl, 4-[3',5'-di-tbutylphenyl]indenyl)$_2$ $\eta^4$-1,4-diphenyl-1,3-butadiene;
dimethylsiladiyl(2-ethyl, 4-[3',5'-bis-trifluoromethylphenyl]indenyl)$_2$ $\eta^4$-1,4-diphenyl-1,3-butadiene;
dimethylsiladiyl(2-n-propyl, 4-[3',5'-bis-trifluoromethylphenyl]indenyl)$_2$ $\eta^4$-1,4-diphenyl -1,3-butadiene;
dimethylsiladiyl(2-iso-propyl, 4-[3',5'-bis-trifluoromethylphenyl]indenyl)$_2$ $\eta^4$-1,4-diphenyl-1,3-butadiene;
dimethylsiladiyl(2-n-butyl, 4-[3',5'-bis-trifluoromethylphenyl]indenyl)$_2$ $\eta^4$-1,4-diphenyl-1,3-butadiene;
dimethylsiladiyl(2-iso-butyl, 4-[3',5'-bis-trifluoromethylphenyl]indenyl)$_2$ $\eta^4$-1,4-diphenyl-1,3-butadiene;
dimethylsiladiyl(2-sec-butyl, 4-[3',5'-bis-trifluoromethylphenyl]indenyl)$_2$ $\eta^4$-1,4-diphenyl-1,3-butadiene;

dimethylsiladiyl(2-tert-butyl, 4-[3',5'-bis-trifluoromethylphenyl]indenyl)$_2$ $\eta^4$-1,4-diphenyl-1,3-butadiene;

dimethylsiladiyl(2-ethyl, 4-[3',5'-di-iso-propylphenyl]indenyl)$_2$ $\eta^4$-1,4-diphenyl-1,3-butadiene;

dimethylsiladiyl(2-n-propyl, 4-[3',5'-di-iso-propylphenyl]indenyl)$_2$ $\eta^4$-1,4diphenyl-1,3-butadiene;

dimethylsiladiyl(2-iso-propyl, 4-[3',5'-di-iso-propylphenyl]indenyl)$\eta^4$-1,4-diphenyl-1,3-butadiene;

dimethylsiladiyl(2-n-butyl, 4-[3',5'-di-iso-propylphenyl]indenyl)$_2$ $\eta^4$-1,4-diphenyl-1,3-butadiene;

dimethylsiladiyl(2-iso-butyl, 4-[3',5'-di-iso-propylphenyl]indenyl)$_2$ $\eta^4$-1,4-diphenyl-1,3-butadiene;

dimethylsiladiyl(2-sec-butyl, 4-[3',5'-di-iso-propylphenyl]indenyl)$_2$ $\eta^4$-1,4-diphenyl-1,3-butadiene;

dimethylsiladiyl(2-tert-butyl, 4-[3',5'-di-iso-propylphenyl]indenyl)$_2$ $\eta^4$-1,4-diphenyl-1,3-butadiene;

dimethylsiladiyl(2-methyl, 4-[3',5'-di-phenylphenyl]indenyl)$_2$ $\eta^4$-1,4-diphenyl-1,3-butadiene;

dimethylsiladiyl(2-ethyl, 4-[3',5'-di-phenylphenyl]indenyl)$_2$ $\eta^4$-1,4-diphenyl-1,3-butadiene;

dimethylsiladiyl(2-n-propyl, 4-[3',5'-di-phenylphenyl]indenyl)$_2$ $\eta^4$-1,4-diphenyl-1,3-butadiene;

dimethylsiladiyl(2-iso-propyl, 4-[3',5'-di-phenylphenyl]indenyl)$_2$ $\eta^4$-1,4-diphenyl-1,3-butadiene;

dimethylsiladiyl(2-n-butyl, 4-[3',5'-di-phenylphenyl]indenyl)$_2$ $\eta^4$-1,4-diphenyl-1,3-butadiene;

dimethylsiladiyl(2-iso-butyl, 4-[3',5'-di-phenylphenyl]indenyl)$_2$ $\eta^4$-1,4-diphenyl-1,3-butadiene;

dimethylsiladiyl(2-sec-butyl, 4-[3',5'-di-phenylphenyl]indenyl)$_2$ $\eta^4$-1,4-diphenyl-1,3-butadiene;

dimethylsiladiyl(2-tert-butyl, 4-[3',5'-di-phenylphenyl]indenyl)$_2$ $\eta^4$-1,4-diphenyl-1,3-butadiene; 9-silafluorendiyl(2-methyl, 4-[3',5'-di-tbutylphenyl]indenyl)$_2$ $\eta^4$-diphenyl-1,3-butadiene;

9-silafluorendiyl(2-ethyl, 4-[3',5'-di-tbutylphenyl]indenyl)$_2$ $\eta^4$-1,4-diphenyl-1,3-butadiene;

9-silafluorendiyl(2-n-propyl, 4-[3',5'-di-tbutylphenyl]indenyl)$_2$ $\eta^4$-1,4-diphenyl-1,3-butadiene;

9-silafluorendiyl(2-iso-propyl, 4-[3',5'-di-tbutylphenyl]indenyl)$_2$ $\eta^4$-1,4-diphenyl-1,3-butadiene;

9-silafluorendiyl(2-n-butyl, 4-[3',5'-di-tbutylphenyl]indenyl)$_2$ $\eta^4$-1,4-diphenyl-1,3-butadiene;

9-silafluorendiyl(2-iso-butyl, 4-[3',5'-di-tbutylphenyl]indenyl)$_2$ $\eta^4$-1,4-diphenyl-1,3-butadiene;

9-silafluorendiyl(2-sec-butyl, 4-[3',5'-di-tbutylphenyl]indenyl)$_2$ $\eta^4$-1,4-diphenyl-1,3-butadiene;

9-silafluorendiyl(2-tert-butyl, 4-[3',5'-di-tbutylphenyl]indenyl)$_2$ $\eta^4$-1,4-diphenyl-1,3-butadiene;

9-silafluorendiyl(2-ethyl, 4-[3',5'-bis-trifluoromethylphenyl]indenyl)$_2$ $\eta^4$-1,4-diphenyl-1,3-butadiene;

9-silafluorendiyl(2-n-propyl, 4-[3',5'-bis-trifluoromethylphenyl]indenyl)$_2$ $\eta^4$-1,4-diphenyl-1,3-butadiene;

9-silafluorendiyl(2-iso-propyl, 4-[3',5'-bis-trifluoromethylphenyl]indenyl)$_2$ $\eta^4$-1,4-diphenyl-1,3-butadiene;

9-silafluorendiyl(2-n-butyl, 4-[3',5'-bis-trifluoromethylphenyl]indenyl)$_2$ $\eta^4$-1,4-diphenyl-1,3-butadiene;

9-silafluorendiyl(2-iso-butyl, 4-[3',5'-bis-trifluoromethylphenyl]indenyl)$_2$ $\eta^4$-1,4-diphenyl-1,3-butadiene;

9-silafluorendiyl(2-sec-butyl, 4-[3',5'-bis-trifluoromethylphenyl]indenyl)$_2$ $\eta^4$-1,4-diphenyl-1,3-butadiene;

9-silafluorendiyl(2-tert-butyl, 4-[3',5'-bis-trifluoromethylphenyl]indenyl)$_2$ $\eta^4$-1,4-diphenyl-1,3-butadiene;

9-silafluorendiyl(2-ethyl, 4-[3',5'-di-iso-propylphenyl]indenyl)$_2$ $\eta^4$-1,4-diphenyl-1,3-butadiene;

9-silafluorendiyl(2-n-propyl, 4-[3',5'-di-iso-propylphenyl]indenyl)$_2$ $\eta^4$-1,4-diphenyl-1,3-butadiene;

9-silafluorendiyl(2-iso-propyl, 4-[3',5'-di-iso-propylphenyl]indenyl)$_2$ $\eta^4$-1,4-diphenyl-1,3-butadiene;

9-silafluorendiyl(2-n-butyl, 4-[3',5'-di-iso-propylphenyl]indenyl)$_2$ $\eta^4$-1,4-diphenyl-1,3-butadiene;

9-silafluorendiyl(2-iso-butyl, 4-[3',5'-di-iso-propylphenyl]indenyl)$_2$ $\eta^4$-1,4-diphenyl-1,3-butadiene;

9-silafluorendiyl(2-sec-butyl, 4-[3',5'-di-iso-propylphenyl]indenyl)$_2$ $\eta^4$-1,4-diphenyl-1,3-butadiene;

9-silafluorendiyl(2-tert-butyl, 4-[3',5'-di-iso-propylphenyl]indenyl)$_2$ $\eta^4$-1,4-diphenyl-1,3-butadiene;

9-silafluorendiyl(2-methyl, 4-[3',5'-di-phenylphenyl]indenyl)$_2$ $\eta^4$-1,4-diphenyl-1,3-butadiene;

9-silafluorendiyl(2-ethyl, 4-[3',5'-di-phenylphenyl]indenyl)$_2$ $\eta^4$-1,4-diphenyl-1,3-butadiene;

9-silafluorendiyl(2-n-propyl, 4-[3',5'-di-phenylphenyl]indenyl)$_2$ $\eta^4$-1,4-diphenyl-1,3-butadiene;

9-silafluorendiyl(2-iso-propyl, 4-[3',5'-di-phenylphenyl]indenyl)$_2$ $\eta^4$-1,4-diphenyl-1,3-butadiene;

9-silafluorendiyl(2-n-butyl, 4-[3',5'-di-phenylphenyl]indenyl)$_2$ $\eta^4$-1,4-diphenyl-1,3-butadiene;

9-silafluorendiyl(2-iso-butyl, 4-[3',5'-di-phenylphenyl]indenyl)$_2$ $\eta^4$-1,4-diphenyl-1,3-butadiene;

9-silafluorendiyl(2-sec-butyl, 4-[3',5'-di-phenylphenyl]indenyl)$_2$ $\eta^4$-1,4-diphenyl-1,3-butadiene;

9-silafluorendiyl(2-tert-butyl, 4-[3',5'-di-phenylphenyl]indenyl)$_2$ $\eta^4$-1,4-diphenyl-1,3-butadiene;

dimethylamidoborane(2-methyl, 4-[3',5'-di-tbutylphenyl]indenyl)$_2$zirconium dichloride;

dimethylamidoborane(2-ethyl, 4-[3',5'-di-tbutylphenyl]indenyl)$_2$zirconium dichloride;

dimethylamidoborane(2-n-propyl, 4-[3',5'-di-tbutylphenyl]indenyl)$_2$zirconium dichloride;

dimethylamidoborane(2-iso-propyl, 4-[3',5'-di-tbutylphenyl]indenyl)$_2$zirconium dichloride;

dimethylamidoborane(2-n-butyl, 4-[3',5'-di-tbutylphenyl]indenyl)$_2$zirconium dichloride;

dimethylamidoborane(2-iso-butyl, 4-[3',5'-di-tbutylphenyl]indenyl)$_2$zirconium dichloride;

dimethylamidoborane(2-sec-butyl, 4-[3',5'-di-tbutylphenyl]indenyl)$_2$zirconium dichloride;

dimethylamidoborane(2-tert-butyl, 4-[3',5'-di-tbutylphenyl]indenyl)$_2$zirconium dichloride;

dimethylamidoborane(2-ethyl, 4-[3',5'-bis-trifluoromethylphenyl]indenyl)$_2$zirconium dichloride;

dimethylamidoborane(2-n-propyl, 4-[3',5'-bis-trifluoromethylphenyl]indenyl)$_2$zirconium dichloride;

dimethylamidoborane(2-iso-propyl, 4-[3',5'-bis-trifluoromethylphenyl]indenyl)$_2$zirconium dichloride;

dimethylamidoborane(2-n-butyl, 4-[3',5'-bis-trifluoromethylphenyl]indenyl)$_2$zirconium dichloride;

dimethylamidoborane(2-iso-butyl, 4-[3',5'-bis-trifluoromethylphenyl]indenyl)$_2$zirconium dichloride;

dimethylamidoborane(2-sec-butyl, 4-[3',5'-bis-trifluoromethylphenyl]indenyl)$_2$zirconium dichloride;

dimethylamidoborane(2-tert-butyl, 4-[3',5'-bis-trifluoromethylphenyl]indenyl)$_2$zirconium dichloride;

dimethylamidoborane(2-ethyl, 4-[3',5'-di-iso-propylphenyl]indenyl)$_2$zirconium dichloride;

dimethylamidoborane(2-n-propyl, 4-[3',5'-di-iso-propylphenyl]indenyl)$_2$zirconium dichloride dimethylamidoborane(2-iso-propyl, 4-[3',5'-di-iso-propylphenyl]indenyl)$_2$zirconium dichloride;

dimethylamidoborane(2-n-butyl, 4-[3',5'-di-iso-propylphenyl]indenyl)$_2$zirconium dichloride;

dimethylamidoborane(2-iso-butyl, 4-[3',5'-di-iso-propylphenyl]indenyl)$_2$zirconium dichloride;

dimethylamidoborane(2-sec-butyl, 4-[3',5'-di-iso-propylphenyl]indenyl)$_2$zirconium dichloride;
dimethylamidoborane(2-tert-butyl, 4-[3',5'-di-iso-propylphenyl]indenyl)$_2$zirconium dichloride;
dimethylamidoborane(2-methyl, 4-[3',5'-di-phenylphenyl] indenyl)$_2$zirconium dichloride;
dimethylamidoborane(2-ethyl, 4-[3',5'-di-phenylphenyl]indenyl)$_2$zirconium dichloride;
dimethylamidoborane(2-n-propyl, 4-[3',5'-di-phenylphenyl] indenyl)$_2$zirconium dichloride;
dimethylamidoborane(2-iso-propyl, 4-[3',5'-di-phenylphenyl]indenyl)$_2$zirconium dichloride;
dimethylamidoborane(2-n-butyl, 4-[3',5'-di-phenylphenyl] indenyl)$_2$zirconium dichloride;
dimethylamidoborane(2-iso-butyl, 4-[3',5'-di-phenylphenyl] indenyl)$_2$zirconium dichloride;
dimethylamidoborane(2-sec-butyl, 4-[3',5'-di-phenylphenyl] indenyl)$_2$zirconium dichloride;
dimethylamidoborane(2-tert-butyl, 4-[3',5'-di-phenylphenyl]indenyl)$_2$zirconium dichloride;
dimethylamidoborane(2-methyl, 4-[3',5'-di-tbutylphenyl]indenyl)$_2$ $\eta^4$-1,4-diphenyl-1,3-butadiene;
dimethylamidoborane(2-ethyl, 4-[3',5'-di-tbutylphenyl]indenyl)$_2$ $\eta^4$-1,4-diphenyl-1,3-butadiene;
dimethylamidoborane(2-n-propyl, 4-[3',5'-di-tbutylphenyl] indenyl)$_2$ $\eta^4$-1,4-diphenyl-1,3-butadiene;
dimethylamidoborane(2-iso-propyl, 4-[3',5'-di-tbutylphenyl]indenyl)$_2$ $\eta^4$-1,4-diphenyl-1,3-butadiene;
dimethylamidoborane(2-n-butyl, 4-[3',5'-di-tbutylphenyl]indenyl)$_2$ $\eta^4$-1,4-diphenyl-1,3-butadiene;
dimethylamidoborane(2-iso-butyl, 4-[3',5'-di-tbutylphenyl] indenyl)$_2$ $\eta^4$-1,4-diphenyl-1,3-butadiene;
dimethylamidoborane(2-sec-butyl, 4-[3',5'-di-tbutylphenyl] indenyl)$_2$ $\eta^4$-1,4-diphenyl-1,3-butadiene;
dimethylamidoborane(2-tert-butyl, 4-[3',5'-di-tbutylphenyl] indenyl)$_2$ $\eta^4$-1,4-diphenyl-1,3-butadiene;
dimethylamidoborane(2-ethyl, 4-[3',5'-bis-trifluoromethylphenyl]indenyl)$_2$ $\eta^4$-1,4-diphenyl-1,3-butadiene;
dimethylamidoborane(2-n-propyl, 4-[3',5'-bis-trifluoromethylphenyl]indenyl)$_2$ $\eta^4$-1,4-diphenyl-1,3-butadiene;
dimethylamidoborane(2-iso-propyl, 4-[3',5'-bis-trifluoromethylphenyl]indenyl)$_2$ $\eta^4$-1,4-diphenyl-1,3-butadiene;
dimethylamidoborane(2-n-butyl, 4-[3',5'-bis-trifluoromethylphenyl]indenyl)$_2$ $\eta^4$-1,4-diphenyl-1,3-butadiene;
dimethylamidoborane(2-iso-butyl, 4-[3',5'-bis-trifluoromethylphenyl]indenyl)$_2$ $\eta^4$-1,4-diphenyl-1,3-butadiene;
dimethylamidoborane(2-sec-butyl, 4-[3',5'-bis-trifluoromethylphenyl]indenyl)$_2$ $\eta^4$-1,4-diphenyl-1,3-butadiene;
dimethylamidoborane(2-tert-butyl, 4-[3',5'-bis-trifluoromethylphenyl]indenyl)$_2$ $\eta^4$-1,4-diphenyl-1,3-butadiene;
dimethylamidoborane(2-ethyl, 4-[3',5'-di-iso-propylphenyl] indenyl)$_2$ $\eta^4$-1,4-diphenyl-1,3-butadiene;
dimethylamidoborane(2-n-propyl, 4-[3',5'-di-iso-propylphenyl]indenyl)$_2$ $\eta^4$-1,4-diphenyl-1,3-butadiene;
dimethylamidoborane(2-iso-propyl, 4-[3',5'-di-iso-propylphenyl]indenyl)$_2$ $\eta^4$-1,4-diphenyl-1,3-butadiene;
dimethylamidoborane(2-n-butyl, 4-[3',5'-di-iso-propylphenyl]indenyl)$_2$ $\eta^4$-1,4-diphenyl-1,3-butadiene;
dimethylamidoborane(2-iso-butyl, 4-[3',5'-di-iso-propylphenyl]indenyl)$_2$ $\eta^4$-1,4-diphenyl-1,3-butadiene;
dimethylamidoborane(2-sec-butyl, 4-[3',5'-di-iso-propylphenyl]indenyl)$_2$ $\eta^4$-1,4-diphenyl-1,3-butadiene;
dimethylamidoborane(2-tert-butyl, 4-[3',5'-di-iso-propylphenyl]indenyl)$_2$ $\eta^4$-1,4-diphenyl-1,3-butadiene;
dimethylamidoborane(2-methyl, 4-[3',5'-di-phenylphenyl] indenyl)$_2$ $\eta^4$-1,4-diphenyl-1,3-butadiene;
dimethylamidoborane(2-ethyl, 4-[3',5'-di-phenylphenyl]indenyl)$_2$ $\eta^4$-1,4-diphenyl-1,3-butadiene;
dimethylamidoborane(2-n-propyl, 4-[3',5'-di-phenylphenyl] indenyl)$_2$ $\eta^4$-1,4-diphenyl-1,3-butadiene;
dimethylamidoborane(2-iso-propyl, 4-[3',5'-di-phenylphenyl]indenyl)$_2$ $\eta^4$-1,4-diphenyl-1,3-butadiene;
dimethylamidoborane(2-n-butyl, 4-[3',5'-di-phenylphenyl] indenyl)$_2$ $\eta^4$-1,4-diphenyl-1,3-butadiene;
dimethylamidoborane(2-iso-butyl, 4-[3',5'-di-phenylphenyl] indenyl)$_2$ $\eta^4$-1,4-diphenyl-1,3-butadiene;
dimethylamidoborane(2-sec-butyl, 4-[3',5'-di-phenylphenyl] indenyl)$_2$ $\eta^4$-1,4-diphenyl-1,3-butadiene;
dimethylamidoborane(2-tert-butyl, 4-[3',5'-di-phenylphenyl]indenyl)$_2$ $\eta^4$-1,4-diphenyl-1,3-butadiene;
dimethylamidoborane(2-methyl, 4-[3',5'-di-tbutylphenyl]indenyl)$_2$ zirconium dimethyl;
dimethylamidoborane(2-ethyl, 4-[3',5'-di-tbutylphenyl]indenyl)$_2$zirconium dimethyl;
dimethylamidoborane(2-n propyl, 4-[3',5'-di-tbutylphenyl] indenyl)$_2$zirconium dimethyl;
dimethylamidoborane(2-iso-propyl, 4-[3',5'-di-tbutylphenyl]indenyl)$_2$zirconium dimethyl;
dimethylamidoborane(2-n-butyl, 4-[3',5'-di-tbutylphenyl]indenyl)$_2$zirconium dimethyl;
dimethylamidoborane(2-iso-butyl, 4-[3',5'-di-tbutylphenyl] indenyl)$_2$zirconium dimethyl;
dimethylamidoborane(2-sec-butyl, 4-[3',5'-di-tbutylphenyl] indenyl)$_2$zirconium dimethyl;
dimethylamidoborane(2-tert-butyl, 4-[3',5'-di-tbutylphenyl] indenyl)$_2$zirconium dimethyl;
dimethylamidoborane(2-ethyl, 4-[3',5'-bis-trifluoromethylphenyl]indenyl)$_2$zirconium dimethyl;
dimethylamidoborane(2-n-propyl, 4-[3',5'-bis-trifluoromethylphenyl]indenyl)$_2$zirconium dimethyl;
dimethylamidoborane(2-iso-propyl, 4-[3',5'-bis-trifluoromethylphenyl]indenyl)$_2$zirconium dimethyl;
dimethylamidoborane(2-n-butyl, 4-[3',5'-bis-trifluoromethylphenyl]indenyl)$_2$zirconium dimethyl;
dimethylamidoborane(2-iso-butyl, 4-[3',5'-bis-trifluoromethylphenyl]indenyl)$_2$zirconium dimethyl;
dimethylamidoborane(2-sec-butyl, 4-[3',5'-bis-trifluoromethylphenyl]indenyl)$_2$zirconium dimethyl;
dimethylamidoborane(2-tert-butyl, 4-[3',5'-bis-trifluoromethylphenyl]indenyl)$_2$zirconium dimethyl;
dimethylamidoborane(2-ethyl, 4-[3',5'-di-iso-propylphenyl] indenyl)$_2$zirconium dimethyl;
dimethylamidoborane(2-n-propyl, 4-[3',5'-di-iso-propylphenyl]indenyl)$_2$zirconium dimethyl
dimethylamidoborane(2-iso-propyl, 4-[3',5'-di-iso-propylphenyl]indenyl)$_2$zirconium dimethyl;
dimethylamidoborane(2-n-butyl, 4-[3',5'-di-iso-propylphenyl]indenyl)$_2$zirconium dimethyl;
dimethylamidoborane(2-iso-butyl, 4-[3',5'-di-iso-propylphenyl]indenyl)$_2$zirconium dimethyl;
dimethylamidoborane(2-sec-butyl, 4-[3',5'-di-iso-propylphenyl]indenyl)$_2$zirconium dimethyl;
dimethylamidoborane(2-tert-butyl, 4-[3',5'-di-iso-propylphenyl]indenyl)$_2$zirconium dimethyl;
dimethylamidoborane(2-methyl, 4-[3',5'-di-phenylphenyl] indenyl)$_2$zirconium dimethyl;
dimethylamidoborane(2-ethyl, 4-[3',5'-di-phenylphenyl]indenyl)$_2$zirconium dimethyl;
dimethylamidoborane(2-n-propyl, 4-[3',5'-di-phenylphenyl] indenyl)$_2$zirconium dimethyl;
dimethylamidoborane(2-iso-propyl, 4-[3',5'-di-phenylphenyl]indenyl)$_2$zirconium dimethyl;

dimethylamidoborane(2-n-butyl, 4-[3',5'-di-phenylphenyl] indenyl)$_2$zirconium dimethyl;
dimethylamidoborane(2-iso-butyl, 4-[3',5'-di-phenylphenyl] indenyl)$_2$zirconium dimethyl;
dimethylamidoborane(2-sec-butyl, 4-[3',5'-di-phenylphenyl] indenyl)$_2$zirconium dimethyl;
dimethylamidoborane(2-tert-butyl, 4-[3',5'-di-phenylphenyl]indenyl)$_2$zirconium dimethyl;
diisopropylamidoborane(2-methyl, 4-[3',5'-di-tbutylphenyl] indenyl)$_2$zirconium dichloride;
diisopropylamidoborane(2-ethyl, 4-[3',5'-di-tbutylphenyl] indenyl)$_2$zirconium dichloride;
diisopropylamidoborane(2-n-propyl, 4-[3',5'-di-tbutylphenyl]indenyl)$_2$zirconium dichloride;
diisopropylamidoborane(2-iso-propyl, 4-[3',5'-di-tbutylphenyl]indenyl)$_2$zirconium dichloride;
diisopropylamidoborane(2-n-butyl, 4-[3',5'-di-tbutylphenyl] indenyl)$_2$zirconium dichloride;
diisopropylamidoborane(2-iso-butyl, 4-[3',5'-di-tbutylphenyl]indenyl)$_2$zirconium dichloride;
diisopropylamidoborane(2-sec-butyl, 4-[3',5'-di-tbutylphenyl]indenyl)$_2$zirconium dichloride;
diisopropylamidoborane(2-tert-butyl, 4-[3',5'-di-tbutylphenyl]indenyl)$_2$zirconium dichloride;
diisopropylamidoborane(2-ethyl, 4-[3',5'-bis-trifluoromethylphenyl]indenyl)$_2$zirconium dichloride;
diisopropylamidoborane(2-n-propyl, 4-[3',5'-bis-trifluoromethylphenyl]indenyl)$_2$zirconium dichloride;
diisopropylamidoborane(2-iso-propyl, 4-[3',5'-bis-trifluoromethylphenyl]indenyl)$_2$zirconium dichloride;
diisopropylamidoborane(2-n-butyl, 4-[3',5'-bis-trifluoromethylphenyl]indenyl)$_2$zirconium dichloride;
diisopropylamidoborane(2-iso-butyl, 4-[3',5'-bis-trifluoromethylphenyl]indenyl)$_2$zirconium dichloride;
diisopropylamidoborane(2-sec-butyl, 4-[3',5'-bis-trifluoromethylphenyl]indenyl)$_2$zirconium dichloride;
diisopropylamidoborane(2-tert-butyl, 4-[3',5'-bis-trifluoromethylphenyl]indenyl)$_2$zirconium dichloride;
diisopropylamidoborane(2-ethyl, 4-[3',5'-di-iso-propylphenyl]indenyl)$_2$zirconium dichloride;
diisopropylamidoborane(2-n-propyl, 4-[3',5'-di-iso-propylphenyl]indenyl)$_2$zirconium dichloride
diisopropylamidoborane(2-iso-propyl, 4-[3',5'-di-iso-propylphenyl]indenyl)$_2$zirconium dichloride;
diisopropylamidoborane(2-n-butyl, 4-[3',5'-di-iso-propylphenyl]indenyl)$_2$zirconium dichloride;
diisopropylamidoborane(2-iso-butyl, 4-[3',5'-di-iso-propylphenyl]indenyl)$_2$zirconium dichloride;
diisopropylamidoborane(2-sec-butyl, 4-[3',5'-di-iso-propylphenyl]indenyl)$_2$zirconium dichloride;
diisopropylamidoborane(2-tert-butyl, 4-[3',5'-di-iso-propylphenyl]indenyl)$_2$zirconium dichloride;
diisopropylamidoborane(2-methyl, 4-[3',5'-di-phenylphenyl]indenyl)$_2$zirconium dichloride;
diisopropylamidoborane(2-ethyl, 4-[3',5'-di-phenylphenyl] indenyl)$_2$zirconium dichloride;
diisopropylamidoborane(2-n-propyl, 4-[3',5'-di-phenylphenyl]indenyl)$_2$zirconium dichloride;
diisopropylamidoborane(2-iso-propyl, 4-[3',5'-di-phenylphenyl]indenyl)$_2$zirconium dichloride;
diisopropylamidoborane(2-n-butyl, 4-[3',5'-di-phenylphenyl]indenyl)$_2$zirconium dichloride;
diisopropylamidoborane(2-iso-butyl, 4-[3',5'-di-phenylphenyl]indenyl)$_2$zirconium dichloride;
diisopropylamidoborane(2-sec-butyl, 4-[3',5'-di-phenylphenyl]indenyl)$_2$zirconium dichloride;
diisopropylamidoborane(2-tert-butyl, 4-[3',5'-di-phenylphenyl]indenyl)$_2$zirconium dichloride;
diisopropylamidoborane(2-methyl, 4-[3',5'-di-tbutylphenyl] indenyl)$_2$ $\eta^4$-1,4-diphenyl-1,3-butadiene;
diisopropylamidoborane(2-ethyl, 4-[3',5'-di-tbutylphenyl] indenyl)$_2$ $\eta^4$-1,4-diphenyl-1,3-butadiene;
diisopropylamidoborane(2-n-propyl, 4-[3',5'-di-tbutylphenyl]indenyl)$_2$ $\eta^4$-1,4-diphenyl-1,3-butadiene;
diisopropylamidoborane(2-iso-propyl, 4-[3',5'-di-tbutylphenyl]indenyl)$_2$ $\eta^4$-1,4-diphenyl-1,3-butadiene;
diisopropylamidoborane(2-n-butyl, 4-[3',5'-di-tbutylphenyl] indenyl)$_2$ $\eta^4$-1,4-diphenyl-1,3-butadiene;
diisopropylamidoborane(2-iso-butyl, 4-[3',5'-di-tbutylphenyl]indenyl)$_2$ $\eta^4$-1,4-diphenyl-1,3-butadiene;
diisopropylamidoborane(2-sec-butyl, 4-[3',5'-di-tbutylphenyl]indenyl)$_2$ $\eta^4$-1,4-diphenyl-1,3-butadiene;
diisopropylamidoborane(2-tert-butyl, 4-[3',5'-di-tbutylphenyl]indenyl)$_2$ $\eta^4$-1,4-diphenyl-1,3-butadiene;
diisopropylamidoborane(2-ethyl, 4-[3',5'-bis-trifluoromethylphenyl]indenyl)$_2$ $\eta^4$-1,4_ -diphenyl-1,3-butadiene;
diisopropylamidoborane(2-n-propyl, 4-[3',5'-bis-trifluoromethylphenyl]indenyl)$_2$ $\eta^4$-1,4-diphenyl-1,3-butadiene;
diisopropylamidoborane(2-iso-propyl, 4-[3',5'-bis-trifluoromethylphenyl]indenyl)$_2$ $\eta^4$-1,4-diphenyl-1,3-butadiene;
diisopropylamidoborane(2-n-butyl, 4-[3',5'-bis-trifluoromethylphenyl]indenyl)$_2$ $\eta^4$-1,4-diphenyl-1,3-butadiene;
diisopropylamidoborane(2-iso-butyl, 4-[3',5'-bis-trifluoromethylphenyl]indenyl)$_2$ $\eta^4$-1,4-diphenyl-1,3-butadiene;
diisopropylamidoborane(2-sec-butyl, 4-[3',5'-bis-trifluoromethylphenyl]indenyl)$_2$ $\eta^4$-1,4-diphenyl-1,3-butadiene;
diisopropylamidoborane(2-tert-butyl, 4-[3',5'-bis-trifluoromethylphenyl]indenyl)$_2$ $\eta^4$-1,4-diphenyl-1,3-butadiene;
diisopropylamidoborane(2-ethyl, 4-[3',5'-di-iso-propylphenyl]indenyl)$_2$ $\eta^4$-1,4-diphenyl-1,3-butadiene;
diisopropylamidoborane(2-n-propyl, 4-[3',5'-di-iso-propylphenyl]indenyl)$_2$ $\eta^4$-1,4-diphenyl-1,3-butadiene;
diisopropylamidoborane(2-iso-propyl, 4-[3',5'-di-iso-propylphenyl]indenyl)$_2$ $\eta^4$-1,4-diphenyl-1,3-butadiene;
diisopropylamidoborane(2-n-butyl, 4-[3',5'-di-iso-propylphenyl]indenyl)$_2$ $\eta^4$-1,4-diphenyl-1,3-butadiene;
diisopropylamidoborane(2-iso-butyl, 4-[3',5'-di-iso-propylphenyl]indenyl)$_2$ $\eta^4$-1,4-diphenyl-1,3-butadiene;
diisopropylamidoborane(2-sec-butyl, 4-[3',5'-di-iso-propylphenyl]indenyl)$_2$ $\eta^4$-1,4-diphenyl-1,3-butadiene;
diisopropylamidoborane(2-tert-butyl, 4-[3',5'-di-iso-propylphenyl]indenyl)$_2$ $\eta^4$-1,4-diphenyl-1,3-butadiene;
diisopropylamidoborane(2-methyl, 4-[3',5'-di-phenylphenyl]indenyl)$_2$ $\eta^4$-1,4-diphenyl-1,3-butadiene;
diisopropylamidoborane(2-ethyl, 4-[3',5'-di-phenylphenyl] indenyl)$_2$ $\eta^4$-1,4-diphenyl-1,3-butadiene;
diisopropylamidoborane(2-n-propyl, 4-[3',5'-di-phenylphenyl]indenyl)$_2$ $\eta^4$-1,4-diphenyl-1,3-butadiene;
diisopropylamidoborane(2-iso-propyl, 4-[3',5'-di-phenylphenyl]indenyl)$_2$ $\eta^4$-1,4-diphenyl-1,3-butadiene;
diisopropylamidoborane(2-n-butyl, 4-[3',5'-di-phenylphenyl]indenyl)$_2$ $\eta^4$-1,4-diphenyl-1,3-butadiene;
diisopropylamidoborane(2-iso-butyl, 4-[3',5'-di-phenylphenyl]indenyl)$_2$ $\eta^4$-1,4-diphenyl-1,3-butadiene;
diisopropylamidoborane(2-sec-butyl, 4-[3',5'-di-phenylphenyl]indenyl)$_2$ $\eta^4$-1,4-diphenyl-1,3-butadiene;
diisopropylamidoborane(2-tert-butyl, 4-[3',5'-di-phenylphenyl]indenyl)$_2$ $\eta^4$-1,4-diphenyl-1,3-butadiene;
diisopropylamidoborane(2-methyl, 4-[3',5'-di-tbutylphenyl] indenyl)$_2$zirconium dimethyl;
diisopropylamidoborane(2-ethyl, 4-[3',5'-di-tbutylphenyl] indenyl)$_2$zirconium dimethyl;

diisopropylamidoborane(2-n-propyl, 4-[3',5'-di-tbutylphenyl]indenyl)$_2$zirconium dimethyl;

diisopropylamidoborane(2-iso-propyl, 4-[3',5'-di-tbutylphenyl]indenyl)$_2$zirconium dimethyl;

diisopropylamidoborane(2-n-butyl, 4-[3',5'-di-tbutylphenyl]indenyl)$_2$zirconium dimethyl;

diisopropylamidoborane(2-iso-butyl, 4-[3',5'-di-tbutylphenyl]indenyl)$_2$zirconium dimethyl;

diisopropylamidoborane(2-sec-butyl, 4-[3',5'-di-tbutylphenyl]indenyl)$_2$zirconium dimethyl;

diisopropylamidoborane(2-tert-butyl, 4-[3',5'-di-tbutylphenyl]indenyl)$_2$zirconium dimethyl;

diisopropylamidoborane(2-ethyl, 4-[3',5'-bis-trifluoromethylphenyl]indenyl)$_2$zirconium dimethyl;

diisopropylamidoborane(2-n-propyl, 4-[3',5'-bis-trifluoromethylphenyl]indenyl)$_2$zirconium dimethyl;

diisopropylamidoborane(2-iso-propyl, 4-[3',5'-bis-trifluoromethylphenyl]indenyl)$_2$zirconium dimethyl;

diisopropylamidoborane(2-n-butyl, 4-[3',5'-bis-trifluoromethylphenyl]indenyl)$_2$zirconium dimethyl;

diisopropylamidoborane(2-iso-butyl, 4-[3',5'-bis-trifluoromethylphenyl]indenyl)$_2$zirconium dimethyl;

diisopropylamidoborane(2-sec-butyl, 4-[3',5'-bis-trifluoromethylphenyl]indenyl)$_2$zirconium dimethyl;

diisopropylamidoborane(2-tert-butyl, 4-[3',5'-bis-trifluoromethylphenyl]indenyl)$_2$zirconium dimethyl;

diisopropylamidoborane(2-ethyl, 4-[3',5'-di-iso-propylphenyl]indenyl)$_2$zirconium dimethyl;

diisopropylamidoborane(2-n-propyl, 4-[3',5'-di-iso-propylphenyl]indenyl)$_2$zirconium dimethyl diisopropylamidoborane(2-iso-propyl, 4-[3',5'-di-iso-propylphenyl]indenyl)$_2$zirconium dimethyl;

diisopropylamidoborane(2-n-butyl, 4-[3',5'-di-iso-propylphenyl]indenyl)$_2$zirconium dimethyl;

diisopropylamidoborane(2-iso-butyl, 4-[3',5'-di-iso-propylphenyl]indenyl)$_2$zirconium dimethyl;

diisopropylamidoborane(2-sec-butyl, 4-[3',5'-di-iso-propylphenyl]indenyl)$_2$zirconium dimethyl;

diisopropylamidoborane(2-tert-butyl, 4-[3',5'-di-iso-propylphenyl]indenyl)$_2$zirconium dimethyl;

diisopropylamidoborane(2-methyl, 4-[3',5'-di-phenylphenyl]indenyl)$_2$zirconium dimethyl;

diisopropylamidoborane(2-ethyl, 4-[3',5'-di-phenylphenyl]indenyl)$_2$zirconium dimethyl;

diisopropylamidoborane(2-n-propyl, 4-[3',5'-di-phenylphenyl]indenyl)$_2$zirconium dimethyl;

diisopropylamidoborane(2-iso-propyl, 4-[3',5'-di-phenylphenyl]indenyl)$_2$zirconium dimethyl;

diisopropylamidoborane(2-n-butyl, 4-[3',5'-di-phenylphenyl]indenyl)$_2$zirconium dimethyl;

diisopropylamidoborane(2-iso-butyl, 4-[3',5'-di-phenylphenyl]indenyl)$_2$zirconium dimethyl;

diisopropylamidoborane(2-sec-butyl, 4-[3',5'-di-phenylphenyl]indenyl)$_2$zirconium dimethyl;

diisopropylamidoborane(2-tert-butyl, 4-[3',5'-di-phenylphenyl]indenyl)$_2$zirconium dimethyl;

bis(trimethylsilyl)amidoborane(2-methyl, 4-[3',5'-di-tbutylphenyl]indenyl)$_2$zirconium dichloride;

bis(trimethylsilyl)amidoborane(2-ethyl, 4-[3',5'-di-tbutylphenyl]indenyl)$_2$zirconium dichloride;

bis(trimethylsilyl)amidoborane(2-n-propyl, 4-[3',5'-di-tbutylphenyl]indenyl)$_2$zirconium dichloride;

bis(trimethylsilyl)amidoborane(2-iso-propyl, 4-[3',5'-di-tbutylphenyl]indenyl)$_2$zirconium dichloride;

bis(trimethylsilyl)amidoborane(2-n-butyl, 4-[3',5'-di-tbutylphenyl]indenyl)$_2$zirconium dichloride;

bis(trimethylsilyl)amidoborane(2-iso-butyl, 4-[3',5'-di-tbutylphenyl]indenyl)$_2$zirconium dichloride;

bis(trimethylsilyl)amidoborane(2-sec-butyl, 4-[3',5'-di-tbutylphenyl]indenyl)$_2$zirconium dichloride;

bis(trimethylsilyl)amidoborane(2-tert-butyl, 4-[3',5'-di-tbutylphenyl]indenyl)$_2$zirconium dichloride;

bis(trimethylsilyl)amidoborane(2-ethyl, 4-[3',5'-bis-trifluoromethylphenyl]indenyl)$_2$zirconium dichloride;

bis(trimethylsilyl)amidoborane(2-n-propyl, 4-[3',5'-bis-trifluoromethylphenyl]indenyl)$_2$zirconium dichloride;

bis(trimethylsilyl)amidoborane(2-iso-propyl, 4-[3',5'-bis-trifluoromethylphenyl]indenyl)$_2$zirconium dichloride;

bis(trimethylsilyl)amidoborane(2-n-butyl, 4-[3',5'-bis-trifluoromethylphenyl]indenyl)$_2$zirconium dichloride;

bis(trimethylsilyl)amidoborane(2-iso-butyl, 4-[3',5'-bis-trifluoromethylphenyl]indenyl)$_2$zirconium dichloride;

bis(trimethylsilyl)amidoborane(2-sec-butyl, 4-[3',5'-bis-trifluoromethylphenyl]indenyl)$_2$zirconium dichloride;

bis(trimethylsilyl)amidoborane(2-tert-butyl, 4-[3',5'-bis-trifluoromethylphenyl]indenyl)$_2$zirconium dichloride;

bis(trimethylsilyl)amidoborane(2-ethyl, 4-[3',5'-di-iso-propylphenyl]indenyl)$_2$zirconium dichloride;

bis(trimethylsilyl)amidoborane(2-n-propyl, 4-[3',5'-di-iso-propylphenyl]indenyl)$_2$zirconium dichloride;

bis(trimethylsilyl)amidoborane(2-iso-propyl, 4-[3',5'-di-iso-propylphenyl]indenyl)$_2$zirconium dichloride;

bis(trimethylsilyl)amidoborane(2-n-butyl, 4-[3',5'-di-iso-propylphenyl]indenyl)$_2$zirconium dichloride;

bis(trimethylsilyl)amidoborane(2-iso-butyl, 4-[3',5'-di-iso-propylphenyl]indenyl)$_2$zirconium dichloride;

bis(trimethylsilyl)amidoborane(2-sec-butyl, 4-[3',5'-di-iso-propylphenyl]indenyl)$_2$zirconium dichloride;

bis(trimethylsilyl)amidoborane(2-tert-butyl, 4-[3',5'-di-iso-propylphenyl]indenyl)$_2$zirconium dichloride;

bis(trimethylsilyl)amidoborane(2-methyl, 4-[3',5'-di-phenylphenyl]indenyl)$_2$zirconium dichloride;

bis(trimethylsilyl)amidoborane(2-ethyl, 4-[3',5'-di-phenylphenyl]indenyl)$_2$zirconium dichloride;

bis(trimethylsilyl)amidoborane(2-n-propyl, 4-[3',5'-di-phenylphenyl]indenyl)$_2$zirconium dichloride;

bis(trimethylsilyl)amidoborane(2-iso-propyl, 4-[3',5'-di-phenylphenyl]indenyl)$_2$zirconium dichloride;

bis(trimethylsilyl)amidoborane(2-n-butyl, 4-[3',5'-di-phenylphenyl]indenyl)$_2$zirconium dichloride;

bis(trimethylsilyl)amidoborane(2-iso-butyl, 4-[3',5'-di-phenylphenyl]indenyl)$_2$zirconium dichloride;

bis(trimethylsilyl)amidoborane(2-sec-butyl, 4-[3',5'-di-phenylphenyl]indenyl)$_2$zirconium dichloride;

bis(trimethylsilyl)amidoborane(2-tert-butyl, 4-[3',5'-di-phenylphenyl]indenyl)$_2$zirconium dichloride;

bis(trimethylsilyl)amidoborane(2-methyl, 4-[3',5'-di-tbutylphenyl]indenyl)$_2$ $\eta^4$-1,4-diphenyl-1,3-butadiene;

bis(trimethylsilyl)amidoborane(2-ethyl, 4-[3',5'-di-tbutylphenyl]indenyl)$_2$ $\eta^4$-1,4-diphenyl-1,3-butadiene;

bis(trimethylsilyl)amidoborane(2-n-propyl, 4-[3',5'-di-tbutylphenyl]indenyl)$_2$ $\eta^4$-1,4-diphenyl-1,3-butadiene;

bis(trimethylsilyl)amidoborane(2-iso-propyl, 4-[3',5'-di-tbutylphenyl]indenyl)$_2$ $\eta^4$-1,4-diphenyl-1,3-butadiene;

bis(trimethylsilyl)amidoborane(2-n-butyl, 4-[3',5'-di-tbutylphenyl]indenyl)$_2$ $\eta^4$-1,4-diphenyl-1,3-butadiene;

bis(trimethylsilyl)amidoborane(2-iso-butyl, 4-[3',5'-di-tbutylphenyl]indenyl)$_2$ $\eta^4$-1,4-diphenyl-1,3-butadiene;

bis(trimethylsilyl)amidoborane(2-sec-butyl, 4-[3',5'-di-tbutylphenyl]indenyl)$_2$ $\eta^4$-1,4-diphenyl-1,3-butadiene;

bis(trimethylsilyl)amidoborane(2-tert-butyl, 4-[3',5'-di-tbutylphenyl]indenyl)$_2$ $\eta^4$-1,4-diphenyl-1,3-butadiene;

bis(trimethylsilyl)amidoborane(2-ethyl, 4-[3',5'-bis-trifluoromethylphenyl]indenyl)$_2$ $\eta^4$-1,4-diphenyl-1,3-butadiene;

bis(trimethylsilyl)amidoborane(2-n-propyl, 4-[3',5'-bis-trifluoromethylphenyl]indenyl)$_2$ $\eta^4$-1,4-diphenyl-1,3-butadiene;

bis(trimethylsilyl)amidoborane(2-iso-propyl, 4-[3',5'-bis-trifluoromethylphenyl]indenyl)$_2$ $\eta^4$-1,4-diphenyl-1,3-butadiene;

bis(trimethylsilyl)amidoborane(2-n-butyl, 4-[3',5'-bis-trifluoromethylphenyl]indenyl)$_2$ $\eta^4$-1,4-diphenyl-1,3-butadiene;

bis(trimethylsilyl)amidoborane(2-iso-butyl, 4-[3',5'-bis-trifluoromethylphenyl]indenyl)$_2$ $\eta^4$-1,4-diphenyl-1,3-butadiene;

bis(trimethylsilyl)amidoborane(2-sec-butyl, 4-[3',5'-bis-trifluoromethylphenyl]indenyl)$_2$ $\eta^4$-1,4-diphenyl-1,3-butadiene;

bis(trimethylsilyl)amidoborane(2-tert-butyl, 4-[3',5'-bis-trifluoromethylphenyl]indenyl)$_2$ $\eta^4$-1,4-diphenyl-1,3-butadiene;

bis(trimethylsilyl)amidoborane(2-ethyl, 4-[3',5'-di-iso-propylphenyl]indenyl)$_2$ $\eta^4$-1,4-diphenyl-1,3-butadiene;

bis(trimethylsilyl)amidoborane(2-n-propyl, 4-[3',5'-di-iso-propylphenyl]indenyl)$_2$ $\eta^4$-1,4-diphenyl-1,3-butadiene;

bis(trimethylsilyl)amidoborane(2-iso-propyl, 4-[3',5'-di-iso-propylphenyl]indenyl)$_2$ $\eta^4$-1,4-diphenyl-1,3-butadiene;

bis(trimethylsilyl)amidoborane(2-n-butyl, 4-[3',5'-di-iso-propylphenyl]indenyl)$_2$ $\eta^4$-1,4-diphenyl-1,3-butadiene;

bis(trimethylsilyl)amidoborane(2-iso-butyl, 4-[3',5'-di-iso-propylphenyl]indenyl)$_2$ $\eta^4$-1,4-diphenyl-1,3-butadiene;

bis(trimethylsilyl)amidoborane(2-sec-butyl, 4-[3',5'-di-iso-propylphenyl]indenyl)$_2$ $\eta^4$-1,4-diphenyl-1,3-butadiene;

bis(trimethylsilyl)amidoborane(2-tert-butyl, 4-[3',5'-di-iso-propylphenyl]indenyl)$_2$ $\eta^4$-1,4-diphenyl-1,3-butadiene;

bis(trimethylsilyl)amidoborane(2-methyl, 4-[3',5'-di-phenylphenyl]indenyl)$_2$ $\eta^4$-1,4-diphenyl-1,3-butadiene;

bis(trimethylsilyl)amidoborane(2-ethyl, 4-[3',5'-di-phenylphenyl]indenyl)$_2$ $\eta^4$-1,4-diphenyl-1,3-butadiene;

bis(trimethylsilyl)amidoborane(2-n-propyl, 4-[3',5'-di-phenylphenyl]indenyl)$_2$ $\eta^4$-1,4-diphenyl-1,3-butadiene;

bis(trimethylsilyl)amidoborane(2-iso-propyl, 4-[3',5'-di-phenylphenyl]indenyl)$_2$ $\eta^4$-1,4-diphenyl-1,3-butadiene;

bis(trimethylsilyl)amidoborane(2-n-butyl, 4-[3',5'-di-phenylphenyl]indenyl)$_2$ $\eta^4$-1,4-diphenyl-1,3-butadiene;

bis(trimethylsilyl)amidoborane(2-iso-butyl, 4-[3',5'-di-phenylphenyl]indenyl)$_2$ $\eta^4$-1,4-diphenyl-1,3-butadiene;

bis(trimethylsilyl)amidoborane(2-sec-butyl, 4-[3',5'-di-phenylphenyl]indenyl)$_2$ $\eta^4$-1,4-diphenyl-1,3-butadiene;

bis(trimethylsilyl)amidoborane(2-tert-butyl, 4-[3',5'-di-phenylphenyl]indenyl)$_2$ $\eta^4$-1,4-diphenyl-1,3-butadiene;

bis(trimethylsilyl)amidoborane(2-methyl, 4-[3',5'-di-tbutylphenyl]indenyl)$_2$zirconium dimethyl;

bis(trimethylsilyl)amidoborane(2-ethyl, 4-[3',5'-di-tbutylphenyl]indenyl)$_2$zirconium dimethyl;

bis(trimethylsilyl)amidoborane(2-n-propyl, 4-[3',5'-di-tbutylphenyl]indenyl)$_2$zirconium dimethyl;

bis(trimethylsilyl)amidoborane(2-iso-propyl, 4-[3',5'-di-tbutylphenyl]indenyl)$_2$zirconium dimethyl;

bis(trimethylsilyl)amidoborane(2-n-butyl, 4-[3',5'-di-tbutylphenyl]indenyl)$_2$zirconium dimethyl;

bis(trimethylsilyl)amidoborane(2-iso-butyl, 4-[3',5'-di-tbutylphenyl]indenyl)$_2$zirconium dimethyl;

bis(trimethylsilyl)amidoborane(2-sec-butyl, 4-[3',5'-di-tbutylphenyl]indenyl)$_2$zirconium dimethyl;

bis(trimethylsilyl)amidoborane(2-tert-butyl, 4-[3',5'-di-tbutylphenyl]indenyl)$_2$zirconium dimethyl;

bis(trimethylsilyl)amidoborane(2-ethyl, 4-[3',5'-bis-trifluoromethylphenyl]indenyl)$_2$zirconium dimethyl;

bis(trimethylsilyl)amidoborane(2-n-propyl, 4-[3',5'-bis-trifluoromethylphenyl]indenyl)$_2$zirconium dimethyl;

bis(trimethylsilyl)amidoborane(2-iso-propyl, 4-[3',5'-bis-trifluoromethylphenyl]indenyl)$_2$zirconium dimethyl;

bis(trimethylsilyl)amidoborane(2-n-butyl, 4-[3',5'-bis-trifluoromethylphenyl]indenyl)$_2$zirconium dimethyl;

bis(trimethylsilyl)amidoborane(2-iso-butyl, 4-[3',5'-bis-trifluoromethylphenyl]indenyl)$_2$zirconium dimethyl;

bis(trimethylsilyl)amidoborane(2-sec-butyl, 4-[3',5'-bis-trifluoromethylphenyl]indenyl)$_2$zirconium dimethyl;

bis(trimethylsilyl)amidoborane(2-tert-butyl, 4-[3',5'-bis-trifluoromethylphenyl]indenyl)$_2$zirconium dimethyl;

bis(trimethylsilyl)amidoborane(2-ethyl, 4-[3',5'-di-iso-propylphenyl]indenyl)$_2$zirconium dimethyl;

bis(trimethylsilyl)amidoborane(2-n-propyl, 4-[3',5'-di-iso-propylphenyl]indenyl)$_2$zirconium dimethyl;

bis(trimethylsilyl)amidoborane(2-iso-propyl, 4-[3',5'-di-iso-propylphenyl]indenyl)$_2$zirconium dimethyl;

bis(trimethylsilyl)amidoborane(2-n-butyl, 4-[3',5'-di-iso-propylphenyl]indenyl)$_2$zirconium dimethyl;

bis(trimethylsilyl)amidoborane(2-iso-butyl, 4-[3',5'-di-iso-propylphenyl]indenyl)$_2$zirconium dimethyl;

bis(trimethylsilyl)amidoborane(2-sec-butyl, 4-[3',5'-di-iso-propylphenyl]indenyl)$_2$zirconium dimethyl;

bis(trimethylsilyl)amidoborane(2-tert-butyl, 4-[3',5'-di-iso-propylphenyl]indenyl)$_2$zirconium dimethyl;

bis(trimethylsilyl)amidoborane(2-methyl, 4-[3',5'-di-phenylphenyl]indenyl)$_2$zirconium dimethyl;

bis(trimethylsilyl)amidoborane(2-ethyl, 4-[3',5'-di-phenylphenyl]indenyl)$_2$zirconium dimethyl;

bis(trimethylsilyl)amidoborane(2-n-propyl, 4-[3',5'-di-phenylphenyl]indenyl)$_2$zirconium dimethyl;

bis(trimethylsilyl)amidoborane(2-iso-propyl, 4-[3',5'-di-phenylphenyl]indenyl)$_2$zirconium dimethyl;

bis(trimethylsilyl)amidoborane(2-n-butyl, 4-[3',5'-di-phenylphenyl]indenyl)$_2$zirconium dimethyl;

bis(trimethylsilyl)amidoborane(2-iso-butyl, 4-[3',5'-di-phenylphenyl]indenyl)$_2$zirconium dimethyl;

bis(trimethylsilyl)amidoborane(2-sec-butyl, 4-[3',5'-di-phenylphenyl]indenyl)$_2$zirconium dimethyl; and bis(trimethylsilyl)amidoborane(2-tert-butyl, 4-[3',5'-di-phenylphenyl]indenyl)$_2$zirconium dimethyl.

In another embodiment scandium catalyst complexes may also be used in the processes of this invention with or without an activator, see U.S. Pat. No. 6,403,773 for more information on these complexes.

In another embodiment, non-metallocene catalyst compounds, such as bisamide catalyst compounds, may be used. Bisamide catalyst compounds are defined to be bidentate bisamide catalyst compounds, pyridine bisamide catalyst compounds, and amine bisamide catalyst compounds.

Bidentate bisamide catalyst compounds are those represented by the following formula:

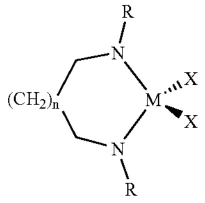

M is Ti, Zr, or Hf. R are the same or different alkyl, aryl, substituted alkyl, or substituted aryl radicals. X are the same or different alkyl, aryl, or halide radicals. Substituted alkyls and aryls can be alkyl-, aryl-, and halo-substituted. When X is a halide, the bisamide catalyst compound is typically first chemically modified to transform X into an abstractable ligand. This can be done by alkylation, for example.

Pyridine bisamide catalyst compounds are also useful herein. Pyridine bisamide catalyst compounds are those compounds that have the following formula:

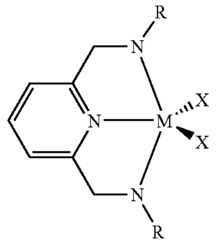

M is Ti, Zr, or Hf. R are the same or different alkyl, aryl, substituted alkyl, or substituted aryl radicals. X are the same or different alkyl, aryl, or halide radicals. Substituted alkyls and aryls can be alkyl-, aryl-, and halo-substituted. When X is a halide, the pyridine bisamide catalyst compound is typically first chemically modified to transform X into an abstractable ligand. This can be done by alkylation, for example.

Amine bisamide catalyst compounds are also useful herein. Amine bisamide catalyst compounds are those represented by the following formula:

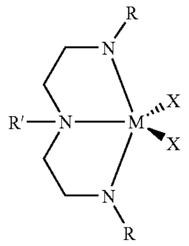

M is Ti, Zr, or Hf. R and R' are the same or different alkyl, aryl, substituted alkyl, or substituted aryl radicals. X are the same or different alkyl, aryl, or halide radicals. Substituted alkyl and aryls can be alkyl-, aryl-, and halo-substituted. When X is a halide, the amine bisamide catalyst compound must first be chemically modified to transform X into an abstractable ligand. This can be done by alkylation, for example.

Additional compounds are suitable as olefin polymerization catalysts for use in this invention. These will be any of those Group-3-10 compounds that can be converted by ligand abstraction or bond scission into a cationic catalyst and stabilized in that state by a noncoordinating or weakly coordinating anion. That anion should be sufficiently labile to be displaced by an unsaturated monomer such as propylene.

Additional catalyst compounds that may be used herein include bisimide catalyst compounds represented by the formula:

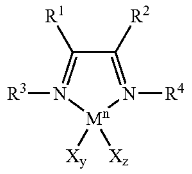

where M is a group 8,9,10, metal, preferably a group 10 metal, preferably Pd, Pt or Ni;

n is the oxidation state of M and may be 2, 3, or 4;

each X is independently a halogen or a substituted or unsubstituted hydrocarbyl group, a substituted or unsubstituted hydrocarboxy group, or a substituted or unsubstituted heteroatom containing group;

y is 0 or 1;

z is 0 or 1, where n=y+z+2;

$R^1$ is a heteroatom, a substituted $C_1$ to $C_{50}$ hydrocarbyl group or an unsubstituted $C_1$ to $C_{50}$ hydrocarbyl group;

$R^2$ is a heteroatom, a substituted $C_1$ to $C_{50}$ hydrocarbyl group or an unsubstituted $C_1$ to $C_{50}$ hydrocarbyl group;

$R^3$ is a heteroatom, a substituted $C_1$ to $C_{50}$ hydrocarbyl group or an unsubstituted $C_1$ to $C_{50}$ hydrocarbyl group, preferably a phenyl group;

$R^4$ is a heteroatom, a substituted $C_1$ to $C_{50}$ hydrocarbyl group or an unsubstituted $C_1$ to $C_{50}$ hydrocarbyl group, preferably a phenyl group, where any adjacent R groups may form fused ring systems.

Exemplary compounds include those described in the patent literature. International patent publications WO 96/23010, WO 97/48735 and Gibson, et al., *Chem. Comm.*, pp. 849-850 (1998), which disclose diimine-based ligands for Group-8-10 compounds that undergo ionic activation and polymerize olefins. Polymerization catalyst systems from Group-5-10 metals, in which the active center is highly oxidized and stabilized by low-coordination-number, polyanionic, ligand systems, are described in U.S. Pat. No. 5,502,124 and its divisional U.S. Pat. No. 5,504,049. See also the Group-5 organometallic catalyst compounds of U.S. Pat. No. 5,851,945 and the tridentate-ligand-containing, Group-5-10, organometallic catalysts of U.S. Pat. No. 6,294,495. Group-11 catalyst precursor compounds, activatable with ionizing cocatalysts, useful for olefin and vinylic polar molecules are described in WO 99/30822.

U.S. Pat. No. 5,318,935 describes bridged and unbridged, bisamido catalyst compounds of Group-4 metals capable of α-olefins polymerization. Bridged bis(arylamido)Group-4 compounds for olefin polymerization are described by D. H. McConville, et al., in *Organometallics* 1995, 14, 5478-5480. This reference presents synthetic methods and compound characterizations. Further work appearing in D. H. McConville, et al, *Macromolecules* 1996, 29, 5241-5243, describes bridged bis(arylamido)Group-4 compounds that are polymerization catalysts for 1-hexene. Additional invention-suitable transition metal compounds include those described in WO 96/40805. Cationic Group-3- or Lanthanide-metal olefin polymerization complexes are disclosed in copending U.S. application Ser. No. 09/408,050, filed 29 Sep. 1999, now U.S. Pat. No. 6,403,773. A monoanionic bidentate ligand and two monoanionic ligands stabilize those catalyst compounds, which can be used herein.

The literature describes many additional suitable catalyst compound that can be used in this invention. See, for instance, V. C. Gibson, et al; "The Search for New-Generation Olefin Polymerization Catalysts: Life Beyond Metallocenes", *Angew. Chem. Int. Ed.,* 38, 428-447 (1999).

Mixtures

In a preferred embodiment the processes of this invention may be used with two or more catalyst compounds at the same time or in series. In particular two different catalyst compounds can be activated with the same or different activators and introduced into the polymerization system at the same or different times.

As mentioned above, invention process can employ mixtures of catalyst compounds to select the properties that are desired from the polymer. Mixed catalyst systems can be employed in invention processes to alter or select desired physical or molecular properties. For example, mixed catalyst systems can control the molecular weight distribution of isotactic polypropylene when used with the invention processes or for the invention polymers.

Mixed-catalyst systems can be used with the invention polymerization processes to tailor the composition distribution of copolymers with high catalyst productivity. These systems can also, optionally, be used with diene incorporation to facilitate long chain branching using mixed catalyst systems and high levels of vinyl terminated polymers.

In preferred embodiments two or more of the above catalysts compounds can be used together.

In another embodiment preferred catalyst combinations include any two or more of:

μ-dimethyl silylbis(-2-methyl, 4-phenylindenyl)zirconium dichloride,

μ-dimethyl silylbis(-2-methyl, 4-phenylindenyl)zirconium dimethyl, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilyl(tetramethylcyclopentadienyl)(dodecylamido) titanium dimethyl, dimethylsilyl(tetramethylcyclopentadienyl)(dodecylamido) titanium dichloride, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilylbis(indenyl)hafnium dichloride, dimethylsilylbis(indenyl)hafnium dimethyl, dimethylsilyl bis(2-methylindenyl)zirconium dichloride, dimethylsilyl bis(2-methylindenyl)zirconium dimethyl, dimethylsilyl bis(2-methylfluorenyl)zirconium dichloride, dimethylsilyl bis(2-methylfluorenyl)zirconium dimethyl, dimethylsilyl bis(2-methyl-5,7-propylindenyl)zirconium dichloride, dimethylsilyl bis(2-methyl-5,7-propylindenyl)zirconium dimethyl, dimethylsilyl bis(2-methyl-5-phenylindenyl)zirconium dichloride, dimethylsilyl bis(2-methyl-5-phenylindenyl)zirconium dimethyl, dimethylsilyl bis(2-ethyl-5-phenylindenyl)zirconium dichloride, dimethylsilyl bis(2-ethyl-5-phenylindenyl)zirconium dimethyl, dimethylsilyl bis(2-methyl-5-biphenylindenyl)zirconium dichloride, and dimethylsilyl bis(2-methyl-5-biphenylindenyl)zirconium dichloride dimethyl.

A particularly preferred combination includes dimethylsilyl(tetramethylcyclopentadienyl)(dodecylamido)titanium dichloride and μ-dimethyl silylbis(-2-methyl, 4-phenylindenyl)zirconium dichloride. Another particularly preferred combination includes dimethylsilyl(tetramethylcyclopentadienyl)(dodecylamido)titanium methyl and μ-dimethyl silylbis(-2-methyl, 4-phenylindenyl)zirconium dimethyl. Another particularly preferred combination includes 1,1'-bis(4-triethylsilylphenyl)methylene-(cyclopentadienyl)(2,7-di-tertiary-butyl-9-fluorenyl)hafnium dichloride and μ-dimethyl silylbis(-2-methyl, 4-phenylindenyl) zirconium dichloride. Another particularly preferred combination includes 1,1'-bis(4-triethylsilylphenyl)methylene-(cyclopentadienyl)(2,7-di-tertiary-butyl-9-fluorenyl)hafnium dimethyl and μ-dimethyl silylbis(-2-methyl, 4-phenylindenyl) zirconium dimethyl.

In another embodiment the catalyst compound is not dimethylmethenyl(flourenyl)(cyclopentadienyl)zirconium dichloride [$Me_2C(flu)(cp)ZrCl_2$].

Activators and Activation Methods for Catalyst Compounds

The catalyst compounds described herein are combined with activators for use in the processes of this invention.

An activator is defined as any combination of reagents that increases the rate at which a metal complex polymerizes unsaturated monomers, such as olefins. An activator may also affect the molecular weight, degree of branching, comonomer content, or other properties of the polymer.

A. Alumoxane and Aluminum Alkyl Activators

In one embodiment, one or more alumoxanes are utilized as an activator in the processes of the invention. Alumoxanes, sometimes called aluminoxanes in the art, are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an alumoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another preferred alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

B. Ionizing Activators

It is within the scope of this invention to use an ionizing or stoichiometric activator, neutral or ionic, such as tri(n-butyl) ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof as an activator in the processes of this invention. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, now abandoned, all of which are herein fully incorporated by reference.

Preferred activators include a cation and an anion component, and may be represented by the following formula:

$$(W^{f+})g\ (NCA^{h-})_i$$

$W^{f+}$ is a cation component having the charge f+

$NCA^{h-}$ is a non-coordinating anion having the charge h− f is an integer from 1 to 3.

h is an integer from 1 to 3.

g and h are constrained by the relationship: (g)×(f)=(h)×(i).

The cation component, ($W^{f+}$) may include Bronsted acids such as protons or protonated Lewis bases or reducible Lewis acids capable of protonating or abstracting a moiety, such as an akyl or aryl, from an analogous metallocene or Group 15 containing transition metal catalyst compound, resulting in a cationic transition metal species.

In a preferred embodiment, the activators include a cation and an anion component, and may be represented by the following formula:

$$(LB\text{-}H^{f+})g(NCA^{h-})_i$$

wherein LB is a neutral Lewis base;
H is hydrogen;
$NCA^{h-}$ is a non-coordinating anion having the charge h−
f is an integer from 1 to 3,
h is an integer from 1 to 3,
g and h are constrained by the relationship: (g)×(f)=(h)×(i)

The activating cation ($W^{f+}$) may be a Bronsted acid, (LB-$H^{f+}$), capable of donating a proton to the transition metal catalyst compound resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene and mixtures thereof.

The activating cation ($W^{f+}$) may also be an abstracting moiety such as silver, carboniums, tropylium, carbeniums, ferroceniums and mixtures, preferably carboniums and ferroceniums. Most preferably ($W^{f+}$) is triphenyl carbonium or N,N-dimethylanilinium.

The anion component ($NCA^{h-}$) includes those having the formula $[T^{j+}Q_k]^{h-}$ wherein j is an integer from 1 to 3; k is an integer from 2 to 6; k−j=h; T is an element selected from Group 13 or 15 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $(NCA^{h-})_i$ also include diboron compounds as disclosed in U.S. Pat. No. 5,447,895, which is fully incorporated herein by reference.

Additional suitable anions are known in the art and will be suitable for use with the catalysts of the invention. See in particular, U.S. Pat. No. 5,278,119 and the review articles by S. H. Strauss, "The Search for Larger and More Weakly Coordinating Anions", *Chem. Rev.,* 93, 927-942 (1993) and C. A. Reed, "Carboranes: A New Class of Weakly Coordinating Anions for Strong Electrophiles, Oxidants and Superacids", *Acc. Chem. Res.,* 31, 133-139 (1998).

Illustrative, but not limiting examples of boron compounds which may be used as an activating cocatalyst in the preparation of the improved catalysts of this invention are tri-substituted ammonium salts such as:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate, triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
trimethylammonium tetrakis-(2,3,4,6-tetrafluorophenylborate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl)borate,
N,N-dimethylanilinium tetrakis-(2,3,4,6-tetrafluorophenyl) borate,
N,N-diethylanilinium tetrakis-(2,3,4,6-tetrafluoro-phenyl) borate, and
N,N-dimethyl-(2,4,6-trimethylanilinium)tetrakis-(2,3,4,6-tetrafluorophenyl)borate;
dialkyl ammonium salts such as: di-(i-propyl)ammonium
tetrakis(pentafluorophenyl)borate, and dicyclohexylammonium
tetrakis(pentafluorophenyl)borate; and tri-substituted phosphonium salts such as:
triphenylphosphonium tetrakis(pentafluorophenyl)borate, tri (o-tolyl)phosphonium
tetrakis(pentafluorophenyl)borate, and tri(2,6-dimethylphenyl)phosphonium
tetrakis(pentafluorophenyl)borate.

Most preferably, the ionic stoichiometric activatoris N,N-dimethylanilinium tetra(perfluorophenyl)borate and/or triphenylcarbenium tetra(perfluorophenyl)borate.

In one embodiment, an activation method using ionizing ionic compounds not containing an active proton but capable of producing an analogous metallocene catalyst cation and their non-coordinating anion are also contemplated, and are described in EP-A-0 426 637, EP-A-0 573 403 and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Non-coordinating anions useful in accordance with this invention are those that are compatible, stabilize the metal cation in the sense of balancing its ionic charge, yet retain sufficient lability to permit displacement by an ethylenically or acetylenically unsaturated monomer during polymerization. These types of cocatalysts sometimes use tri-isobutyl aluminum or tri-octyl aluminum as a scavenger.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.,* 100, 1391-1434 (2000).

When the catalyst compound does not contain at least one hydride or hydrocarbyl ligand but does contain at least one functional group ligand, such as chloride, amido or alkoxy ligands, and the functional group ligands are not capable of discrete ionizing abstraction with the ionizing, anion precursor compounds, these functional group ligands can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for analogous processes describing the reaction of alkyl aluminum compounds with analogous dihalide substituted metallocene compounds prior to or with the addition of activating noncoordinating anion precursor compounds.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-compound-to-activator molar ratio may be any ratio. Combinations of the described activator compounds may also be used for activation. For example, tris(perfluorophenyl)boron can be used with methylalumoxane.

C. Non-ionizing Activators

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, alumoxane, CuCl, Ni(1,5-cyclooctadiene)$_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.,* 100, 1391-1434 (2000).

Preferred non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene.

More preferred non-ionizing activators include $B(R^{12})_3$, where $R^{12}$ is a an arene or a perfluorinated arene. Even more preferred non-ionizing activators include $B(C_6H_5)_3$ and $B(C_6F_5)_3$. A particularly preferred non-ionizing activator is $B(C_6F_5)_3$. More preferred activators are ionizing and non-ionizing activators based on perfluoroaryl borane and perfluoroaryl borates such as $PhNMe_2H^+B(C_6F_5)_4^-$, $(C_6H_5)_3C^+ B(C_6F_5)_4^-$, and $B(C_6F_5)_3$.

Additional preferred activators that may be used with the catalysts compounds disclosed herein include those described in WO 03/064433A1, which is incorporated by reference herein.

In general the catalyst compound(s) and the activator are combined in ratios of about 1000:1 to about 0.5:1. In a preferred embodiment the catalyst compounds and the activator are combined in a ratio of about 300:1 to about 1:1, preferably about 150:1 to about 1:1, for boranes, borates, aluminates, etc. the ratio 5 is preferably about 1:1 to about 10:1 and for alkyl aluminum compounds (such as diethylaluminum chloride combined with water) the ratio is preferably about 0.5:1 to about 10:1.

In a preferred embodiment the ratio of the first catalyst to the second or additional catalyst is 5:95 to 95:5, preferably 25:75 to 75:25, even more preferably 40:60 to 60:40.

In general the combined catalyst compounds and the activator are combined in ratios of about 1:10,000 to about 1:1, in other embodiments the combined catalyst compounds and the activator are combined in ratios of 1:1 to 100:1. When alumoxane or aluminum alkyl activators are used, the combined catalyst compound-to-activator molar ratio is from 1:5000 to 10:1, alternatively from 1:1000 to 10:1; alternatively, 1:500 to 2:1; or 1:300 to 1:1. When ionizing activators are used, the combined catalyst compound-to-activator molar ratio is from 10:1 to 1:10; 5:1 to 1:5; 2:1 to 1:2; or 1.2:1 to 1:1. Multiple activators may be used, including using mixtures of alumoxanes or aluminum alkyls with ionizing activators.

Supports

In another embodiment the catalyst compositions of this invention include a support material or carrier. For example, the one or more catalyst components and/or one or more activators may be deposited on, contacted with, vaporized with, bonded to, or incorporated within, adsorbed or absorbed in, or on, one or more supports or carriers.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is preferred that the support material, most preferably an inorganic oxide, has a surface area in the range of from about 10 to about 700 $m^2/g$, pore volume in the range of from about 0 to about 4.0 cc/g and average particle size in the range of from about 0.02 to about 50 μm. More preferably, the surface area of the support material is in the range of from about 50 to about 500 $m^2/g$, pore volume of from about 0 to about 3.5 cc/g and average particle size of from about 0.02 to about 20 μm. Most preferably the surface area of the support material is in the range is from about 100 to about 400 $m^2/g$, pore volume from about 0 to about 3.0 cc/g and average particle size is from about 0.02 to about 10 μm.

Non-porous supports may also be used as supports in the processes described herein. For example, in a preferred embodiment the nonporous, fumed silica supports described in U.S. Pat. No. 6,590,055 can be used in the practice of this invention.

Additional useful activators for use in the processes of this invention include clays that have been treated with acids (such as $H_2SO_4$) and then combined with metal alkyls (such as triethylaluminum) as described in U.S. Pat. No. 6,531,552 and EP 1 160 261 A1, which is incorporated by reference herein.

Preferred activators include that may also be supports include ion-exchange layered silicate having an acid site of at most −8.2 pKa, the amount of the acid site is equivalent to at least 0.05 mmol/g of 2,6-dimethylpyridine consumed for neutralization. Preferred examples include chemically treated smectite group silicates, acid-treated smectite group silicates. Additional preferred examples of the ion-exchange layered silicate useful in this invention include layered silicates having a 1:1 type structure or a 2:1 type structure as described in "Clay Minerals (Nendo Kobutsu Gaku)" written by Haruo Shiramizu (published by Asakura Shoten in 1995).

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like. Additional preferred examples of the ion-exchange layered silicate useful in this invention include ion-exchange layered silicates comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. The clays are contacted with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly preferable. The treated clay may then be contacted with an activator compound, such as TEAL, and the catalyst compound to polymerize olefins.

In another embodiment the polymerization system comprises less than 5 weight % polar species, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm. Polar species include oxygen containing compounds (except for alumoxanes) such as alcohols, oxygen, ketones, aldehydes, acids, esters and ethers.

In another embodiment the polymerization system comprises less than 5 weight % trimethylaluminum and/or triethylaluminum, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

In another preferred embodiment the polymerization system comprises methylalumoxane and less than 5 weight % trimethylaluminum and or triethylaluminum, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

Preferred invention processes can use finely divided, supported catalysts to prepare propylene/i-hexene copolymers with greater than 1.0 mole % hex-1-ene. In addition to finely divided supports, invention processes can use fumed silica supports in which the support particle diameter can range from 200 angstroms to 1500 angstroms, small enough to form a colloid with reaction media.

Polymerization Process

This invention relates to processes to polymerize olefins comprising contacting one or more olefins having at least three carbon atoms with a catalyst compound and an activator at in a supercritical polymerization medium in a reactor. One or more reactors in series or in parallel may be used in the present invention. Catalyst compound and activator may be delivered as a solution or slurry, either separately to the reactor, activated in-line just prior to the reactor, or preactivated and pumped as an activated solution or slurry to the reactor. A preferred operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

Invention methods also cover polymerization of propylene in high-pressure reactors where, preferably, the reactor is substantially unreactive with the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the propylene under supercritical conditions. Suitable reaction vessels include those known in the art to maintain supercritical or other high-pressure ethylene polymerization reactions. Suitable reactors are selected from autoclave, tubular, and autoclave/tubular reactors, among others.

The polymerization processes described herein operate well in autoclave and tubular reactors. Typically, autoclave reactors have length-to-diameter ratios of 1:1 to 20:1 and are fitted with a high-speed (up to 1500 RPM) multiblade stirrer. Autoclave pressures are typically greater than 6 MPa with a maximum of typically less than 260 MPa. When the autoclave has a low length-to-diameter ratio (such as less than 4) propylene and other monomers are typically injected at only one position. But injection at two or more positions in the autoclave is also possible. For instance, in reactors where the length-to-diameter ratio is around 4-20, the reactor can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for plug flow or back mixing, largely independently, in the separate zones. Two or more autoclaves with one or more zones can connect in series to tailor polymer structure.

Tubular reactors are also well suited for use in this invention, preferably tubular reactors capable of operating up to about 350 MPa. Preferred tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Another way of addressing wall deposits is to fabricate the tube with smooth, unpolished internal surfaces. Preferred tubular reactors can operate at pressures up to 360 MPa and preferably have lengths of 100-2000 meters and internal diameters usually less than 10 cm. In some embodiments, the tubular reactor has a length-to-diameter ratio of 1:1 to 20:1 and the reactor contains up to six different injection positions. In another embodiment, the tubular reactor has a length of 100-2000 meters and an internal diameter of less than 10 cm.

Reactor trains that pair autoclaves with tubular reactors can also serve in invention processes. In such instances, the autoclave typically precedes the tubular reactor. Such systems may have injection of additional catalyst and/or feed components at several points in the autoclave and more particularly along the tube length.

In both autoclaves and tubular reactors, at injection, feeds are preferably room temperature or below to provide maximum polymer production within the limits of maximum operating temperature. In autoclave operation, a preheater operates at startup, but not after the reaction reaches steady state if the first mixing zone has some back-mixing characteristics. In tubular reactors, the first section of double-jacketed tubing is heated rather than cooled and is operated continuously since a tubular reactor is by nature plug flow. In both multizone autoclaves and tubular reactors, catalyst can not only be injected at the inlet, but also optionally at one or more points along the reactor. The catalyst feeds injected at the inlet and other injection points can be the same or different in terms of content, density, concentration, etc. Choosing different catalyst feeds allows polymer design tailoring. At the reactor outlet valve, the pressure drops to levels below that which critical phase separation occurs. Therefore, the downstream vessel contains a polymer-rich phase and a polymer-lean phase. Typically, conditions in this vessel remain supercritical and temperature remains above the polymer product's crystallization temperature. The autoclave or tubular reactor effluent is depressurized on entering the high pressure separator (HPS). In polymerizations based on propylene alternative choices are open to the design relative to classic high pressure polyethylene process technology.

At the reactor outlet valve the pressure drops to begin the separation of polymer and unreacted monomer, co-monomers, propane, etc. The temperature in this vessel will be maintained above the polymer product's crystallization point but the pressure may be below the critical point. The pressure need only be high enough that the propylene can be condensed against standard cooling water. The liquid recycle stream can then be recycled to the reactor with a liquid pumping system instead of the hyper-compressors required for polyethylene units. The relatively low pressure in this separator will reduce the monomer concentration in the liquid polymer phase which will result in a much lower polymerization rate. This polymerization rate may be low enough to operate this system without adding a catalyst poison or "killer". If a catalyst killer is required (e.g., to prevent reactions in the high pressure recycle) then provision must be made to remove any potential catalyst poisons from the recycled propylene rich monomer stream e.g. by the use of fixed bed adsorbents or by scavenging with an aluminum alkyl.

Alternatively, the HPS may be operated over propylene's critical pressure but within the propylene/polypropylene two phase region. This is the economically preferred method if polypropylene is to be produced with a revamped HPPE plant. The recycled HPS overhead is cooled and dewaxed before being returned to the suction of the secondary compressor, which is typical of HPPE plant operation.

The polymer from this intermediate or high pressure vessel will then go through another pressure reduction step to a low pressure separator. The temperature of this vessel will be maintained above the polymer melting point so that the polymer from this vessel can be fed as a liquid directly to an extruder or static mixer. The pressure in this vessel will be kept low by using a compressor to recover the unreacted monomers, etc to the condenser and pumping system referenced above.

In addition to autoclave reactors, tubular reactors, or reactors combining these, loop-type reactors function as well. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop. Industrially a loop reactor is typically not operated at the high pressures encountered in autoclaves and tubes.

Commercial low pressure loop reactors have diameters of 16 to 24 inches (41 to 61 cm) and lengths of 100 to 200+ meters. Operation in a single supercritical polypropylene in propylene solution phase is preferably at pressures of greater than 25 to 30 MPa. At these pressures smaller diameter thicker wall loop tubing is necessary resulting in potential difficulties in pump around efficiency and maximum allowable reactor capacity.

In addition to autoclave reactors, tubular reactors, or a combination of these reactors, loop-type reactors are useful in this invention. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop. U.S. Pat. No. 6,355,741 discusses a reactor with at least two loops that is useful in the practice of this invention provided that one or both operate at the supercritical conditions. U.S. Pat. No. 5,326,835 describes a process said to produce polymer in a bimodal fashion. This process's first reactor stage is a loop reactor in which polymerization occurs in an inert, low-boiling hydrocarbon. After the loop reactor, the reaction medium transits into a gas-phase reactor where gas-phase polymerization occurs. Since two very different environments create the polymer, it shows a bimodal molecular weight distribution. This two stage procedure can be modified to work with the procedure of the instant application. For instance, a first stage loop reactor can use propylene as the monomer and a propylene-based reaction medium as the inert low-boiling hydrocarbon.

PCT publication WO 19/14766 describes a process comprising the steps of (a) continuously feeding olefinic monomer and a catalyst system, with a metallocene component and a cocatalyst component, to the reactor; (b) continuously polymerizing that monomer in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the reactor. The polymerization zoning technique described in the above process can be practiced using the instant invention's process conditions. That is, the above process is suitable for use with this invention provided at least one polymerization zone makes the propylene or the reaction media containing propylene supercritical.

In general, feed inlet temperatures are generally at or below room temperature to provide cooling to the exothermic reaction in the reactor operating above the crystallization temperature of the polymer product. For a predominantly propylene containing feed with a catalyst producing significant polymer isotacticity the reactor temperature will be above 145° C.

The processes described herein may have residence times as short as 0.5 seconds and as long as several hours. In preferred embodiments the residence times are from 1 second to 30 minutes, preferably 5 seconds to 10 minutes, more preferably from 10 seconds to 5 minutes, more preferably from 10 seconds to 3 minutes. In some embodiments the residence time can be selected from 10, 30, 45, 50, 60, 120, and 150 seconds. Maximum residence times can be selected from 200, 300, 400, 500, or 600 seconds. In general, invention processes choose residence times of from 30-600 seconds; more particularly 45-400 or 60-300 seconds. In general, invention processes choose residence times of from 30 sec to 1 hour; more particularly 30 sec to 30 minutes; 45-400, or 60-300 sec. In another embodiment the polymerization of propylene the residence times are up to 5 minutes.

In some embodiments, invention processes produce polymer at a rate of 560-10000 LB/w-$Ft^2$. More particularly, production rates can range from 560-2000 or 600-1500.

Dividing the total quantity of polymer that is collected during the reaction time by the amount of propylene added to the reaction yields the conversion rate. The monomer-to-polymer conversion rate for the described processes is high. Invention processes can be run at conversion rates of 60 or less, 10-60, 20-60, 30-60, 40-60, 10-50, 20-50, 30-50, 40-50, 10-40, 20-40, or 30-40 percent conversion, preferably greater than 30, or greater than 40 percent conversion.

Catalyst productivities range from 828 to 5940 kg PP/kg catalyst * hr. These high levels of catalyst productivity may result in low residual solids in the polymer product. Residual solid amount of less than 0.5 wt %, particularly less than 0.3 wt %, or more particularly less than 0.1 wt % total solids residue are preferred.

Comonomers, Dual Catalysts and Polymer Structure

In reactors with multiple injection points for catalyst and feed there exists the possibility to tailor the polymer design. Use of more than one catalyst having different molecular weight and structural capabilities allows a wide variety of product compositions (e.g. bimodal, linear mixed with long chain branched).

The various olefins will have differing reactivity ratios for a given catalyst so a plug flow type operation will allow compositional tapering if for instance no feeds are injected down the reactor or compensation of the tapering if the more reactive monomer is injected preferentially along the tube. A single zone ideal back mixed autoclave reactor will not allow tapering of polymer composition but the use of multiple catalysts is still applicable. Operation of two such autoclaves in series or parallel can allow the use of tailoring by altering the composition of fresh feed to the second reactor.

Catalyst Killing

The reactor effluent is depressurized to an intermediate pressure significantly below the cloud point pressure but nevertheless supercritical for that composition. This allows separation of a polymer rich phase for further purification and a propylene rich phase for recycle compression back to the reactor.

This separation is carried out in a vessel known as a high pressure separator (HPS). Since this vessel also has a significant residence time, the catalyst activity is killed by addition of a polar species such as water, alcohol or sodium/calcium stearate. The choice and quantity of killing agent will depend on the requirements for clean up of the recycle propylene and comonomers as well as the product properties, if the killing agent has low volatility.

Alternatively the intermediate separation can be done at pressures well below the critical point so that the monomer concentration and therefore reactivity in the high pressure separator is relatively low. The relatively small amount of continued polymerization in this vessel may not be a problem so addition of catalyst deactivating compounds as is done in PE processes may be avoided presuming that no undesired reactions occur in the high or intermediate pressure recycle system. If no killing compounds are added then the killer removal step can be eliminated.

Choice of Propylene Feed Purity.

Propylene is available commercially at two levels of purity-polymer grade at 99.5% and chemical grade at about 93 to 95%. The choice of feed will set the level of purge required from the recycle to avoid over dilution of the feed by inert propane. The presence of propane in the reactor and HPS will raise the pressure of the cloud point curve for a given temperature but will decrease the polymerization efficiency due to a decrease in propylene (and other olefin) concentrations in the reactor. The elevation of cloud point pressure due to propane will widen the operating window of the HPS. In copolymerizations of propylene with limited amounts of ethylene, a similar effect in raising the cloud point pressure will be noted due to the presence of low levels of ethylene in the HPS.

Low Pressure Separator Operation

The LPS running at just above atmospheric pressure is just a simple sub critical flash of light components, reactants and oligomers thereof, for the sole purpose of producing a low volatile containing polymer melt entering the finishing extruder or static mixer.

Polymer Products

This invention also relates to a propylene polymer having a 1,3 regio defect population of greater than 5 per 10,000 monomer units, a melting point of 145° C. or more, and a g' of 0.97 or less and an Mw greater than 20,000.

This invention also relates to a propylene polymer having a 1,3 regio defect population of greater than 5 per 10,000 monomer units, a melting point of 70° C. or more (preferably 145° C. or more), and a g' of 0.97 or more and an Mw greater than 20,000.

This invention also relates to copolymer comprising propylene an a comonomer having a 1,3 regio defect population of greater than 5 per 10,000 monomer units, a melting point of 70° C. or more (preferably 145° C. or more), and a g' of 0.97 or less and an Mw greater than 10,000.

The polymers produced by invention processes may be in any structures including block, linear, radial, star, branched, and combinations of these.

Some invention embodiments produce polypropylene and copolymers of polypropylene with a unique microstructure. The process of the invention can be practiced such that novel isotactic and syndiotactic compositions are made. In other embodiments, the invention processes make crystalline polymers.

The processes of the invention produce propylene polymers with a melting point of 70 to 165° C., and a weight-average molecular weight of 2,000 to 1,000,000, 10,000 to 1,000,000, 15,000 to 500,000, 25,000 to 250,000 or 35,000 to 150,000.

Invention processes produce polymer with a heat of fusion, $\Delta H_f$, of 1-30 J/g, 2-20 J/g, or 3-10 J/g. In another embodiment the process of this invention produce polymers having an Hf of up to 110 J/g, preferably 50 to 110 J/g, more preferably 70 to 100 J/g.

The processes described herein can produce polymers having little or no ash or residue from catalyst or supports. In a preferred embodiment the polymers produced herein comprise less than 1 weight % silica, preferably less than 0.1 weight % silica, preferably less than 100 ppm silica, preferably less than 10 ppm.

Dienes can be used as a comonomer to increase the molecular weight of the resulting polymer and to create long chain branching. Vinyl chloride can be used as a comonomer to increase the degree of vinyl termination in the polymer.

Invention processes can produce long-chain-branched polypropylene. Long-chain branching is achievable using invention process regardless of whether additional α,ω-diene or other diene such as vinylnorbornene are used. In a preferred embodiment, less than 0.5 wt % diene is used. Alternatively, embodiments with less than 0.4 wt %, 0.3 wt %, 0.2 wt %, 1000 ppm, 500 ppm, 200 ppm, or 100 ppm.

In some embodiments, the present invention involves using as a comonomer an α,ω-diene and the olefin/α,ω-diene copolymers resulting from that use. Additionally, the present invention involves a copolymerization reaction of olefin monomers, wherein the reaction includes propylene and ethylene copolymerization with an α,ω-diene and the copolymers that are made. These copolymers may be employed in a variety of articles including, for example, films, fibers, such as spunbonded and melt blown fibers, fabrics, such as nonwoven fabrics, and molded articles. More particularly, these articles include, for example, cast films, oriented films, injection molded articles, blow molded articles, foamed articles, foam laminates and thermoformed articles.

It should be noted that while linear α,ω-dienes are preferred, other dienes can also be employed to make polymers of this invention. These would include branched, substituted α,ω-dienes, such as 2-methyl-1,9-decadiene; cyclic dienes, such as vinylnorbornene; or aromatic types, such as divinyl benzene.

Embodiments of the present invention include copolymers having from 98 to 99.999 weight percent olefin units, and from 0.001 to 2.000 weight percent α,ω-diene units. Copolymer embodiments may have a weight-average molecular weight from 50,000 to 2,000,000, crystallization temperatures from 50° C. to 140° C. and a melt flow rate (MFR) from 0.1 dg/min to 1500 dg/min. Note that the these embodiments display high crystallization temperatures intrinsically; there is no need for externally added nucleating agents.

In other embodiments, the copolymer includes from 90 to 99.999 weight percent of propylene units, from 0.000 to 8 weight percent of olefin units other than propylene units and from 0.001 to 2 weight percent α,ω-diene units. Copolymer embodiments may have weight-average molecular weights from 20,000 to 2,000,000, crystallization temperatures (without the addition of external nucleating agents) from 115° C. to 135° C. and MFRs from 0.1 dg/min to 100 dg/min. The accompanying olefin may be any of $C_2$-$C_{20}$ α-olefins, diolefins (with one internal olefin) and their mixtures thereof. More specifically, olefins include ethylene, butene-1, pentene-1, hexene-1, heptene-1, 4-methyl-1-pentene, 3-methyl-1-pentene, 4-methyl-1-hexene, 5-methyl-1-hexene, 1-octene, 1-decene, 1-undecene, and 1-dodecene.

Copolymers of isotactic polypropylene made under supercritical conditions include ethylene and $C_4$-$C_{12}$ comonomers such as but-1-ene, 3-methylpent-1-ene, hex-1-ene, 4-methylpent-1-ene, and oct-1-ene. Invention process can prepare these copolymers without the use of solvent or in an environment with low solvent concentration.

In a preferred embodiment the polymers have a residual solid amount of less than 0.5 wt %, particularly less than 0.3 wt %, or more particularly less than 0.1 wt %. total solids residue are preferred.

Preferred propylene polymers produced typically comprise 0 to 50 weight % of a comonomer, preferably 1 to 40 weight %, preferably 2 to 30 weight %, preferably 4 to 20 weight %, preferably 5 to 15 weight %, preferably 5 to 10 weight %, and have one or more of:

1. a heat of fusion of 30 J/g or more, preferably 50 J/g or more, preferably 60 or more, preferably 70 or more, preferably 80 or more, preferably 90 or more, preferably 95 or more, preferably 100 or more, preferably 105 or more OR an Hf of 30 J/g or less, more preferably 20 J/g or less preferably 0;
2. a Branching Index ($g'_{avg}$)of 1.0 or less, preferably 0.98 or less, preferably 0.97 or less, preferably 0.96 or less, preferably 0.95 or less, preferably 0.94 or less, preferably 0.93 or less, more preferably 0.92 or less, more preferably 0.91 or less, more preferably 0.90 or less;
3. a weight average molecular weight (as measured by GPC DRI) of 20,000 or more, preferably 50,000 to 2,000,000, preferably 100,000 to 1,000,000, preferably 150,000 to 900,000, preferably 200,000 to 800,000;
4. a melt flow rate of 0.5 dg/min or more, preferably 0.7 dg/min or more, preferably 1.0 dg/min or more, preferably between 0.1 and 1500 dg/min;
5. a percent crystallinity (% X) of 30% or more, preferably between 40 and 50%;
6. a melting temperature of 145° C. or more, preferably 150° C. or more, preferably 155° C. or more, preferably between 145 and 160° C.;
7. a crystallization temperature of 25° C. or more, preferably 45° C. or more, preferably 65° C. or more, preferably from 100° C.; and
8. an Mw/Mn (as measured by GPC DRI) of about 1 to 20, preferably about 1.5 to 8, preferably 2 to 4.

In another embodiment the polymers produced herein have a melt viscosity of less than 10,000 centipoises at 180° C. as measured on a Brookfield viscometer, preferably between 1000 to 3000 cps for some embodiments (such as packaging and adhesives) and preferably between 5000 and 10,000 for other applications.

Formulations

In some embodiments the polymer produced by this invention may be blended with one or more other polymers, including but not limited to, thermoplastic polymer(s) and/or elastomer(s).

A "thermoplastic polymer(s)" is a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_2$ or $C_4$ to $C_{40}$ olefins, preferably a $C_3$ to $C_{20}$ alpha olefin, more preferably $C_3$ to $C_{10}$ α-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene and or butene.

"Elastomers" encompass all natural and synthetic rubbers, including those defined in ASTM D1566). Examples of preferred elastomers include, but are not limited to, ethylene propylene rubber, ethylene propylene diene monomer rubber, styrenic block copolymer rubbers (including SI, SIS, SB, SBS, SEBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the polymer produced by this invention is combined with one or more of isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, polymers that are a hydrolysis product of EVA that equate to an ethylene vinyl alcohol copolymer, polymers of aromatic monomers such as polystyrene, poly-1 esters, polyacetal, polyvinylidine fluoride, polyethylene glycols and/or polyisobutylene.

In another embodiment elastomers are blended with the polymer produced by this invention to form rubber toughened compositions. In some particularly preferred embodiments, the rubber toughened composition is a two (or more) phase system where the elastomer is a discontinuous phase and the polymer produced by this invention is a continuous phase. This blend may be combined with tackifiers and/or other additives as described herein.

In another embodiment the polymer produced by this invention may be blended with elastomers or other soft polymers to form impact copolymers. In some embodiments the blend is a two (or more) phase system where the elastomer or soft polymer is a discontinuous phase and the polymer produced by this invention is a continuous phase. This blend may be combined with tackifiers and/or other additives as described herein.

In some embodiments the polymers of the invention described above are combined with metallocene polyethylenes (mPEs) or metallocene polypropylenes (mPPs). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such homopolymers and copolymers see WO 94/26816; WO 94/03506; EP A 277,003; EP A 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EP A 129,368; U.S. Pat. No. 5,264,405; EP A 520,732; WO 92 00333; U.S. Pat. No. 5,096,867; U.S. Pat. No. 5,507,475; EP A 426 637; EP A 573 403; EP A 520 732; EP A 495 375; EP A 500 944; EP A 570 982; WO91/09882; WO94/03506 and U.S. Pat. No. 5,055,438.

In some embodiments the polymer of this invention is present in the above blends, at from 10 to 99 weight %, based upon the weight of the polymers in the blend, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %.

The blends described above may be produced by (a) mixing the polymers of the invention with one or more polymers (as described above), by (b) connecting reactors together in series to make in situ reactor blends or by (c) using more than one catalyst in the same reactor to produce multiple species of polymers. The polymers can be mixed together prior to being put into the extruder or may be mixed in an extruder.

Any of the above polymers may be functionalized. Functionalized means that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O).

Examples include maleic, fumaric, acrylic, methacrylic, itaconic, crotonic, alpha-methyl crotonic, and cinnamic acids as well as their anhydrides, esters and salt derivatives. Maleic anhydride is particularly preferred. The unsaturated acid or anhydride is preferably present at about 0.1 weight % to about 5 weight %, preferably at about 0.5 weight % to about 4 weight %, even more preferably at about 1 to about 3 weight %, based upon the weight of the hydrocarbon resin and the unsaturated acid or anhydride.

Tackifiers may be blended with the polymers of this invention and/or with blends of the polymer produced by this inventions (as described above). Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar tackifiers are substantially free of monomers having polar groups. Preferably the polar groups are not present; however, if present, they are preferably not present at more that 5 weight %, preferably not more that 2 weight %, even more preferably no more than 0.5 weight %.) In some embodiments the tackifier has a softening point (Ring and Ball, as measured by ASTM E-28) of 80° C. to 140° C., preferably 100° C. to 130° C. In some embodiments the tackifier is functionalized. By functionalized is meant that the hydrocarbon resin has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, alpha-methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride.

The tackifier, if present, is typically present at about 1 weight % to about 50 weight %, based upon the weight of the blend, more preferably 10 weight % to 40 weight %, even more preferably 20 weight % to 40 weight %. Preferably however, tackifier is not present, or if present, is present at less than 10 weight %, preferably less than 5 weight %, more preferably at less than 1 weight %.

In another embodiment the polymers of this invention, and/or blends thereof, further comprise a crosslinking agent. Preferred crosslinking agents include those having functional groups that can react with the acid or anhydride group. Preferred crosslinking agents include alcohols, multiols, amines, diamines and/or triamines. Examples of crosslinking agents useful in this invention include polyamines such as ethylenediamine, diethylenetriamine, hexamethylenediamine, diethylaniinopropylamine, and/or menthanediamine.

In another embodiment the polymers of this invention, and/or blends thereof, further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, and/or nucleating agents. The additives may be present in the typically effective amounts well known in the art, such as 0.001 weight % to 10 weight %.

Preferred fillers, cavitating agents and/or nucleating agents include titanium dioxide, calcium carbonate, barium sulfate, silica, silicon dioxide, carbon black, sand, glass beads, mineral aggregates, talc, clay and the like.

Preferred antioxidants include phenolic antioxidants, such as Irganox 1010, Irganox, 1076 both available from Ciba-Geigy. Preferred oils include paraffinic or naphthenic oils such as Primol 352, or Primol 876 available from ExxonMobil Chemical France, S.A. in Paris, France.

More preferred oils include aliphatic naphthenic oils, white oils or the like.

Preferred plasticizers and/or adjuvants include mineral oils, polybutenes, phthalates and the like. Particularly preferred plasticizers include phthalates such as diisoundecyl phthalate (DIUP), diisononylphthalate (DINP), dioctylphthalates (DOP) and polybutenes, such as Parapol 950 and Parapol 1300 available from ExxonMobil Chemical Company in Houston Tex. Additional Preferred plasticizers include those disclosed in WO0118109A1 and U.S. Ser. No. 10/640,435, which are incorporated by reference herein.

Preferred processing aids, lubricants, waxes, and/or oils include low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER™ 101.

Preferred functionalized waxes include those modified with an alcohol, an acid, or a ketone. Functionalized means that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, alpha-methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride. Preferred examples include waxes modified by methyl ketone, maleic anhydride or maleic acid. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL™ 950 from ExxonMobil Chemical Company. PARAPOL™ 950 is an liquid polybutene polymer having an Mn of 950 and a kinematic viscosity of 220 cSt at 100° C., as measured by ASTM D 445.

Preferred UV stabilizers and or antioxidants include Irganox 1010 and the like.

Applications

The polymers of this invention (and blends thereof as described above) whether formed in situ or by physical blending are preferably used in any known thermoplastic or elastomer application. Examples include uses in molded parts, films, tapes, sheets, tubing, hose, sheeting, wire and cable coating, adhesives, shoesoles, bumpers, gaskets, bellows, films, fibers, elastic fibers, nonwovens, spunbonds, sealants, surgical gowns and medical devices.

Adhesives

The polymers of this invention or blends thereof can be used as adhesives, either alone or combined with tackifiers. The tackifier is typically present at about 1 weight % to about 50 weight %, based upon the weight of the blend, more preferably 10 weight % to 40 weight %, even more preferably 20 weight % to 40 weight %. Other additives, as described above, may be added also.

The adhesives of this invention can be used in any adhesive application, including but not limited to, disposables, packaging, laminates, pressure sensitive adhesives, tapes labels, wood binding, paper binding, non-wovens, road marking, reflective coatings, and the like. In some embodiments the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$)coatings applied by evaporating silicon oxide onto a film surface), foam, rock, ceramics, films, polymer foams (such as polyurethane foam), substrates coated with inks, dyes, pigments, PVDC and the like or combinations thereof. Additional preferred substrates include polyethylene, polypropylene, polyacrylates, acrylics, polyethylene terephthalate, or any of the polymers listed above as suitable for blends. Corona treatment, electron beam irradiation, gamma irradiation, microwave or silanization may modify any of the above substrates.

Films

The polymer produced by this invention described above and the blends thereof may be formed into monolayer or multilayer films. These films may be formed by any of the conventional techniques known in the art including extrusion, co-extrusion, extrusion coating, lamination, blowing, tenter frame, and casting. The film may be obtained by the flat film or tubular process, which may be followed by orientation in an uniaxial direction, or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions. In another embodiment the layer comprising the polymer composition of this invention (and/or blends thereof) may be combined with one or more other layers. The other layer(s) may be any layer typically included in multilayer film structures. For example the other layer or layers may be:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or .α-olefin (ethylene is defined to be an α-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.
2. Polar polymers. Preferred polar polymers include homopolymners and copolymers of esters, amides, acrylates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.
3. Cationic polymers. Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-α-methyl styrene.
4. Miscellaneous. Other preferred layers can be paper, wood, cardboard, metal, metal foils (such as aluminum foil and tin foil), metallized surfaces, glass (including silicon oxide (SiO.x)coatings applied by evaporating silicon oxide onto a film surface), fabric, spunbonded fibers, and non-wovens (particularly polypropylene spun bonded fibers or non-wovens), and substrates coated with inks, dyes, pigments, PVDC and the like. The films may vary in thickness depending on the intended application, however films of a thickness from 1 to 250 μm are usually suitable. Films intended for packaging are usually from 10 to 60 μm thick. The thickness of the sealing layer is typically 0.2 to 50 μm. There may be a sealing layer on both the inner and outer surfaces of the film or the sealing layer may be present on only the inner or the outer surface. Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium stearate, carbon black, low molecular weight resins and glass beads. In another embodiment, one or more layers may be modified by corona treatment, electron beam irradiation, gamma irradiation, or microwave. In some embodiments, one or both of the surface layers is modified by corona treatment. The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. Preferred hydrocarbon resins include those described above. The films comprising a hydrocarbon resin may be oriented in uniaxial or biaxial directions to the same or different degrees.

The films described above may be used as stretch and/or cling films. Stretch/cling films are used in various bundling, packaging and palletizing operations. To impart cling properties to, or improve the cling properties of, a particular film, a number of well-known tackifying additives have been utilized. Common tackifying additives include polybutenes, terpene resins, alkali metal stearates and hydrogenated rosins and rosin esters. The well-known physical process referred to as corona discharge can also modify the cling properties of a film. Some polymers (such as ethylene methyl acrylate copolymers) do not need cling additives and can be used as cling layers without tackifiers. Stretch/clings films may comprise a slip layer-comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$-$C_{12}$ olefins. Particularly, preferred are polypropylene and linear low density polyethylene (LLDPE). Suitable polypropylene is normally solid and isotactic, i.e., greater than 90% hot heptane insolubles, having wide ranging melt flow rates of from about 0.1 to about 300 g/10 min. Additionally, the slip layer may include one or more anti-cling (slip and/or antiblock) additives, which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above Polymers produced herein can be used for nonwovens, sealing layers, oriented polypropylene, and high-clarity thermoforming.

Melt Blown and Spun Bond Fabrics

Polymer made under supercritical conditions herein are useful for melt blown and spun bond fabrics. Invention processes can be used for making PP for spun bonded (SB) and melt blown (MB) fibers. Typical invention polymers have ash levels below 1000, 900, 700, 500, 400, 300, 200, 100, 50, 10, 1, 0.5, or 0.1 ppm. Some embodiments have ash levels of 1-500 ppb. All these characteristics combine to reduce polymer build-up on the die exits. These products can have high MFRs from 300-5000 useful for fiber applications.

Waxes

An appropriate choice of operating conditions and monomer and comonomer feeds yields polypropylene waxes from invention polymers and processes. Some invention embodiments are isotactic polypropylene waxes. As such these materials are well suited for viscosity modification in adhesives, as carriers for inks, and other applications. Some polypropylene waxes embodiments select melt viscosities of from 3-2000 cP at 180° C. Some invention embodiments produce syndiotactic polypropylene waxes.

Invention process can prepare long chain branched isotactic-polypropylene at high monomer conversion (35+% and especially 45+%) conditions. Some embodiments use higher amounts of diluent to promote long chain branching.

Long chain branching is also favored by operating the polymerization under supercritical conditions, but with a polymer rich phase and a polymer lean phase. Doing this allows the polymer-rich phase to have a lower monomer concentration and a higher local concentration of vinyl terminated polymer.

An appropriate choice of operating conditions and monomer and comonomer feeds, 180-200° C. and 20-150 MPa, yields polypropylene waxes from invention polymers and processes. Some invention embodiments are isotactic polypropylene waxes. As such these materials are well suited for viscosity modification in adhesives, films, and other applications. Some invention embodiments produce syndiotactic polypropylene waxes.

End Use Articles

Laminates comprising invention polymers can be used as a thermoformable sheet where the substrate is either sprayed or injection molded to couple it with the ionomer/tie-layer laminate sheet. The composite is formed into the desired shape to make the article, or composite article. Various types of substrate materials form highly desirable articles. The laminate can be used with plastic substrates such as homopolymers, copolymers, foams, impact copolymers, random copolymers, and other applications. Specifically, some articles in which the present invention can be incorporated are the following: vehicle parts, especially exterior parts such as bumpers and grills, rocker panels, fenders, doors, hoods, trim, and other parts can be made from the laminates, composites and methods of the invention.

Other articles can also be named, for example: counter tops, laminated surface counter tops, pool liners/covers/boat covers, boat sails, cable jacketing, motorcycles/snowmobiles/outdoor vehicles, marine boat hulls/canoe interior and exterior, luggage, clothing/fabric (combined with non-wovens), tent material, GORETEX™, Gamma-radiation resistant applications, electronics housing (TV's, VCR's and computers), a wood replacement for decks and other outdoor building materials, prefab buildings, synthetic marble panels for construction, wall covering, hopper cars, floor coating, polymer/wood composites, vinyl tile, bath/shower/toilet applications and translucent glass replacement, sidings, lawn/outdoor furniture, appliances such as refrigerators, washing machines, etc., children's toys, reflective signage and other reflective articles on roads and clothing, sporting equipment such as snowboards, surfboards, skis, scooters, wheels on in-line skates, CD's for scratch resistance, stadium seats, aerospace reentry shields, plastic paper goods, sports helmets, plastic microwaveable cookware, and other applications for coating plastics and metal where a highly glossy and scratch resistant surface is desirable, while not being subject to algae/discoloration.

The polypropylene copolymers described herein are suitable for applications such as molded articles, including injection and blow molded bottles and molded items used in automotive articles, such as automotive interior and exterior trims. Examples of other methods and applications for making polypropylene polymers and for which polypropylene polymers may be useful are described in the Encyclopedia of Chemical Technology, by Kirk-Othmer, Fourth Edition, vol. 17, at pages 748-819, which are incorporated by reference herein. In those instances where the application is for molded articles, the molded articles may include a variety of molded parts, particularly molded parts related to and used in the automotive industry such as, for example, bumpers, side panels, floor mats, dashboards and instrument panels. Foamed articles are another application and examples where foamed plastics, such as foamed polypropylene, are useful may be found in Encyclopedia of Chemical Technology, by Kirk-Othmer, Fourth Edition, vol. 11, at pages 730-783, which are incorporated by reference herein. Foamed articles are particularly useful for construction and automotive applications. Examples of construction applications include heat and sound insulation, industrial and home appliances, and packaging. Examples of automotive applications include interior and exterior automotive parts, such as bumper guards, dashboards and interior liners.

The polyolefinic compositions of the present invention are suitable for such articles as automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

Molded Products

The polymers described above may also be used to prepare the molded products of this invention in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, Concise Encyclopedia of Polymer Science and Engineering 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise , molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 μm to 2540 μm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 μm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 μm to 6000 μm in one embodiment, from 200 μm to 6000 μm in another embodiment, and from 250 μm to 3000 μm in yet another embodiment, and from 500 μm to 1550 μm in yet another embodiment, a desirable range being any combination of any upper thickness limit with any lower thickness limit.

In an embodiment of the injection molding process, wherein a substrate material in injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, Compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, the an extruded sheet of the compositions of this invention may be directly thermoformed or blow molded without cooling, thus skipping a cooling step. Other parameters may be varied as well in order to achieve a finished composite article having desirable features.

Non-Wovens and Fibers

The polymers described above may also be used to prepare the nonwoven fabrics and fibers of this invention in any nonwoven fabric and fiber making process, including but not limited to, melt blowing, spunbonding, film aperturing, and staple fiber carding. A continuous filament process may also be used. Preferably a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding. The fabric may be prepared with mixed metallocene polypropylene alone, physically blended with other mixed metallocene polypropylene or physically blended with single metallocene polypropylene. Likewise the fabrics of this invention may be prepared with mixed metallocene polypropylene physically blended with conventional Ziegler-Natta produced polymer. If blended, the fabric of this invention is preferably comprised of at least 50% mixed metallocene polypropylene. With these nonwoven fabrics, manufacturers can maintain the desirable properties of fabrics prepared with metallocene produced polypropylene while increasing fabric strength and potentially increased line speed compared to fabrics made using conventional polymers.

EXAMPLES

Size-Exclusion Chromatogaphy of Polymers

Molecular weight distribution was characterized using Size-Exclusion Chromatography (SEC). Molecular weight (weight-average molecular weight, Mw, and number-average molecular weight, Mn) were determined using a High Temperature Size Exclusion Chromatograph (either from Waters Corporation or Polymer Laboratories), equipped with a differential refractive index detector (DRI), an online light scattering detector, and a viscometer. Experimental details not described below, including how the detectors were calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns were used. The nominal flow rate was 0.5 $cm^3$/min, and the nominal injection volume was 300 microliters. The various transfer lines, columns and differential refractometer (the DRI detector) were contained in an oven maintained at 135° C.

Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The LS laser was turned on 1 to 1.5 hours before running samples by running the laser in idle mode for 20-30 minutes and then switching to full power in light regulation mode.

The concentration, c, at each point in the chromatogram is calculated from the baseline-subtracted DRI signal, $I_{DRI}$, using the following equation:

$$c=K_{DRI}I_{DRI}/(dn/dc)$$

where $K_{DRI}$ is a constant determined by calibrating the DRI, and (dn/dc) is the same as described below for the LS analysis. Units on parameters throughout this description of the SEC method are such that concentration is expressed in $g/cm^3$, molecular weight is expressed in g/mole, and intrinsic viscosity is expressed in dL/g.

The light scattering detector used is either a Wyatt Technology High Temperature mini-DAWN or a Precision Detector 2040 LALLS. The data is analyzed with the standard formulas for static light scattering $$\frac{K_o c}{\Delta R(\theta, c)} = \frac{1}{MP(\theta)} + 2A_2 c$$

Here, ΔR(θ, c) is the excess Rayleigh scattering intensity at scattering angle θ, c is the polymer concentration, M is the polymer molecular weight, $A_2$ is the second virial coefficient of the solution, P(θ) is the form factor, and $K_o$ is the optical constant for the system:

$$K_o = \frac{4\pi^2 n^2 (dn/dc)^2}{\lambda^4 N_A} \quad (3)$$

in which $N_A$ is Avogadro's number, and dn/dc is the refractive index increment for the system. For the LALLS detector we measure the scattering intensity at 15° and assume P(θ)=1. The concentrations used in the analyses are the values obtained from the DRI output. The refractive index n for TCB at 135 C for a 690 nm wavelength is 1.500. In addition, $A_2$=0.0006 for propylene polymers and 0.0015 for butene polymers, and (dn/dc)=0.104 for propylene polymers and 0.098 for butene polymers.

The viscometer used was a Viscotek Corporation high temperature viscometer which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g') is calculated using the output of the SEC-DRI-VIS method as follows. The average intrinsic viscosity, $[\eta]_{avg}$, of the sample is calculated by:

$$[\eta]_{avg} = \frac{\sum c_i[\eta]_i}{\sum c_i}$$

where the summations are over the chromotographic slices, i, between the integration limits. The branching index g' is defined as:

$$g' = \frac{[\eta]_{avg}}{kM_v^\alpha}$$

where k=0.0002288 and α=0.705 for propylene polymers, and k=0.00018 and α=0.7 for butene polymers. $M_v$ is the viscosity-average molecular weight based on molecular weights determined by LS analysis.

Differential Scanning Calorimetry

Melting point ($T_m$), heat of fusion ($\Delta H_f$), multiple melting peak, and any measurements related to detection of crystalline melting or crystallization are measured by Differential Scanning Calorimetry (DSC). A typical procedure used was as follows—Preferably, about 5 mg to about 9 mg of polymer that has aged at room temperature for at least 24 hours, is placed in a Differential Scanning Calorimeter. The sample is heated at about 10° C./minute to attain a final temperature of about 200° C. Subsequently, the sample is cooled to room temperature at about 10° C./min, during which the thermal output records the heat of crystallization. The crystallization temperature ($T_{cmax}$) is recorded as the temperature at the peak of the crystallization exotherm. The sample is then heated back to 200° C. The thermal output is recorded as the area under the melting peak, or peaks, of the sample which is typically at a maximum peak at about 160° C. The melting point is recorded as the temperature of the greatest heat absorption within the range of melting of the sample. In some cases, following the heating cycle the sample was cooled below room temperature prior to the second heating cycle.

The reaction temperature was from 150° C.±3° C. up to 190° C.±3° C. Residence time was held constant at 300 seconds. Catalyst concentration was selected from 0.03 to 0.07 mol ppm metal feed based on estimated conversions of 10 and 20%. The mol ratio of aluminum/zirconium metal was approximately 10,000 in all tests. 99.8% pure propylene was obtained from Linde AG, Wiesbaden, in bombs of 33 kg. The propylene had a density of 1.91 $kg/m^3$ (0° C., 1013 mbar), an Mw of 42.08 g/mol, a melting temperature of −185.25° C., a melting enthalpy of 69.9 kJ/kg, a boiling point at 1013 mbar of −47.75° C., a critical temperature of 91.85° C., a critical pressure of 46.2 bar (4.62 MPa), and other CnHm of less than 1000 ppm. Methylalumoxane (Mw 58.01, density 0.93 g/ml at 20° C., 30 weight % in toluene, 13.0 to 14.5% aluminum ) was obtained from Crompton GmbH. Tri-isobutyl aluminum (TIBAL) (Mw 198.33, density 0.789, g/ml at 20° C., 13.0 to 13.4% aluminum ) was obtained from Crompton GmbH, Bergkamen. 95% pure hexane was obtained from Sigma-Aldrich, Deisenhofen. The hexane was purified by refluxing over a sodium-potassium alloy for 3 hours, followed by distillation under an inert atmosphere. The hexane had an Mw of 86.18 g/mol, a melting temperature of −95.53° C., a melting enthalpy of 147.8 kJ/kg, a boiling point at 1013 mbar of 68.75° C., a critical temperature of 234.25° C., a critical pressure of 29.7 bar (2.97 MPa), an enthalpy of evaporation of 3335 kJ/kg, a non-volatiles level of less than 0.0015%, less than 0.02% water and less than 0.001% acids ($CH_3COOH$).

$^3$C NMR was collected at 125C on a Varian NMR spectrometers. Sample concentrations were approximately 10 wt % (wt/vol) in perdeutero tetrachloroethane. 10-mm NMR tubes contained these samples. Acquisition conditions were a 90-degree pulse, ungated broadband decoupling, approximately 15 seconds between successive data acquisitions, a sweep width of 8000 Hz, digital resolution of <0.2 Hz with the final spectrum composed of at least 1000 time-averaged data acquisitions.

$^1$H NMR was collected at 125C on Varian NMR spectrometers. Sample concentrations were approximately 1.5 wt % (wt/vol) in perdeutero tetrachloroethane. 5-mm NMR tubes contained these samples. Acquisition conditions were <45-degree pulse, approximately 8 seconds between successive data acquisitions, and a sweep width of at least 10 ppm with the final spectrum composed of at least 120 time-averaged data acquisitions.

Polymerization Unit

The core of the unit was a polymerization autoclave (volume 100 mL), designed for a maximum pressure of 200 MPa (2000 Bar) and a maximum temperature of 300° C. and containing a stirrer, magnetic drive, an electric heater (controlled by the thermocouple TIC-504), and a rupture disc. Pressure was measured with a pressure transducer (PIRC) and manometer. A thermocouple measured the temperature inside the autoclave. The autoclave was connected to the monomer and catalyst metering system and to the sampling device. Propylene was prepared in two tanks having a volume of 6 L each. It was fed by a membrane pump through the axis of the stirrer into the autoclave. The pressure in the propylene feed line was measured and indicated by a manometer. Hexane was metered through a feed line from a tank having a volume of 3 L using a second membrane pump. Thirty mL of catalyst solution was placed in a syringe type pump. As the catalyst solution was dispensed from the syringe, it was diluted with hexane before entering the reactor. The pressure in the catalyst feed line was measured with a manometer.

After the autoclave, the pressure was released to ambient by an automatically operated outlet valve. The polymer samples were collected in receptacles below the outlet valve. Each receptacle was joined to the outlet valve one after the other. Unreacted propylene was released to a flare. The polymer that formed before steady state was reached was collected in a separate receptacle.

Polymerization Test Procedure

Procedure I

In order to remove impurities, propylene was treated with tri-iso-butylaluminum (TIBA) as a scavenger for about a day. For this purpose a mixture of hexane and TIBA was metered into a tank. Afterwards propylene was taken from a bomb and condensed into the tank. For further purification the propylene was evaporated into a second tank and condensed. The metallocene catalyst was dissolved in a mixture of toluene and methyl alumoxane (MAO). This solution was stored under 2.5 MPa nitrogen. For each test 10 ml of the solution were placed in a syringe-type pump to be metered continuously into the autoclave.

The catalyst feed was further diluted with hexane. Before treatment, the hexane itself was also treated with TIBA under 2.5 MPa nitrogen. The mixture of catalyst, hexane and a negligible quantity of TIBA was fed by pump to adjust a ratio of 90 mol propylene to 10 mol hexane and a pre-set catalyst concentration in the feed. The conversion was determined from the total quantity of polymer that was collected during the 600 seconds and the amount of propylene added to the reaction. The typical feed temperature at start-up was 150-158° C. Once polymerization was commenced, the autoclave temperature rose to a stable polymerization temperature of from 150 to 190° C. Table A reports conditions for the homopolymerizations using (μ-dimethylsilyl)bis(2-methy-4-phenylindenyl)zirconium dichloride (MW 628.82 g/mol).

TABLE A

Polymerization conditions for propylene homopolymerization

| | Metallocene Concentration (Mol ppm) | Productivity (kg PP/g Zr) in 300 sec. | Reaction Pressure (MPa) | Temperature (° C.) |
|---|---|---|---|---|
| PP1 | 0.05029 | 704.4 | 60 | 163 |
| PP2 | 0.08565 | 1521.0 | 60 | 167 |
| PP3 | 0.08565 | 1791.8 | 60 | 167 |
| PP4 | 0.08565 | 1864.7 | 60 | 167 |
| PP5 | 0.08565 | 1724.7 | 60 | 167 |
| PP6 | 0.0441 | 690.8 | 80 | 162.5 |
| PP7 | 0.0736 | 2352.1 | 80 | 168 |
| PP8 | 0.0441 | 737.8 | 100 | 162.5 |
| PP9 | 0.0602 | 2915.3 | 100 | 168 |
| PP10 | 0.05250 | 3420.6 | 150 | 165 |

The data indicate that conversion increases with increasing catalyst concentration and with increasing pressure (FIG. 1). Conversion is roughly proportional to pressure. The conversion was determined from the quantity of polymer obtained and the quantity of propylene fed into the reactor during sampling. Conversions greater than 40% were achieved. High catalyst productivities of 500 to 3400 kg PP/kg Zr or 95 to 495 kg PP/g μ-dimethylsilyl)bis(2-methy-4-phenylindenyl)zirconium dichloride catalyst were also observed. Catalyst productivity was evaluated from the quantity of the polymer sample and the quantity of catalyst metal fed during the time of collecting that sample.

TABLE B

Property data for PP1 to PP10.

| IPP Sample | Percent conversion | Mw (k) | Mz (k) | Melting Point ° C. | Heat of Fusion J/g | g'[(a)] |
|---|---|---|---|---|---|---|
| PP1 | 8.50 | 27.2 | 46.1 | 145 | 81.9 | 1.00 |
| PP2 | 31.30 | 20.4 | 33.5 | | | 1.00 |
| PP3 | 36.90 | 21.4 | 36.4 | | | 0.96 |
| PP4 | 38.40 | 20.8 | 34.2 | | | 0.96 |
| PP5 | 35.50 | 20.9 | 34.2 | | | 0.97 |
| PP6 | 7.30 | 30.0 | 45.4 | | | 0.97 |
| PP7 | 41.60 | 24.4 | 41.5 | | | 0.97 |
| | | 24.7 | 44.1 | | | 0.96 |
| | | 29.5 | 43.3 | | | 0.81 |
| PP8 | 7.80 | 35.4 | 54.3 | 142 | 87.8 | 1.00 |
| PP9 | 42.20 | 25.5 | 43.9 | 146 | 87.2 | 0.95 |
| | | 25.5 | 44.4 | | | 0.96 |
| | | 26.9 | 47.0 | | | 0.89 |

TABLE B-continued

Property data for PP1 to PP10.

| IPP Sample | Percent conversion | Mw (k) | Mz (k) | Melting Point ° C. | Heat of Fusion J/g | g'[(a)] |
|---|---|---|---|---|---|---|
| PP10 | 43.20 | 31.8 | 55.7 | | | 0.96 |
| | | 31.2 | 56.1 | | | 0.97 |
| | | 29.7 | 52.3 | | | 0.99 |

[(a)]Ratio of intrinsic viscosity of sample to linear iPP standard (Achieve 1635).

TABLE C

Unsaturation Populations determined from $^{1}H$ NMR.

| Sample | vinyl | vinylidene | Vinylene(2° & 3°) |
|---|---|---|---|
| | Per 1000 carbon atoms | | |
| PP-2 | 0.61 | 0.39 | 0.07 |
| PP-6 | 1.12 | 0.75 | 0.05 |
| PP-7 | 1.41 | 0.53 | 0.06 |
| PP-8 | 1.08 | 0.65 | 0.13 |
| PP-10 | 0.71 | 0.28 | 0.09 |

TABLE D

Repeat unit and end group structures - $^{13}C$ NMR.

| | PP-1 | PP-6 | PP-8 |
|---|---|---|---|
| Reaction Pressure, MPa | 60 | 80 | 100 |
| Reaction Temperature | 163° C. | 162.5° C. | 162.5° C. |
| Melting Point ° C. | 145 | 145 | 142 |
| Pentad | Pentad Mole Fractions | | |
| Mmmm | 0.880 | 0.878 | 0.867 |
| Mmmr | 0.024 | 0.024 | 0.0255 |
| Rmmr | 0.004 | 0.006 | 0.0062 |
| Mmrr | 0.017 | 0.017 | 0.0172 |
| Mmrm + rrmr | 0.014 | 0.018 | 0.0182 |
| Rmrm | 0.010 | 0.011 | 0.0114 |
| Rrrr | 0.003 | 0.002 | 0.0058 |
| Rrrm | 0.007 | 0.008 | 0.0112 |
| Mrrm | 0.008 | 0.007 | 0.0097 |
| | Enchained Structural Defects per 10K Monomers | | |
| Stereo | 204 | 228 | 234 |
| 2,1-Erythro | 38 | 45 | 49 |
| 2,1-Threo | 0 | 0 | 3 |
| 1,3-regio | 56 | 47 | 38 |
| | Saturated End Groups per 10K Monomers | | |
| n-propyl | 11 | 7 | 7 |
| 2,3-dimethyl | 5 | 4 | 1 |
| n-butyl | 3 | 4 | 3 |
| Isobutyl | 34 | 24 | 25 |
| | Unsaturated End Groups per 10K Monomers | | |
| Vinylidene | Not measured | Not measured | Not measured |
| Vinyl | 16 | 14 | 13 |
| Trisubstituted | 5 | 6 | 5 |

Propylene/Hex-1-ene Copolymerization

Copolymerizations of propylene with hexene were run according to the procedure described above using (μ-dimethylsilyl)bis(2-methyl-4-phenylindenyl)zirconium dichloride and methylalumoxane as the catalyst compound and activator. Reaction conditions for each of the examples and two comparative examples (PP-7 and PP-9) are set out in Table E.

TABLE E

| Polymerization conditions for propylene-/hexene copolymers | | | | | | |
|---|---|---|---|---|---|---|
| | Weight ratios hex-1-ene/ propylene (%)† | Metallocene Concentration (Mol ppm) | Conversion (%) | Productivity (kg PP/g Zr) | Reaction Pressure (MPa) | Temp (° C.) |
| PH-1 | 15 | 0.09 | 38 | 1878 | 80 | 172.5 |
| PH-2 | 15 | 0.09 | 39 | 1930 | 80 | 172.5 |
| PH-3 | 15 | 0.05 | 14 | 1245 | 80 | 164 |
| PH-4 | 15 | 0.05 | 16 | 1437 | 80 | 164 |
| | | | | | 80 | |
| PH-6 | 25 | 0.10 | 30 | 1406 | 80 | 169 |
| PH-7 | 25 | 0.075 | 11 | 701 | 80 | 162.5 |
| PH-8 | 25 | 0.075 | 12 | 775 | 80 | 162.5 |
| PH-9 | 25 | 0.090 | 27 | 1409 | 80 | 166 |
| PH-10 | 25 | 0.090 | 29 | 1507 | 80 | 166 |
| PP-9 | NA | 0.0602 | 42.2 | 2915.3 | 100 | 168 |
| PP-7 | NA | 0.0736 | 41.6 | 2352.1 | 80 | 168 |

†weight ratio of hex-1-ene and propylene monomer added to the reaction.

TABLE F

| Molecular weight (GPC-MALLS) | | |
|---|---|---|
| | Mw(k) | Mz(k) |
| PH-1 | 18.7 | 33.5 |
| PH-2 | 17.6 | 30.1 |
| PH-3 | 25.3 | 39.5 |
| PH-4 | 25.8 | 38.6 |
| (average) | 21.85 | 35.4 |
| PH-6 | 20.7 | 33.0 |
| PH-7 | 28.0 | 43.2 |
| PH-8 | 27.9 | 43.2 |
| PH-9 | 21.7 | 34.9 |
| PH-10 | 20.9 | 34.6 |
| (average) | 23.8 | 37.8 |

TABLE G

| Unsaturations in Propylene/Hex-1-ene Copolymer ($^1$H NMR) | | | |
|---|---|---|---|
| | Number per 1000 Carbon atoms | | |
| | vinyl | 2° and 3° vinylene | vinylidene* |
| PH-1 | 0.68 | 0.22 | 0.75 (33) |
| PH-2 | 0.69 | 0.22 | 0.79 (35) |
| PH-3 | 0.49 | 0.14 | 0.46 (50) |
| PH-4 | 0.49 | 0.11 | 0.47 (53) |
| PH-6 | 0.59 | 0.16 | 0.52 (55) |
| PH-7 | 0.45 | 0.17 | 0.42 (59) |
| PH-8 | 0.48 | 0.15 | 0.41 (62) |
| PH-9 | 0.65 | 0.22 | 0.56 (60) |
| PH-10 | 0.63 | 0.20 | 0.58 (63) |

*Value in parentheses is % of total vinylidene signal that is singlet.

TABLE H

| | Melting Peak (° C.) DSC (2nd melt) | Tg (° C.) DSC | Mole % Hexene $^{13}$C NMR |
|---|---|---|---|
| PH-1 | 84.7 | −21.2 | 7.7 |
| PH-2 | | | 7.5 |
| PH-4 | 90.0 | −15.2 | |
| PH-5 | | | 7.4 |
| PH-6 | | | 9.3 |
| PH-7 | 84.3 | −17.0 | |
| PH-10 | 82.9 | −18.5 | 9.7 |

PH-1 was evaluated for mechanical properties. Modulus was 8.9±2.1 kpsi, Peak Stress was 1043±121 psi, Strain at break was 508±55%, and Toughness was 2634±298 in-lb/in$^3$.

Polypropylene Waxes

Wax-producing polymerizations were conducted in the autoclave described above. In each of these experiments, the polymerization temperature was 190° C. and the residence time was 4 minutes. The catalyst for these polymerization reactions was (μ-dimethylsilyl)bis(2-methy-4-phenylindenyl)zirconium dichloride (MW 628.82 g/mol). The reactions used methylalumoxane as the activator.

TABLE I

| Polypropylene wax polymerization | | | | | | | |
|---|---|---|---|---|---|---|---|
| | Pressure, MPa | % $C_3$ Conv. | kg PP/g Zr | Tm (° C.) | Mn (k) GPC-DRI | Mw(k) GPC-DRI | Mz(k) GPC-DRI |
| PW-1 | 60 | 27.5 | 839 | 131.9 | 2.4 | 10.3 | 20.1 |
| PW-2 | 60 | 25.4 | 777 | | | | |
| PW-3 | 80 | 33.6 | 1027 | 131.0 | 2.7 | 11.7 | 23.1 |
| PW-4 | 100 | 35 | 1069 | 132.0 | 2.9 | 12.5 | 24.1 |
| PW-5 | 120 | 36.2 | 1106 | | | | |
| PW-6 | 120 | 36.8 | 1124 | 133.8 | 3.1 | 13.7 | 26.2 |
| PW-7 | 140 | 42.1 | 1285 | | | | |
| PW-8 | 140 | 45.2 | 1381 | 127.4 | 2.5 | 12.5 | 25.2 |
| PW-9 | 160 | | | 133.9<br>142 | 2.1 | 17.0 | 47.6 |

While certain representative embodiments and details have been shown to illustrate the invention, it will be apparent to skilled artisans that various process and product changes from those disclosed in this application may be made without departing from this invention's scope, which the appended claims define.

All cited patents, test procedures, priority documents, and other cited documents are fully incorporated by reference to the extent that this material is consistent with this specification and for all jurisdictions in which such incorporation is permitted.

Certain features of the present invention are described in terms of a set of numerical upper limits and a set of numerical lower limits. This specification discloses all ranges formed by any combination of these limits. All combinations of these limits are within the scope of the invention unless otherwise indicated.

We claim:

1. A process to polymerize olefins comprising contacting, in a polymerization system, propylene monomers with:

1) a metallocene catalyst compound, 2) a non-coordinating anion activator, 3) optionally comonomer, and 4) from 0 to 25 wt % of diluent or solvent in the polymerization system, at a temperature above the cloud point temperature of the polymerization system to 160° C. and a pressure above the cloud point pressure of the polymerization system and between 15 and 150 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000.

2. The process of claim 1 wherein the temperature is 105 to 150° C.

3. The process of claim 1 wherein the temperature is 105 to 140° C.

4. The process of claim 1 wherein the pressure is 50 to 150 MPa.

5. The process of claim 1 wherein the pressure of the polymerization system is less than 125 MPa.

6. The process of claim 1 where the temperature is between 140 to 160° C.

7. The process of claim 1 wherein the pressure of the polymerization system is less than 100 MPa, and the temperature is between 140 to 160° C.

8. The process of claim 1 wherein the pressure of the polymerization system is between 15 and 140 MPa.

9. The process of claim 1 wherein the pressure of the polymerization system is between 15 and 50 MPa.

10. The process of claim 1 wherein solvent and or diluent is present in the polymerization system at 0 to 10 wt %.

11. The process of claim 1 wherein the propylene is present in the polymerization system at 55 wt % or more.

12. The process of claim 1 wherein the propylene is present in the polymerization system at 75 wt % or more.

13. The process of claim 1 wherein comonomer is present at 1 to 45 mole %.

14. The process of claim 1 wherein the polymerization medium of the monomer, comonomers, solvents and diluents comprises from 55-100 wt % propylene monomer; from 0 to 45 wt % of a comonomer mixture comprising at least one comonomer selected from ethylene, but-1-ene, hex-1-ene, 4-methylpent-1-ene, dicyclopentadiene, norbornene, $C_4$-$C_{2000}$ α-olefins, $C_4$-$C_{2000}$ α,internal-diolefins, and $C_4$-$C_{2000}$ α,ω-diolefins.

15. The process of claim 1 wherein the comonomer comprises one or more of ethylene, butene, hexene, or octene.

16. A process to polymerize olefins comprising contacting, in a polymerization system, propylene monomers with:

1) a metallocene catalyst compound and a bisamide catalyst compound, 2) an activator, 3) optionally comonomer, and 4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000.

17. A process to polymerize olefins comprising contacting, in a polymerization system, propylene monomers with:

1) a metallocene catalyst compound and a bisimide catalyst compound, 2) an activator, 3) optionally comonomer, and 4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000.

18. A process to polymerize olefins comprising contacting, in a polymerization system, propylene monomers with:

1) a metallocene catalyst compound, 2) an activator, 3) optionally comonomer, and 4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000, wherein the metallocene catalyst compound is represented by the formula:

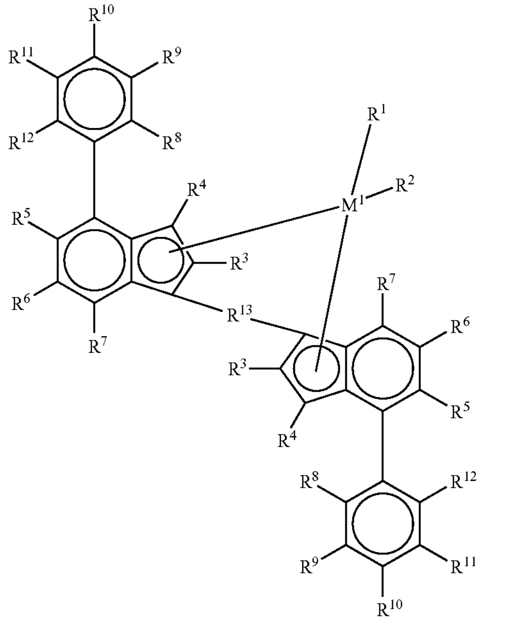

where $M^1$ is selected from titanium, zirconium, hafnium, vanadium, niobium, tantalum, chromium, molybdenum, or tungsten;

$R^1$ and $R^2$ are identical or different and are selected from hydrogen atoms, $C_1$-$C_{10}$ alkyl groups, $C_1$-$C_{10}$ alkoxy groups, $C_6$-$C_{10}$ aryl groups, $C_6$-$C_{10}$ aryloxy groups, $C_2$-$C_{10}$ alkenyl groups, $C_2$-$C_{40}$ alkenyl groups, $C_7$-$C_{40}$ arylalkyl groups, $C_7$-$C_{40}$ alkylaryl groups, $C_8$-$C_{40}$ arylalkenyl groups, OH groups or halogen atoms; or conjugated dienes that are optionally substituted with one or more hydrocarbyl, tri(hydrocarbyl)silyl groups or hydrocarbyl tri(hydrocarbyl)silylhydrocarbyl groups;

$R^3$-$R^{12}$ are the same or different and are selected from hydrogen atoms, halogen atoms, $C_1$-$C_{10}$ halogenated or unhalogenated alkyl groups, $C_6$-$C_{10}$ halogenated or unhalogenated awl groups, $C_2$-$C_{10}$ halogenated or unhalogenated alkenyl groups, $C_7$-$C_{40}$ halogenated or unhalogenated arylalkyl groups, $C_7$-$C_{40}$ halogenated or unhalogenated alkylaryl groups, $C_8$-$C_{40}$ halogenated or unhalogenated arylalkenyl groups, —NR'$_2$, —SR', —OR', —OSiR'$_3$ or —PR'$_2$ radicals in which R' one of a halogen atom, a $C_1$-$C_{10}$ alkyl group, or a $C_6$-$C_{10}$ aryl group; or two or more adjacent radicals $R^5$ to $R^7$ together with the atoms connecting them can form one or more rings;

$R^{13}$ is selected from

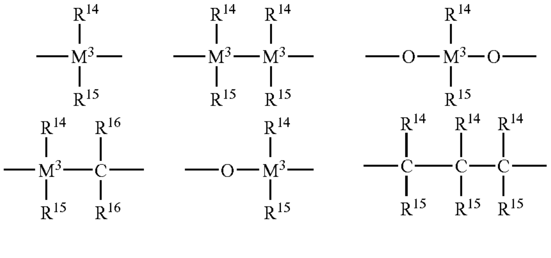

—B($R^{14}$)—, —Al($R^{14}$)—, —Ge—, —Sn—, —O—, —S—, —SO—, —$SO_2$—, —N($R^{14}$)—, —CO—, —P(R14)— —P(O)(R14)—, —B($NR^{14}R^{15}$)— and —B[N($SiR^{14}R^{15}R^{16}$)$_2$]—, $R^{14}$, $R^{15}$ and $R^{16}$ are each independently selected from hydrogen, halogen, $C_1$-$C_{20}$ alkyl groups, $C_6$-$C_{30}$ aryl groups, $C_1$-$C_{20}$ alkoxy groups, $C_2$-$C_{20}$ alkenyl groups, $C_7$-$C_{40}$ arylalkyl groups, $C_8$-$C_{40}$ arylalkenyl groups and $C_7$-$C_{40}$ alkylaryl groups, or $R^{14}$ and $R^{15}$, together with the atom(s) connecting them, form a ring and $M^3$ is selected from carbon, silicon, germanium and tin, or $R^{13}$ is represented by the formula:

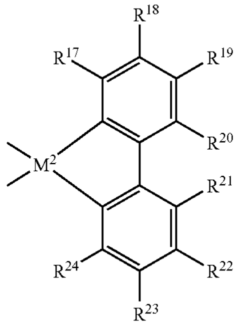

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin.

19. A process to polymerize olefins comprising contacting, in a polymerization system, propylene monomers with:

1) a metallocene catalyst compound,
2) an activator,
3) optionally comonomer, and
4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000, wherein the metallocene catalyst compound comprises one or more of:

μ-dimethyl silylbis(-2-methyl, 4-phenylindenyl)zirconium dichloride,

μ-dimethyl silylbis(-2-methyl, 4-phenylindenyl)zirconium dimethyl, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilyl(tetramethylcyclopentadienyl)(dodecylamido)titanium dimethyl, dimethylsilyl(tetramethylcyclopentadienyl)(dodecylamido)titanium dichloride, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilylbis(indenyl)hafnium dichloride, dimethylsilylbis(indenyl)hafnium dimethyl, dimethylsilyl bis(2-methylindenyl)zirconium dichloride, dimethylsilyl bis(2-methylindenyl)zirconium dimethyl, dimethylsilyl bis(2-methylfluorenyl)zirconium dichloride, dimethylsilyl bis(2-methylfluorenyl)zirconium dimethyl, dimethylsilyl bis(2-methyl-5,7-propylindenyl)zirconium dichloride, dimethylsilyl bis(2-methyl-5,7-propylindenyl)zirconium dimethyl, dimethylsilyl bis(2-methyl-5-phenylindenyl)zirconium dichloride, dimethylsilyl bis(2-methyl-5-phenylindenyl)zirconium dimethyl, dimethylsilyl bis(2-ethyl-5-phenylindenyl)zirconium dichloride, dimethylsilyl bis(2-ethyl-5-phenylindenyl)zirconium dimethyl, dimethylsilyl bis(2-methyl-5-biphenylindenyl)zirconium dichloride, and dimethylsilyl bis(2-methyl-5-biphenylindenyl)zirconium dimethyl.

20. A process to polymerize olefins comprising contacting, in a polymerization system, propylene monomers with:

1) a metallocene catalyst compound, 2) an activator, 3) optionally comonomer, and 4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000, wherein the metallocene catalyst compound comprises two or more of:

μ-dimethyl silylbis(-2-methyl, 4-phenylindenyl)zirconium dichloride,

μ-dimethyl silylbis(-2-methyl, 4-phenylindenyl)zirconium dimethyl, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilyl(tetramethylcyclopentadienyl)(dodecylamido)titanium dimethyl, dimethylsilyl(tetramethylcyclopentadienyl)(dodecylamido)titanium dichloride, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilylbis(indenyl)hafnium dichloride, dimethylsilylbis(indenyl)hafnium dimethyl, dimethylsilyl bis(2-methylindenyl)zirconium dichloride, dimethylsilyl bis(2-methylindenyl)zirconium dimethyl, dimethylsilyl bis(2-methylfluorenyl)zirconium dichloride, dimethylsilyl bis(2-methylfluorenyl)zirconium dimethyl, dimethylsilyl bis(2-methyl-5,7-propylindenyl)zirconium dichloride, dimethylsilyl bis(2-methyl-5,7-propylindenyl)zirconium dimethyl, dimethylsilyl bis(2-methyl-5-phenylindenyl)zirconium dichloride, dimethylsilyl bis(2-methyl-5-phenylindenyl)zirconium dimethyl, dimethylsilyl bis(2-ethyl-5-phenylindenyl)zirconium dichloride, dimethylsilyl bis(2-ethyl-5-phenylindenyl)zirconium dimethyl, dimethylsilyl bis(2-methyl-5-biphenylindenyl)zirconium dichloride, and dimethylsilyl bis(2-methyl-5-biphenylindenyl)zirconium dimethyl.

21. The process of claim 18 wherein the activator comprises alumoxane.

22. The process of claim 18 wherein the activator comprises a non-coordinating anion.

23. A process to polymerize olefins comprising contacting, in a polymerization system, propylene monomers with:

1) a metallocene catalyst compound, 2) an activator, 3) optionally comonomer, and 4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000, wherein the activator comprises one or more of trimethylammonium tetraphenylborate, trisperiluorophenyl borate, trisperfluoronaphtyl borate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, trimethylammonium tetrakis-(2,3,4,6-tetrafluorophenylborate, triethylammonium tetrakis-(2,3,4,6-tetrafluorophenyl)borate, tripropylammonium tetrakis-(2,3,4,6-tetrafluorophenyl) borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluoro-phenyl)borate, N,N-dimethyl-(2,4,6-trimethylanilinium)tetrakis-(2,3,4,6-tetrafluorophenyl)borate, di-(i-propyl)ammonium tetrakis(pentafluorophenyl)borate, dicyclohexylammonium tetrakis(pentafluorophenyl)borate, triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate.

24. The process of claim 18 wherein the activator comprises N,N-dimethylanilinium tetra(perfluorophenyl)borate and/or triphenylcarbenium tetra(perfluorophenyl)borate.

25. The process of claim 18 wherein the polymerization takes place in a tubular reactor.

26. The process of claim 25 wherein the tubular reactor has a length-to-diameter ratios of 1:1 to 20:1.

27. The process of claim 25 wherein the tubular reactor has a length-to-diameter ratio of 4:1 to 20:1 and the reactor contains up to six different injection positions.

28. The process of claim 25 wherein the tubular reactor has a length of 100-2000 meters and an internal diameter of less than 10 cm.

29. The process of claim 25 wherein the tubular reactor is operated in multiple zones.

30. The process of claim 18 wherein the polymerization takes place in an autoclave reactor.

31. The process of claim 30 wherein the autoclave reactor has a length-to-diameter ratios of 1:1 to 20:1.

32. The process of claim 30 wherein the autoclave reactor has a length-to-diameter ratio of 4:1 to 20:1 and the reactor contains up to six different injection positions.

33. The process of claim 30 wherein the autoclave reactor is operated in multiple zones.

34. The process of claim 30 wherein the process comprises (a) continuously feeding olefin monomers, catalyst compound, and activator to the autoclave reactor; (b) continuously polymerizing the monomers in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the polymer.

35. A process to polymerize olefins comprising contacting, in a polymerization system, propylene monomers with:

1) a metallocene catalyst compound,
2) an activator,
3) optionally comonomer, and
4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000, wherein the polymerization takes place in a loop reactor.

36. The process of claim 35 wherein the loop reactor has a diameter of 41 to 61 cm and a length of 100 to 200 meters.

37. The process of claim 35 where an in-line pump continuously circulates the polymerization system through the loop reactor.

38. The process of claim 35 wherein the process comprises (a) continuously feeding olefin monomers, catalyst compound, and activator to the loop reactor; (b) continuously polymerizing the monomers in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the polymer.

39. The process of claim 18 wherein the residence time is less than 5 minutes.

40. A process to polymerize olefins comprising contacting, in a polymerization system, propylene monomers with:

1) a metallocene catalyst compound,
2) an activator,
3) optionally comonomer, and
4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000, wherein the catalyst compound comprises one or more of:

dimethylsiladiyl(2-methyl, 4-[3',5'-di-tbutylphenyl]indenyl)$_2$zirconium dichloride;

dimethylsiladiyl(2-ethyl, 4-[3',5'-di-tbutylphenyl]indenyl)$_2$ zirconium dichloride;

dimethylsiladiyl(2-n-propyl, 4-[3',5'-di-tbutylphenyl]indenyl)$_2$zirconium dichloride;

dimethylsiladiyl(2-iso-propyl, 4-[3',5'-di-tbutylphenyl]indenyl)$_2$zirconium dichloride;

dimethylsiladiyl(2-n-butyl, 4-[3',5'-di-tbutylphenyl]indenyl)$_2$zirconium dichloride;

dimethylsiladiyl(2-iso-butyl, 4-[3',5'-di-tbutylphenyl]indenyl)$_2$zirconium dichloride;

dimethylsiladiyl(2-sec-butyl, 4-[3',5'-di-tbutylphenyl]indenyl)$_2$zirconium dichloride;

dimethylsiladiyl(2-tert-butyl, 4-[3',5'-di-tbutylphenyl]indenyl)$_2$zirconium dichloride;

dimethylsiladiyl(2-methyl, 4-[3',5'-di-tbutylphenyl]indenyl)$_2$hafnium dichloride;
dimethylsiladiyl(2-ethyl, 4-[3',5'-di-tbutylphenyl]indenyl)$_2$ hafnium dichloride;
dimethylsiladiyl(2-iso-propyl, 4-[3',5'-di-tbutylphenyl]indenyl)$_2$hafnium dichloride;
dimethylsiladiyl(2-butyl, 4-[3',5'-di-tbutylphenyl]indenyl)$_2$ hafnium dichloride;
9-silafluorendiyl(2-methyl, 4-[3',5'-di-tbutylphenyl]indenyl)$_2$zirconium dichloride;
9-silafluorendiyl(2-ethyl, 4-[3',5'-di-tbutylphenyl]indenyl)$_2$zirconium dichloride;
9-silafluorendiyl(2-n-propyl, 4-[3',5'-di-tbutylphenyl]indenyl)$_2$zirconium dichloride;
9-silafluorendiyl(2-iso-propyl, 4-[3',5'-di-tbutylphenyl]indenyl)$_2$zirconium dichloride;
9-silafluorendiyl(2-n-butyl, 4-[3',5'-di-tbutylphenyl]indenyl)$_2$zirconium dichloride;
9-silafluorendiyl(2-iso-butyl, 4-[3',5'-di-tbutylphenyl]indenyl)$_2$zirconium dichloride;
9-silafluorendiyl(2-sec-butyl, 4-[3',5'-di-tbutylphenyl]indenyl)$_2$zirconium dichloride;
9-silafluorendiyl(2-tert-butyl, 4-[3',5'-di-tbutylphenyl]indenyl)$_2$zirconium dichloride;
9-silafluorendiyl(2-methyl, 4-[3',5'-di-tbutylphenyl]indenyl)$_2$hafnium dichloride;
9-silafluorendiyl(2-ethyl, 4-[3',5'-di-tbutylphenyl]indenyl)$_2$hafnium dichloride;
9-silafluorendiyl(2-n-propyl, 4-[3',5'-di-tbutylphenyl]indenyl)$_2$hafnium dichloride;
9-silafluorendiyl(2-iso-propyl, 4-[3',5'-di-tbutylphenyl]indenyl)$_2$hafnium dichloride;
9-silafluorendiyl(2-n-butyl, 4-[3',5'-di-tbutylphenyl]indenyl)$_2$hafnium dichloride;
9-silafluorendiyl(2-iso-butyl, 4-[3',5'-di-tbutylphenyl]indenyl)$_2$hafnium dichloride;
9-silafluorendiyl(2-sec-butyl, 4-[3',5'-di-tbutylphenyl]indenyl)$_2$hafnium dichloride;
9-silafluorendiyl(2-tert-butyl, 4-[3',5'-di-tbutylphenyl]indenyl)$_2$hafnium dichloride;
dimethylsiladiyl(2-methyl, 4-[3',5'-di-tbutylphenyl]indenyl)$_2$zirconium dimethyl;
dimethylsiladiyl(2-ethyl, 4-[3',5'-di-tbutylphenyl]indenyl)$_2$ zirconium dimethyl;
dimethylsiladiyl(2-n-propyl, 4-[3',5'-di-tbutylphenyl]indenyl)$_2$zirconium dimethyl;
dimethylsiladiyl(2-iso-propyl, 4-[3',5'-di-tbutylphenyl]indenyl)$_2$zirconium dimethyl;
dimethylsiladiyl(2-n-butyl, 4-[3',5'-di-tbutylphenyl]indenyl)$_2$zirconium dimethyl;
dimethylsiladiyl(2-iso-butyl, 4-[3',5'-di-tbutylphenyl]indenyl)$_2$zirconium dimethyl;
dimethylsiladiyl(2-sec-butyl, 4-[3',5'-di-tbutylphenyl]indenyl)$_2$zirconium dimethyl;
dimethylsiladiyl(2-tert-butyl, 4-[3',5'-di-tbutylphenyl]indenyl)$_2$zirconium dimethyl;
dimethylsiladiyl(2-methyl, 4-[3',5'-di-tbutylphenyl]indenyl)$_2$hafnium dimethyl;
dimethylsiladiyl(2-ethyl, 4-[3',5'-di-tbutylphenyl]indenyl)$_2$ hafnium dimethyl;
dimethylsiladiyl(2-n-propyl, 4-[3',5'-di-tbutylphenyl]indenyl)$_2$hafnium dimethyl dimethylsiladiyl(2-iso-propyl, 4-[3',5'-di-tbutylphenyl]indenyl)$_2$hafnium dimethyl;
dimethylsiladiyl(2-n-butyl, 4-[3',5'-di-tbutylphenyl]indenyl)$_2$hafnium dimethyl;
dimethylsiladiyl(2-iso-butyl, 4-[3',5'-di-tbutylphenyl]indenyl)$_2$hafnium dimethyl;
dimethylsiladiyl(2-sec-butyl, 4-[3',5'-di-tbutylphenyl]indenyl)$_2$hafnium dimethyl;
dimethylsiladiyl(2-tert-butyl, 4-[3',5'-di-tbutylphenyl]indenyl)$_2$hafnium dimethyl;
9-silafluorendiyl(2-methyl, 4-[3',5'-di-tbutylphenyl]indenyl)$_2$zirconium dimethyl;
9-silafluorendiyl(2-ethyl, 4-[3',5'-di-tbutylphenyl]indenyl)$_2$zirconium dimethyl;
9-silafluorendiyl(2-n-propyl, 4-[3',5'-di-tbutylphenyl]indenyl)$_2$zirconium dimethyl;
9-silafluorendiyl(2-iso-propyl, 4-[3',5'-di-tbutylphenyl]indenyl)$_2$zirconium dimethyl;
9-silafluorendiyl(2-n-butyl, 4-[3',5'-di-tbutylphenyl]indenyl)$_2$zirconium dimethyl;
9-silafluorendiyl(2-iso-butyl, 4-[3',5'-di-tbutylphenyl]indenyl)$_2$zirconium dimethyl;
9-silafluorendiyl(2-sec-butyl, 4-[3',5'-di-tbutylphenyl]indenyl)$_2$zirconium dimethyl;
9-silafluorendiyl(2-tert-butyl, 4-[3',5'-di-tbutylphenyl]indenyl)$_2$zirconium dimethyl;
9-silafluorendiyl(2-methyl, 4-[3',5'-di-tbutylphenyl]indenyl)$_2$hafnium dimethyl;
9-silafluorendiyl(2-ethyl, 4-[3',5'-di-tbutylphenyl]indenyl)$_2$hafnium dimethyl;
9-silafluorendiyl(2-n-propyl, 4-[3',5'-di-tbutylphenyl]indenyl)$_2$hafnium dimethyl;
9-silafluorendiyl(2-iso-propyl, 4-[3',5'-di-tbutylphenyl]indenyl)$_2$hafnium dimethyl;
9-silafluorendiyl(2-n-butyl, 4-[3',5'-di-tbutylphenyl]indenyl)$_2$hafnium dimethyl;
9-silafluorendiyl(2-iso-butyl, 4-[3',5'-di-tbutylphenyl]indenyl)$_2$hafnium dimethyl;
9-silafluorendiyl(2-sec-butyl, 4-[3',5'-di-tbutylphenyl]indenyl)$_2$hafnium dimethyl;
9-silafluorendiyl(2-tert-butyl, 4-[3',5'-di-tbutylphenyl]indenyl)$_2$hafnium dimethyl;
dimethylsiladiyl(2-methyl, 4-[3',5'-bis-trifluoromethylphenyl]indenyl)$_2$zirconium dichloride;
dimethylsiladiyl(2-ethyl, 4-[3',5'-bis-trifluoromethylphenyl]indenyl)$_2$zirconium dichloride;
dimethylsiladiyl(2-n-propyl, 4-[3',5'-bis-trifluoromethylphenyl]indenyl)$_2$zirconium dichloride;
dimethylsiladiyl(2-iso-propyl, 4-[3',5'-bis-trifluoromethylphenyl]indenyl)$_2$zirconium dichloride;
dimethylsiladiyl(2-n-butyl, 4-[3',5'-bis-trifluoromethylphenyl]indenyl)$_2$zirconium dichloride;
dimethylsiladiyl(2-iso-butyl, 4-[3',5'-bis-trifluoromethylphenyl]indenyl)$_2$zirconium dichloride;
dimethylsiladiyl(2-sec-butyl, 4-[3',5'-bis-trifluoromethylphenyl]indenyl)$_2$zirconium dichloride;
dimethylsiladiyl(2-tert-butyl, 4-[3',5'-bis-trifluoromethylphenyl]indenyl)$_2$zirconium dichloride;
dimethylsiladiyl(2-methyl, 4-[3',5'-bis-trifluoromethylphenyl]indenyl)$_2$hafnium dichloride;
dimethylsiladiyl(2-ethyl, 4-[3',5'-bis-trifluoromethylphenyl]indenyl)$_2$hafnium dichloride;
dimethylsiladiyl(2-n-propyl, 4-[3',5'-bis-trifluoromethylphenyl]indenyl)$_2$hafnium dichloride;
dimethylsiladiyl(2-iso-propyl, 4-[3',5'-bis-trifluoromethylphenyl]indenyl)$_2$hafnium dichloride;
dimethylsiladiyl(2-n-butyl, 4-[3',5'-bis-trifluoromethylphenyl]indenyl)$_2$hafnium dichloride;
dimethylsiladiyl(2-iso-butyl, 4-[3',5'-bis-trifluoromethylphenyl]indenyl)$_2$hafnium dichloride;

dimethylsiladiyl(2-sec-butyl, 4-[3',5'-bis-trifluoromethylphenyl]indenyl)$_2$hafnium dichloride;
dimethylsiladiyl(2-tert-butyl, 4-[3',5'-bis-trifluoromethylphenyl]indenyl)$_2$hafnium dichloride;
9-silafluorendiyl(2-methyl, 4-[3',5'-bis-trifluoromethylphenyl]indenyl)$_2$zirconium dichloride;
dimethylsiladiyl(2-ethyl, 4-[3',5'-bis-trifluoromethylphenyl]indenyl)$_2$hafnium dichloride;
9-silafluorendiyl(2-n-propyl, 4-[3',5'-bis-trifluoromethylphenyl]indenyl)$_2$zirconium dichloride;
9-silafluorendiyl(2-iso-propyl, 4-[3',5'-bis-trifluoromethylphenyl]indenyl)$_2$zirconium dichloride;
9-silafluorendiyl(2-n-butyl, 4-[3',5'-bis-trifluoromethylphenyl]indenyl)$_2$zirconium dichloride;
9-silafluorendiyl(2-iso-butyl, 4-[3',5'-bis-trifluoromethylphenyl]indenyl)$_2$zirconium dichloride;
9-silafluorendiyl(2-sec-butyl, 4-[3',5'-bis-trifluoromethylphenyl]indenyl)$_2$zirconium dichloride;
9-silafluorendiyl(2-tert-butyl, 4-[3',5'-bis-trifluoromethylphenyl]indenyl)$_2$zirconium dichloride;
9-silafluorendiyl(2-methyl, 4-[3',5'-bis-trifluoromethylphenyl]indenyl)$_2$hafnium dichloride;
9-silafluorendiyl(2-ethyl, 4-[3',5'-bis-trifluoromethylphenyl]indenyl)$_2$hafnium dichloride;
9-silafluorendiyl(2-n-propyl, 4-[3',5'-bis-trifluoromethylphenyl]indenyl)$_2$ hafnium dichloride;
9-silafluorendiyl(2-iso-propyl, 4-[3',5'-bis-trifluoromethylphenyl]indenyl)$_2$ hafnium dichloride;
9-silafluorendiyl(2-n-butyl, 4-[3',5'-bis-trifluoromethylphenyl]indenyl)$_2$hafnium dichloride;
9-silafluorendiyl(2-iso-butyl, 4-[3',5'-bis-trifluoromethylphenyl]indenyl)$_2$hafnium dichloride;
9-silafluorendiyl(2-sec-butyl, 4-[3',5'-bis-trifluoromethylphenyl]indenyl)$_2$hafnium dichloride;
9-silafluorendiyl(2-tert-butyl, 4-[3',5'-bis-trifluoromethylphenyl]indenyl)$_2$hafnium dichloride;
dimethylsiladiyl(2-methyl, 4-[3',5'-bis-trifluoromethylphenyl]indenyl)$_2$zirconium dimethyl;
dimethylsiladiyl(2-ethyl, 4-[3',5'-bis-trifluoromethylphenyl]indenyl)$_2$zirconium dimethyl;
dimethylsiladiyl(2-n-propyl, 4-[3',5'-bis-trifluoromethylphenyl]indenyl)$_2$zirconium dimethyl;
dimethylsiladiyl(2-iso-propyl, 4-[3',5'-bis-trifluoromethylphenyl]indenyl)$_2$zirconium dimethyl;
dimethylsiladiyl(2-n-butyl, 4-[3',5'-bis-trifluoromethylphenyl]indenyl)$_2$zirconium dimethyl;
dimethylsiladiyl(2-iso-butyl, 4-[3',5'-bis-trifluoromethylphenyl]indenyl)$_2$zirconium dimethyl;
dimethylsiladiyl(2-sec-butyl, 4-[3',5'-bis-trifluoromethylphenyl]indenyl)$_2$zirconium dimethyl;
dimethylsiladiyl(2-tert-butyl, 4-[3',5'-bis-trifluoromethylphenyl]indenyl)$_2$zirconium dimethyl;
dimethylsiladiyl(2-methyl, 4-[3',5'-bis-trifluoromethylphenyl]indenyl)$_2$hafnium dimethyl;
dimethylsiladiyl(2-ethyl, 4-[3',5'-bis-trifluoromethylphenyl]indenyl)$_2$hafnium dimethyl;
dimethylsiladiyl(2-n-propyl, 4-[3',5'-bis-trifluoromethylphenyl]indenyl)$_2$hafnium dimethyl;
dimethylsiladiyl(2-iso-propyl, 4-[3',5'-bis-trifluoromethylphenyl]indenyl)$_2$hafnium dimethyl;
dimethylsiladiyl(2-n-butyl, 4-[3',5'-bis-trifluoromethylphenyl]indenyl)$_2$hafnium dimethyl;
dimethylsiladiyl(2-iso-butyl, 4-[3',5'-bis-trifluoromethylphenyl]indenyl)$_2$hafnium dimethyl;
dimethylsiladiyl(2-sec-butyl, 4-[3',5'-bis-trifluoromethylphenyl]indenyl)$_2$hafnium dimethyl;
dimethylsiladiyl(2-tert-butyl, 4-[3',5'-bis-trifluoromethylphenyl]indenyl)$_2$hafnium dimethyl;
9-silafluorendiyl(2-methyl, 4-[3',5'-bis-trifluoromethylphenyl]indenyl)$_2$zirconium dimethyl;
dimethylsiladiyl(2-ethyl, 4-[3',5'-bis-trifluoromethylphenyl]indenyl)$_2$hafnium dimethyl;
9-silafluorendiyl(2-n-propyl, 4-[3',5'-bis-trifluoromethylphenyl]indenyl)$_2$zirconium dimethyl;
9-silafluorendiyl(2-iso-propyl, 4-[3',5'-bis-trifluoromethylphenyl]indenyl)$_2$zirconium dimethyl;
9-silafluorendiyl(2-n-butyl, 4-[3',5'-bis-trifluoromethylphenyl]indenyl)$_2$zirconium dimethyl;
9-silafluorendiyl(2-iso-butyl, 4-[3',5'-bis-trifluoromethylphenyl]indenyl)$_2$zirconium dimethyl;
9-silafluorendiyl(2-sec-butyl, 4-[3',5'-bis-trifluoromethylphenyl]indenyl)$_2$zirconium dimethyl;
9-silafluorendiyl(2-tert-butyl, 4-[3',5'-bis-trifluoromethylphenyl]indenyl)$_2$zirconium dimethyl;
9-silafluorendiyl(2-methyl, 4-[3',5'-bis-trifluoromethylphenyl]indenyl)$_2$hafnium dimethyl;
9-silafluorendiyl(2-ethyl, 4-[3',5'-bis-trifluoromethylphenyl]indenyl)$_2$hafnium dimethyl;
9-silafluorendiyl(2-n-propyl, 4-[3',5'-bis-trifluoromethylphenyl]indenyl)$_2$ hafnium dimethyl;
9-silafluorendiyl(2-iso-propyl, 4-[3',5'-bis-trifluoromethylphenyl]indenyl)$_2$ hafnium dimethyl;
9-silafluorendiyl(2-n-butyl, 4-[3',5'-bis-trifluoromethylphenyl]indenyl)$_2$hafnium dimethyl;
9-silafluorendiyl(2-iso-butyl, 4-[3',5'-bis-trifluoromethylphenyl]indenyl)$_2$hafnium dimethyl;
9-silafluorendiyl(2-sec-butyl, 4-[3',5'-bis-trifluoromethylphenyl]indenyl)$_2$hafnium dimethyl;
9-silafluorendiyl(2-tert-butyl, 4-[3',5'-bis-trifluoromethylphenyl]indenyl)$_2$hafnium dimethyl;
dimethylsiladiyl(2-ethyl, 4-[3',5'-di-iso-propylphenyl]indenyl)$_2$zirconium dichloride;
dimethylsiladiyl(2-n-propyl, 4-[3',5'-di-iso-propylphenyl]indenyl)$_2$zirconium dichloride
dimethylsiladiyl(2-iso-propyl, 4-[3',5'-di-iso-propylphenyl]indenyl)$_2$zirconium dichloride;
dimethylsiladiyl(2-n-butyl, 4-[3',5'-di-iso-propylphenyl]indenyl)$_2$zirconium dichloride;
dimethylsiladiyl(2-iso-butyl, 4-[3',5'-di-iso-propylphenyl]indenyl)$_2$zirconium dichloride;
dimethylsiladiyl(2-sec-butyl, 4-[3',5'-di-iso-propylphenyl]indenyl)$_2$zirconium dichloride;
dimethylsiladiyl(2-tert-butyl, 4-[3',5'-di-iso-propylphenyl]indenyl)$_2$zirconium dichloride;
dimethylsiladiyl(2-ethyl, 4-[3',5'-di-iso-propylphenyl]indenyl)$_2$hafnium dichloride;
dimethylsiladiyl(2-n-propyl, 4-[3',5'-di-iso-propylphenyl]indenyl)$_2$hafnium dichloride;
dimethylsiladiyl(2-iso-propyl, 4-[3',5'-di-iso-propylphenyl]indenyl)$_2$hafnium dichloride;
dimethylsiladiyl(2-n-butyl, 4-[3',5'-di-iso-propylphenyl]indenyl)$_2$hafnium dichloride;
dimethylsiladiyl(2-iso-butyl, 4-[3',5'-di-iso-propylphenyl]indenyl)$_2$hafnium dichloride;
dimethylsiladiyl(2-sec-butyl, 4-[3',5'-di-iso-propylphenyl]indenyl)$_2$hafnium dichloride;
dimethylsiladiyl(2-tert-butyl, 4-[3',5'-di-iso-propylphenyl]indenyl)$_2$hafnium dichloride;
9-silafluorendiyl(2-ethyl, 4-[3',5'-di-iso-propylphenyl]indenyl)$_2$zirconium dichloride;
9-silafluorendiyl(2-n-propyl, 4-[3',5'-di-iso-propylphenyl]indenyl)$_2$zirconium dichloride;

9-silafluorendiyl(2-iso-propyl, 4-[3',5'-di-iso-propylphenyl]indenyl)$_2$zirconium dichloride;
9-silafluorendiyl(2-n-butyl, 4-[3',5'-di-iso-propylphenyl] indenyl)$_2$zirconium dichloride;
9-silafluorendiyl(2-iso-butyl, 4-[3',5'-di-iso-propylphenyl]indenyl)$_2$zirconium dichloride;
9-silafluorendiyl(2-sec-butyl, 4-[3',5'-di-iso-propylphenyl]indenyl)$_2$zirconium dichloride;
9-silafluorendiyl(2-tert-butyl, 4-[3',5'-di-iso-propylphenyl]indenyl)$_2$zirconium dichloride;
9-silafluorendiyl(2-ethyl, 4-[3',5'-di-iso-propylphenyl]indenyl)$_2$hafnium dichloride;
9-silafluorendiyl(2-n-propyl, 4-[3',5'-di-iso-propylphenyl] indenyl)$_2$hafnium dichloride;
9-silafluorendiyl(2-iso-propyl, 4-[3',5'-di-iso-propylphenyl]indenyl)$_2$hafnium dichloride;
9-silafluorendiyl(2-n-butyl, 4-[3',5'-di-iso-propylphenyl] indenyl)$_2$hafnium dichloride;
9-silafluorendiyl(2-iso-butyl, 4-[3',5'-di-iso-propylphenyl]indenyl)$_2$hafnium dichloride;
9-silafluorendiyl(2-sec-butyl, 4-[3',5'-di-iso-propylphenyl]indenyl)$_2$hafnium dichloride;
9-silafluorendiyl(2-tert-butyl, 4-[3',5'-di-iso-propylphenyl]indenyl)$_2$hafnium dichloride;
dimethylsiladiyl(2-ethyl, 4-[3',5'-di-iso-propylphenyl]indenyl)$_2$zirconium dimethyl;
dimethylsiladiyl(2-n-propyl, 4-[3',5'-di-iso-propylphenyl] indenyl)$_2$zirconium dimethyl;
dimethylsiladiyl(2-iso-propyl, 4-[3',5'-di-iso-propylphenyl]indenyl)$_2$zirconium dimethyl;
dimethylsiladiyl(2-n-butyl, 4-[3',5'-di-iso-propylphenyl] indenyl)$_2$zirconium dimethyl;
dimethylsiladiyl(2-isobutyl, 4-[3',5'-di-iso-propylphenyl] indenyl)$_2$zirconium dimethyl;
dimethylsiladiyl(2-sec-butyl, 4-[3',5'-di-iso-propylphenyl]indenyl)$_2$zirconium dimethyl;
dimethylsiladiyl(2-tert-butyl, 4-[3',5'-di-iso-propylphenyl]indenyl)$_2$zirconium dimethyl;
dimethylsiladiyl(2-ethyl, 4-[3',5'-di-iso-propylphenyl]indenyl)$_2$hafnium dimethyl;
dimethylsiladiyl(2-n-propyl, 4-[3',5'-di-iso-propylphenyl] indenyl)$_2$hafnium dimethyl;
dimethylsiladiyl(2-iso-propyl, 4-[3',5'-di-iso-propylphenyl]indenyl)$_2$hafnium dimethyl;
dimethylsiladiyl(2-n-butyl, 4-[3',5'-di-iso-propylphenyl] indenyl)$_2$hafnium dimethyl;
dimethylsiladiyl(2-iso-butyl, 4-[3',5'-di-iso-propylphenyl] indenyl)$_2$zirconium dimethyl;
dimethylsiladiyl(2-sec-butyl, 4-[3',5'-di-iso-propylphenyl]indenyl)$_2$zirconium dimethyl;
dimethylsiladiyl(2-tert-butyl, 4-[3',5'-di-iso-propylphenyl]indenyl)$_2$zirconium dimethyl;
9-silafluorendiyl(2-ethyl, 4-[3',5'-di-iso-propylphenyl]indenyl)$_2$zirconium dimethyl;
9-silafluorendiyl(2-n-propyl, 4-[3',5'-di-iso-propylphenyl] indenyl)$_2$zirconium dimethyl;
9-silafluorendiyl(2-iso-propyl, 4-[3',5'-di-iso-propylphenyl]indenyl)$_2$zirconium dimethyl;
9-silafluorendiyl(2-n-butyl, 4-[3',5'-di-iso-propylphenyl] indenyl)$_2$zirconium dimethyl;
9-silafluorendiyl(2-iso-butyl, 4-[3',5'-di-iso-propylphenyl]indenyl)$_2$zirconium dimethyl;
9-silafluorendiyl(2-sec-butyl, 4-[3',5'-di-iso-propylphenyl]indenyl)$_2$zirconium dimethyl;
9-silafluorendiyl(2-tert-butyl, 4-[3',5'-di-iso-propylphenyl]indenyl)$_2$zirconium dimethyl;
9-silafluorendiyl(2-ethyl, 4-[3',5'-di-iso-propylphenyl]indenyl)$_2$hafnium dimethyl;
9-silafluorendiyl(2-n-propyl, 4-[3',5'-di-iso-propylphenyl] indenyl)$_2$hafnium dimethyl;
9-silafluorendiyl(2-iso-propyl, 4-[3',5'-di-iso-propylphenyl]indenyl)$_2$hafnium dimethyl;
9-silafluorendiyl(2-n-butyl, 4-[3',5'-di-iso-propylphenyl] indenyl)$_2$hafnium dimethyl;
9-silafluorendiyl(2-iso-butyl, 4-[3',5'-di-iso-propylphenyl]indenyl)$_2$hafnium dimethyl;
9-silafluorendiyl(2-sec-butyl, 4-[3',5'-di-iso-propylphenyl]indenyl)$_2$hafnium dimethyl;
9-silafluorendiyl(2-tert-butyl, 4-[3',5'-di-iso-propylphenyl]indenyl)$_2$hafnium dimethyl;
dimethylsiladiyl(2-methyl, 4-[3',5'-di-phenylphenyl]indenyl)$_2$zirconium dichloride;
dimethylsiladiyl(2-ethyl, 4-[3',5'-di-phenylphenyl]indenyl)$_2$zirconium dichloride;
dimethylsiladiyl(2-n-propyl, 4-[3',5'-di-phenylphenyl]indenyl)$_2$zirconium dichloride;
dimethylsiladiyl(2-iso-propyl, 4-[3',5'-di-phenylphenyl] indenyl)$_2$zirconium dichloride;
dimethylsiladiyl(2-n-butyl, 4-[3',5'-di-phenylphenyl]indenyl)$_2$zirconium dichloride;
dimethylsiladiyl(2-iso-butyl, 4-[3',5'-di-phenylphenyl]indenyl)$_2$zirconium dichloride;
dimethylsiladiyl(2-sec-butyl, 4-[3',5'-di-phenylphenyl]indenyl)$_2$zirconium dichloride;
dimethylsiladiyl(2-tert-butyl, 4-[3',5'-di-phenylphenyl]indenyl)$_2$zirconium dichloride;
dimethylsiladiyl(2-methyl, 4-[3',5'-di-phenylphenyl]indenyl)$_2$hafnium dichloride;
dimethylsiladiyl(2-ethyl, 4-[3',5'-di-phenylphenyl]indenyl)$_2$hafnium dichloride;
dimethylsiladiyl(2-n-propyl, 4-[3',5'-di-phenylphenyl]indenyl)$_2$hafnium dichloride;
dimethylsiladiyl(2-iso-propyl, 4-[3',5'-di-phenylphenyl] indenyl)$_2$hafnium dichloride;
dimethylsiladiyl(2-n-butyl, 4-[3',5'-di-phenylphenyl]indenyl)$_2$hafnium dichloride;
dimethylsiladiyl(2-iso-butyl, 4-[3',5'-di-phenylphenyl]indenyl)$_2$hafnium dichloride;
dimethylsiladiyl(2-sec-butyl, 4-[3',5'-di-phenylphenyl]indenyl)$_2$hafnium dichloride;
dimethylsiladiyl(2-tert-butyl, 4-[3',5'-di-phenylphenyl]indenyl)$_2$hafnium dichloride;
9-silafluorendiyl(2-methyl, 4-[3',5'-di-phenylphenyl]indenyl)$_2$zirconium dichloride;
9-silafluorendiyl(2-ethyl, 4-[3',5'-di-phenylphenyl]indenyl)$_2$zirconium dichloride;
9-silafluorendiyl(2-n-propyl, 4-[3',5'-di-phenylphenyl]indenyl)$_2$zirconium dichloride;
9-silafluorendiyl(2-iso-propyl, 4-[3',5'-di-phenylphenyl] indenyl)$_2$zirconium dichloride;
9-silafluorendiyl(2-n-butyl, 4-[3',5'-di-phenylphenyl]indenyl)$_2$zirconium dichloride;
9-silafluorendiyl(2-iso-butyl, 4-[3',5'-di-phenylphenyl]indenyl)$_2$zirconium dichloride;
9-silafluorendiyl(2-sec-butyl, 4-[3',5'-di-phenylphenyl]indenyl)$_2$zirconium dichloride;
9-silafluorendiyl(2-tert-butyl, 4-[3',5'-di-phenylphenyl]indenyl)$_2$zirconium dichloride;
9-silafluorendiyl(2-methyl, 4-[3',5'-di-phenylphenyl]indenyl)$_2$hafnium dichloride;
9-silafluorendiyl(2-ethyl, 4-[3',5'-di-phenylphenyl]indenyl)$_2$hafnium dichloride;

9-silafluorendiyl(2-n-propyl, 4-[3',5'-di-phenylphenyl]indenyl)$_2$hafnium dichloride;

9-silafluorendiyl(2-iso-propyl, 4-[3',5'-di-phenylphenyl] indenyl)$_2$hafnium dichloride;

9-silafluorendiyl(2-n-butyl, 4-[3',5'-di-phenylphenyl]indenyl)$_2$hafnium dichloride;

9-silafluorendiyl(2-iso-butyl, 4-[3',5'-di-phenylphenyl]indenyl)$_2$hafnium dichloride;

9-silafluorendiyl(2-sec-butyl, 4-[3',5'-di-phenylphenyl]indenyl)$_2$hafnium dichloride;

9-silafluorendiyl(2-tert-butyl, 4-[3',5'-di-phenylphenyl]indenyl)$_2$hafnium dichloride;

dimethylsiladiyl(2-methyl, 4-[3',5'-di-phenylphenyl]indenyl)$_2$zirconium dimethyl;

dimethylsiladiyl(2-ethyl, 4-[3',5'-di-phenylphenyl]indenyl)$_2$zirconium dimethyl;

dimethylsiladiyl(2-n-propyl, 4-[3',5'-di-phenylphenyl]indenyl)$_2$zirconium dimethyl;

dimethylsiladiyl(2-iso-propyl, 4-[3',5'-di-phenylphenyl] indenyl)$_2$zirconium dimethyl;

dimethylsiladiyl(2-n-butyl, 4-[3',5'-di-phenylphenyl]indenyl)$_2$zirconium dimethyl;

dimethylsiladiyl(2-iso-butyl, 4-[3',5'-di-phenylphenyl]indenyl)$_2$zirconium dimethyl;

dimethylsiladiyl(2-sec-butyl, 4-[3',5'-di-phenylphenyl]indenyl)$_2$zirconium dimethyl;

dimethylsiladiyl(2-tert-butyl, 4-[3',5'-di-phenylphenyl]indenyl)$_2$zirconium dimethyl;

dimethylsiladiyl(2-methyl, 4-[3',5'-di-phenylphenyl]indenyl)$_2$hafnium dimethyl;

dimethylsiladiyl(2-ethyl, 4-[3',5'-di-phenylphenyl]indenyl)$_2$hafnium dimethyl;

dimethylsiladiyl(2-n-propyl, 4-[3',5'-di-phenylphenyl]indenyl)$_2$hafnium dimethyl;

dimethylsiladiyl(2-iso-propyl, 4-[3',5'-di-phenylphenyl] indenyl)$_2$hafnium dimethyl;

dimethylsiladiyl(2-n-butyl, 4-[3',5'-di-phenylphenyl]indenyl)$_2$hafnium dimethyl;

dimethylsiladiyl(2-iso-butyl, 4-[3',5'-di-phenylphenyl]indenyl)$_2$hafnium dimethyl;

dimethylsiladiyl(2-sec-butyl, 4-[3',5'-di-phenylphenyl]indenyl)$_2$hafnium dimethyl;

dimethylsiladiyl(2-tert-butyl, 4-[3',5'-di-phenylphenyl]indenyl)$_2$hafnium dimethyl;

9-silafluorendiyl(2-methyl, 4-[3',5'-di-phenylphenyl]indenyl)$_2$zirconium dimethyl;

9-silafluorendiyl(2-ethyl, 4-[3',5'-di-phenylphenyl]indenyl)$_2$zirconium dimethyl;

9-silafluorendiyl(2-n-propyl, 4-[3',5'-di-phenylphenyl]indenyl)$_2$zirconium dimethyl;

9-silafluorendiyl(2-iso-propyl, 4-[3',5'-di phenylphenyl] indenyl)$_2$zirconium dimethyl;

9-silafluorendiyl(2-n-butyl, 4-[3',5'-di-phenylphenyl]indenyl)$_2$zirconium dimethyl;

9-silafluorendiyl(2-iso-butyl, 4-[3',5'-di-phenylphenyl]indenyl)$_2$zirconium dimethyl;

9-silafluorendiyl(2-sec-butyl, 4-[3',5'-di-phenylphenyl]indenyl)$_2$zirconium dimethyl;

9-silafluorendiyl(2-tert-butyl, 4-[3',5'-di-phenylphenyl]indenyl)$_2$zirconium dimethyl;

9-silafluorendiyl(2-methyl, 4-[3',5'-di-phenylphenyl]indenyl)$_2$hafnium dimethyl;

9-silafluorendiyl(2-ethyl, 4-[3',5'-di-phenylphenyl]indenyl)$_2$hafnium dichloride;

9-silafluorendiyl(2-n-propyl, 4-[3',5'-di-phenylphenyl]indenyl)$_2$hafnium dimethyl;

9-silafluorendiyl(2-iso-propyl, 4-[3',5'-di-phenylphenyl] indenyl)$_2$hafnium dimethyl;

9-silafluorendiyl(2-n-butyl, 4-[3',5'-di-phenylphenyl]indenyl)$_2$hafnium dimethyl;

9-silafluorendiyl(2-iso-butyl, 4-[3',5'-di-phenylphenyl]indenyl)$_2$hafnium dimethyl;

9-silafluorendiyl(2-sec-butyl, 4-[3',5'-di-phenylphenyl]indenyl)$_2$hafnium dimethyl;

9-silafluorendiyl(2-tert-butyl, 4-[3',5'-di-phenylphenyl]indenyl)$_2$hafnium dimethyl;

dimethylamidoborane(2-methyl, 4-[3',5'-di-tbutylphenyl] indenyl)$_2$zirconium dichloride;

dimethylamidoborane(2-ethyl, 4-[3',5'-di-tbutylphenyl] indenyl)$_2$zirconium dichloride;

dimethylamidoborane(2-n-propyl, 4-[3',5'-di-tbutylphenyl]indenyl)$_2$zirconium dichloride;

dimethylamidoborane(2-iso-propyl, 4-[3',5'-di-tbutylphenyl]indenyl)$_2$zirconium dichloride;

dimethylamidoborane(2-n-butyl, 4-[3',5'-di-tbutylphenyl] indenyl)$_2$zirconium dichloride;

dimethylamidoborane(2-iso-butyl, 4-[3',5'-di-tbutylphenyl]indenyl)$_2$zirconium dichloride;

dimethylamidoborane(2-sec-butyl, 4-[3',5'-di-tbutylphenyl]indenyl)$_2$zirconium dichloride;

dimethylamidoborane(2-tert-butyl, 4-[3',5'-di-tbutylphenyl]indenyl)$_2$zirconium dichloride;

dimethylamidoborane(2-ethyl, 4-[3',5'-bis-trifluoromethylphenyl]indenyl)$_2$zirconium dichloride;

dimethylamidoborane(2-n-propyl, 4-[3',5'-bis-trifluoromethylphenyl]indenyl)$_2$zirconium dichloride;

dimethylamidoborane(2-iso-propyl, 4-[3',5'-bis-trifluoromethylphenyl]indenyl)$_2$zirconium dichloride;

dimethylamidoborane(2-n-butyl, 4-[3',5'-bis-trifluoromethylphenyl]indenyl)$_2$zirconium dichloride;

dimethylamidoborane(2-iso-butyl, 4-[3',5'-bis-trifluoromethylphenyl]indenyl)$_2$zirconium dichloride;

dimethylamidoborane(2-sec-butyl, 4-[3',5'-bis-trifluoromethylphenyl]indenyl)$_2$zirconium dichloride;

dimethylamidoborane(2-tert-butyl, 4-[3',5'-bis-trifluoromethylphenyl]indenyl)$_2$zirconium dichloride;

dimethylamidoborane(2-ethyl, 4-[3',5'-di-iso-propylphenyl]indenyl)$_2$zirconium dichloride;

dimethylamidoborane(2-n-propyl, 4-[3',5'-di-iso-propylphenyl]indenyl)$_2$zirconium dichloride dimethylamidoborane(2-iso-propyl, 4-[3',5'-di-iso-propylphenyl]indenyl)$_2$zirconium dichloride;

dimethylamidoborane(2-n-butyl, 4-[3',5'-di-iso-propylphenyl]indenyl)$_2$zirconium dichloride;

dimethylamidoborane(2-iso-butyl, 4-[3',5'-di-iso-propylphenyl]indenyl)$_2$zirconium dichloride;

dimethylamidoborane(2-sec-butyl, 4-[3',5'-di-iso-propylphenyl]indenyl)$_2$zirconium dichloride;

dimethylamidoborane(2-tert-butyl, 4-[3',5'-di-iso-propylphenyl]indenyl)$_2$zirconium dichloride;

dimethylamidoborane(2-methyl, 4-[3',5'-di-phenylphenyl]indenyl)$_2$zirconium dichloride;

dimethylamidoborane(2-ethyl, 4-[3',5'-di-phenylphenyl] indenyl)$_2$zirconium dichloride;

dimethylamidoborane(2-n-propyl, 4-[3',5'-di-phenylphenyl]indenyl)$_2$zirconium dichloride;

dimethylamidoborane(2-iso-propyl, 4-[3',5'-di-phenylphenyl]indenyl)$_2$zirconium dichloride;

dimethylamidoborane(2-n-butyl, 4-[3',5'-di-phenylphenyl]indenyl)$_2$zirconium dichloride;

dimethylamidoborane(2-iso-butyl, 4-[3',5'-di-phenylphenyl]indenyl)$_2$zirconium dichloride;

dimethylamidoborane(2-sec-butyl, 4-[3',5'-di-phenylphenyl]indenyl)$_2$zirconium dichloride;

dimethylamidoborane(2-tert-butyl, 4-[3',5'-di-phenylphenyl]indenyl)$_2$zirconium dichloride;

dimethylamidoborane(2-methyl, 4-[3',5'-di-tbutylphenyl]indenyl)$_2$zirconium dimethyl;

dimethylamidoborane(2-ethyl, 4-[3',5'-di-tbutylphenyl]indenyl)$_2$zirconium dimethyl;

dimethylamidoborane(2-n-propyl, 4-[3',5'-di-tbutylphenyl]indenyl)$_2$zirconium dimethyl;

dimethylamidoborane(2-iso-propyl, 4-[3',5'-di-tbutylphenyl]indenyl)$_2$zirconium dimethyl;

dimethylamidoborane(2-n-butyl, 4-[3',5'-di-tbutylphenyl]indenyl)$_2$zirconium dimethyl;

dimethylamidoborane(2-iso-butyl, 4-[3',5'-di-tbutylphenyl]indenyl)$_2$zirconium dimethyl;

dimethylamidoborane(2-sec-butyl, 4-[3',5'-di-tbutylphenyl]indenyl)$_2$zirconium dimethyl;

dimethylamidoborane(2-tert-butyl, 4-[3',5'-di-tbutylphenyl]indenyl)$_2$zirconium dimethyl;

dimethylamidoborane(2-ethyl, 4-[3',5'-bis-trifluoromethylphenyl]indenyl)$_2$zirconium dimethyl;

dimethylamidoborane(2-n-propyl, 4-[3',5'-bis-trifluoromethylphenyl]indenyl)$_2$zirconium dimethyl;

dimethylamidoborane(2-iso-propyl, 4-[3',5'-bis-trifluoromethylphenyl]indenyl)$_2$zirconium dimethyl;

dimethylamidoborane(2-n-butyl, 4-[3',5'-bis-trifluoromethylphenyl]indenyl)$_2$zirconium dimethyl;

dimethylamidoborane(2-iso-butyl, 4-[3',5'-bis-trifluoromethylphenyl]indenyl)$_2$zirconium dimethyl;

dimethylamidoborane(2-sec-butyl, 4-[3',5'-bis-trifluoromethylphenyl]indenyl)$_2$zirconium dimethyl;

dimethylamidoborane(2-tert-butyl, 4-[3',5'-bis-trifluoromethylphenyl]indenyl)$_2$zirconium dimethyl;

dimethylamidoborane(2-ethyl, 4-[3',5'-di-iso-propylphenyl]indenyl)$_2$zirconium dimethyl;

dimethylamidoborane(2-n-propyl, 4-[3',5'-di-iso-propylphenyl]indenyl)$_2$zirconium dimethyl dimethylamidoborane(2-iso-propyl, 4-[3',5'-di-iso-propylphenyl]indenyl)$_2$zirconium dimethyl;

dimethylamidoborane(2-n-butyl, 4-[3',5'-di-iso-propylphenyl]indenyl)$_2$zirconium dimethyl;

dimethylamidoborane(2-iso-butyl, 4-[3',5'-di-iso-propylphenyl]indenyl)$_2$zirconium dimethyl;

dimethylamidoborane(2-sec-butyl, 4-[3',5'-di-iso-propylphenyl]indenyl)$_2$zirconium dimethyl;

dimethylamidoborane(2-tert-butyl, 4-[3',5'-di-iso-propylphenyl]indenyl)$_2$zirconium dimethyl;

dimethylamidoborane(2-methyl, 4-[3',5'-di-phenylphenyl]indenyl)$_2$zirconium dimethyl;

dimethylamidoborane(2-ethyl, 4-[3',5'-di-phenylphenyl]indenyl)$_2$zirconium dimethyl;

dimethylamidoborane(2-n-propyl, 4-[3',5'-di-phenylphenyl]indenyl)$_2$zirconium dimethyl;

dimethylamidoborane(2-iso-propyl, 4-[3',5'-di-phenylphenyl]indenyl)$_2$zirconium dimethyl;

dimethylamidoborane(2-n-butyl, 4-[3',5'-di-phenylphenyl]indenyl)$_2$zirconium dimethyl;

dimethylamidoborane(2-iso-butyl, 4-[3',5'-di-phenylphenyl]indenyl)$_2$zirconium dimethyl;

dimethylamidoborane(2-sec-butyl, 4-[3',5'-di-phenylphenyl]indenyl)$_2$zirconium dimethyl;

dimethylamidoborane(2-tert-butyl, 4-[3',5'-di-phenylphenyl]indenyl)$_2$zirconium dimethyl;

diisopropylamidoborane(2-methyl, 4-[3',5'-di-tbutylphenyl]indenyl)$_2$zirconium dichloride;

diisopropylamidoborane(2-ethyl, 4-[3',5'-di-tbutylphenyl]indenyl)$_2$zirconium dichloride;

diisopropylamidoborane(2-n-propyl, 4-[3',5'-di-tbutylphenyl]indenyl)$_2$zirconium dichloride;

diisopropylamidoborane(2-iso-propyl, 4-[3',5'-di-tbutylphenyl]indenyl)$_2$zirconium dichloride;

diisopropylamidoborane(2-n-butyl, 4-[3',5'-di-tbutylphenyl]indenyl)$_2$zirconium dichloride;

diisopropylamidoborane(2-iso-butyl, 4-[3',5'-di-tbutylphenyl]indenyl)$_2$zirconium dichloride;

diisopropylamidoborane(2-sec-butyl, 4-[3',5'-di-tbutylphenyl]indenyl)$_2$zirconium dichloride;

diisopropylamidoborane(2-tert-butyl, 4-[3',5'-di-tbutylphenyl]indenyl)$_2$zirconium dichloride;

diisopropylamidoborane(2-ethyl, 4-[3',5'-bis-trifluoromethylphenyl]indenyl)$_2$zirconium dichloride;

diisopropylamidoborane(2-n-propyl, 4-[3',5'-bis-trifluoromethylphenyl]indenyl)$_2$zirconium dichloride;

diisopropylamidoborane(2-iso-propyl, 4-[3',5'-bis-trifluoromethylphenyl]indenyl)$_2$zirconium dichloride;

diisopropylamidoborane(2-n-butyl, 4-[3',5'-bis-trifluoromethylphenyl]indenyl)$_2$zirconium dichloride;

diisopropylamidoborane(2-iso-butyl, 4-[3',5'-bis-trifluoromethylphenyl]indenyl)$_2$zirconium dichloride;

diisopropylamidoborane(2-sec-butyl, 4-[3',5'-bis-trifluoromethylphenyl]indenyl)$_2$zirconium dichloride;

diisopropylamidoborane(2-tert-butyl, 4-[3',5'-bis-trifluoromethylphenyl]indenyl)$_2$zirconium dichloride;

diisopropylamidoborane(2-ethyl, 4-[3',5'-di-iso-propylphenyl]indenyl)$_2$zirconium dichloride;

diisopropylamidoborane(2-n-propyl, 4-[3',5'-di-iso-propylphenyl]indenyl)$_2$zirconium dichloride diisopropylamidoborane(2-iso-propyl, 4-[3',5'-di-iso-propylphenyl]indenyl)$_2$zirconium dichloride;

diisopropylamidoborane(2-n-butyl, 4-[3',5'-di-iso-propylphenyl]indenyl)$_2$zirconium dichloride;

diisopropylamidoborane(2-iso-butyl, 4-[3',5'-di-iso-propylphenyl]indenyl)$_2$zirconium dichloride;

diisopropylamidoborane(2-sec-butyl, 4-[3',5'-di-iso-propylphenyl]indenyl)$_2$zirconium dichloride;

diisopropylamidoborane(2-tert-butyl, 4-[3',5'-di-iso-propylphenyl]indenyl)$_2$zirconium dichloride;

diisopropylamidoborane(2-methyl, 4-[3',5'-di-phenylphenyl]indenyl)$_2$zirconium dichloride;

diisopropylamidoborane(2-ethyl, 4-[3',5'-di-phenylphenyl]indenyl)$_2$zirconium dichloride;

diisopropylamidoborane(2-n-propyl, 4-[3',5'-di-phenylphenyl]indenyl)$_2$zirconium dichloride;

diisopropylamidoborane(2-iso-propyl, 4-[3',5'-di-phenylphenyl]indenyl)$_2$zirconium dichloride;

diisopropylamidoborane(2-n-butyl, 4-[3',5'-di-phenylphenyl]indenyl)$_2$zirconium dichloride;

diisopropylamidoborane(2-iso-butyl, 4-[3',5'-di-phenylphenyl]indenyl)$_2$zirconium dichloride;

diisopropylamidoborane(2-sec-butyl, 4-[3',5'-di-phenylphenyl]indenyl)$_2$zirconium dichloride;

diisopropylamidoborane(2-tert-butyl, 4-[3',5'-di-phenylphenyl]indenyl)$_2$zirconium dichloride;

diisopropylamidoborane(2-methyl, 4-[3',5'-di-tbutylphenyl]indenyl)$_2$zirconium dimethyl;

diisopropylamidoborane(2-ethyl, 4-[3',5'-di-tbutylphenyl]indenyl)$_2$zirconium dimethyl;

diisopropylamidoborane(2-n-propyl, 4-[3',5'-di-tbutylphenyl]indenyl)$_2$zirconium dimethyl;

diisopropylamidoborane(2-iso-propyl, 4-[3',5'-di-tbutylphenyl]indenyl)$_2$zirconium dimethyl;

diisopropylamidoborane(2-n-butyl, 4-[3',5'-di-tbutylphenyl]indenyl)$_2$zirconium dimethyl;
diisopropylamidoborane(2-iso-butyl, 4-[3',5'-di-tbutylphenyl]indenyl)$_2$zirconium dimethyl;
diisopropylamidoborane(2-sec-butyl, 4-[3',5'-di-tbutylphenyl]indenyl)$_2$zirconium dimethyl;
diisopropylamidoborane(2-tert-butyl, 4-[3',5'-di-tbutylphenyl]indenyl)$_2$zirconium dimethyl;
diisopropylamidoborane(2-ethyl, 4-[3',5'-bis-trifluoromethylphenyl]indenyl)$_2$zirconium dimethyl;
diisopropylamidoborane(2-n-propyl, 4-[3',5'-bis-trifluoromethylphenyl]indenyl)$_2$zirconium dimethyl;
diisopropylamidoborane(2-iso-propyl, 4-[3',5'-bis-trifluoromethylphenyl]indenyl)$_2$zirconium dimethyl;
diisopropylamidoborane(2-n-butyl, 4-[3',5'-bis-trifluoromethylphenyl]indenyl)$_2$zirconium dimethyl;
diisopropylamidoborane(2-iso-butyl, 4-[3',5'-bis-trifluoromethylphenyl]indenyl)$_2$zirconium dimethyl;
diisopropylamidoborane(2-sec-butyl, 4-[3',5'-bis-trifluoromethylphenyl]indenyl)$_2$zirconium dimethyl;
diisopropylamidoborane(2-tert-butyl, 4-[3',5'-bis-trifluoromethylphenyl]indenyl)$_2$zirconium dimethyl;
diisopropylamidoborane(2-ethyl, 4-[3',5'-di-iso-propylphenyl]indenyl)$_2$zirconium dimethyl;
diisopropylamidoborane(2-n-propyl, 4-[3',5'-di-iso-propylphenyl]indenyl)$_2$zirconium dimethyl
diisopropylamidoborane(2-iso-propyl, 4-[3',5'-di-iso-propylphenyl]indenyl)$_2$zirconium dimethyl;
diisopropylamidoborane(2-n-butyl, 4-[3',5'-di-iso-propylphenyl]indenyl)$_2$zirconium dimethyl;
diisopropylamidoborane(2-iso-butyl, 4-[3',5'-di-iso-propylphenyl]indenyl)$_2$zirconium dimethyl;
diisopropylamidoborane(2-sec-butyl, 4-[3',5'-di-iso-propylphenyl]indenyl)$_2$zirconium dimethyl;
diisopropylamidoborane(2-tert-butyl, 4-[3',5'-di-iso-propylphenyl]indenyl)$_2$zirconium dimethyl;
diisopropylamidoborane(2-methyl, 4-[3',5'-di-phenylphenyl]indenyl)$_2$zirconium dimethyl;
diisopropylamidoborane(2-ethyl, 4-[3',5'-di-phenylphenyl]indenyl)$_2$zirconium dimethyl;
diisopropylamidoborane(2-n-propyl, 4-[3',5'-di-phenylphenyl]indenyl)$_2$zirconium dimethyl;
diisopropylamidoborane(2-iso-propyl, 4-[3',5'-di-phenylphenyl]indenyl)$_2$zirconium dimethyl;
diisopropylamidoborane(2-n-butyl, 4-[3',5'-di-phenylphenyl]indenyl)$_2$zirconium dimethyl;
diisopropylamidoborane(2-iso-butyl, 4-[3',5'-di-phenylphenyl]indenyl)$_2$zirconium dimethyl;
diisopropylamidoborane(2-sec-butyl, 4-[3',5'-di-phenylphenyl]indenyl)$_2$zirconium dimethyl;
diisopropylamidoborane(2-tert-butyl, 4-[3',5'-di-phenylphenyl]indenyl)$_2$zirconium dimethyl;
bis(trimethylsilyl)amidoborane(2-methyl, 4-[3',5'-di-tbutylphenyl]indenyl)$_2$zirconium dichloride;
bis(trimethylsilyl)amidoborane(2-ethyl, 4-[3',5'-di-tbutylphenyl]indenyl)$_2$zirconium dichloride;
bis(trimethylsilyl)amidoborane(2-n-propyl, 4-[3',5'-di-tbutylphenyl]indenyl)$_2$zirconium dichloride;
bis(trimethylsilyl)amidoborane(2-iso-propyl, 4-[3',5'-di-tbutylphenyl]indenyl)$_2$zirconium dichloride;
bis(trimethylsilyl)amidoborane(2-n-butyl, 4-[3',5'-di-tbutylphenyl]indenyl)$_2$zirconium dichloride;
bis(trimethylsilyl)amidoborane(2-iso-butyl, 4-[3',5'-di-tbutylphenyl]indenyl)$_2$zirconium dichloride;
bis(trimethylsilyl)amidoborane(2-sec-butyl, 4-[3',5'-di-tbutylphenyl]indenyl)$_2$zirconium dichloride;
bis(trimethylsilyl)amidoborane(2-tert-butyl, 4-[3',5'-di-tbutylphenyl]indenyl)$_2$zirconium dichloride;
bis(trimethylsilyl)amidoborane(2-ethyl, 4-[3',5'-bis-trifluoromethylphenyl]indenyl)$_2$zirconium dichloride;
bis(trimethylsilyl)amidoborane(2-n-propyl, 4-[3',5'-bis-trifluoromethylphenyl]indenyl)$_2$zirconium dichloride;
bis(trimethylsilyl)amidoborane(2-iso-propyl, 4-[3',5'-bis-trifluoromethylphenyl]indenyl)$_2$zirconium dichloride;
bis(trimethylsilyl)amidoborane(2-n-butyl, 4-[3',5'-bis-trifluoromethylphenyl]indenyl)$_2$zirconium dichloride;
bis(trimethylsilyl)amidoborane(2-iso-butyl, 4-[3',5'-bis-trifluoromethylphenyl]indenyl)$_2$zirconium dichloride;
bis(trimethylsilyl)amidoborane(2-sec-butyl, 4-[3',5'-bis-trifluoromethylphenyl]indenyl)$_2$zirconium dichloride;
bis(trimethylsilyl)amidoborane(2-tert-butyl, 4-[3',5'-bis-trifluoromethylphenyl]indenyl)$_2$zirconium dichloride;
bis(trimethylsilyl)amidoborane(2-ethyl, 4-[3',5'-di-iso-propylphenyl]indenyl)$_2$zirconium dichloride;
bis(trimethylsilyl)amidoborane(2-n-propyl, 4-[3',5'-di-iso-propylphenyl]indenyl)$_2$zirconium dichloride
bis(trimethylsilyl)amidoborane(2-iso-propyl, 4-[3',5'-di-iso-propylphenyl]indenyl)$_2$zirconium dichloride;
bis(trimethylsilyl)amidoborane(2-n-butyl, 4-[3',5'-di-iso-propylphenyl]indenyl)$_2$zirconium dichloride;
bis(trimethylsilyl)amidoborane(2-iso-butyl, 4-[3',5'-di-iso-propylphenyl]indenyl)$_2$zirconium dichloride;
bis(trimethylsilyl)amidoborane(2-sec-butyl, 4-[3',5'-di-iso-propylphenyl]indenyl)$_2$zirconium dichloride;
bis(trimethylsilyl)amidoborane(2-tert-butyl, 4-[3',5'-di-iso-propylphenyl]indenyl)$_2$zirconium dichloride;
bis(trimethylsilyl)amidoborane(2-methyl, 4-[3',5'-di-phenylphenyl]indenyl)$_2$zirconium dichloride;
bis(trimethylsilyl)amidoborane(2-ethyl, 4-[3',5'-di-phenylphenyl]indenyl)$_2$zirconium dichloride;
bis(trimethylsilyl)amidoborane(2-n-propyl, 4-[3',5'-di-phenylphenyl]indenyl)$_2$zirconium dichloride;
bis(trimethylsilyl)amidoborane(2-iso-propyl, 4-[3',5'-di-phenylphenyl]indenyl)$_2$zirconium dichloride;
bis(trimethylsilyl)amidoborane(2-n-butyl, 4-[3',5'-di-phenylphenyl]indenyl)$_2$zirconium dichloride;
bis(trimethylsilyl)amidoborane(2-iso-butyl, 4-[3',5'-di-phenylphenyl]indenyl)$_2$zirconium dichloride;
bis(trimethylsilyl)amidoborane(2-sec-butyl, 4-[3',5'-di-phenylphenyl]indenyl)$_2$zirconium dichloride;
bis(trimethylsilyl)amidoborane(2-tert-butyl, 4-[3',5'-di-phenylphenyl]indenyl)$_2$zirconium dichloride;
bis(trimethylsilyl)amidoborane(2-methyl, 4-[3',5'-di-tbutylphenyl]indenyl)$_2$zirconium dimethyl;
bis(trimethylsilyl)amidoborane(2-ethyl, 4-[3',5'-di-tbutylphenyl]indenyl)$_2$zirconium dimethyl;
bis(trimethylsilyl)amidoborane(2-n-propyl, 4-[3',5'-di-tbutylphenyl]indenyl)$_2$zirconium dimethyl;
bis(trimethylsilyl)amidoborane(2-iso-propyl, 4-[3',5'-di-tbutylphenyl]indenyl)$_2$zirconium dimethyl;
bis(trimethylsilyl)amidoborane(2-n-butyl, 4-[3',5'-di-tbutylphenyl]indenyl)$_2$zirconium dimethyl;
bis(trimethylsilyl)amidoborane(2-iso-butyl, 4-[3',5'-di-tbutylphenyl]indenyl)$_2$zirconium dimethyl;
bis(trimethylsilyl)amidoborane(2-sec-butyl, 4-[3',5'-di-tbutylphenyl]indenyl)$_2$zirconium dimethyl;
bis(trimethylsilyl)amidoborane(2-tert-butyl, 4-[3',5'-di-tbutylphenyl]indenyl)$_2$zirconium dimethyl;
bis(trimethylsilyl)amidoborane(2-ethyl, 4-[3',5'-bis-trifluoromethylphenyl]indenyl)$_2$zirconium dimethyl;
bis(trimethylsilyl)amidoborane(2-n-propyl, 4-[3',5'-bis-trifluoromethylphenyl]indenyl)$_2$zirconium dimethyl;

bis(trimethylsilyl)amidoborane(2-iso-propyl, 4-[3',5'-bis-trifluoromethylphenyl]indenyl)$_2$zirconium dimethyl;
bis(trimethylsilyl)amidoborane(2-n-butyl, 4-[3',5'-bis-trifluoromethylphenyl]indenyl)$_2$zirconium dimethyl;
bis(trimethylsilyl)amidoborane(2-iso-butyl, 4-[3',5'-bis-trifluoromethylphenyl]indenyl)$_2$zirconium dimethyl;
bis(trimethylsilyl)amidoborane(2-sec-butyl, 4-[3',5'-bis-trifluoromethylphenyl]indenyl)$_2$zirconium dimethyl;
bis(trimethylsilyl)amidoborane(2-tert-butyl, 4-[3',5'-bis-trifluoromethylphenyl]indenyl)$_2$zirconium dimethyl;
bis(trimethylsilyl)amidoborane(2-ethyl, 4-[3',5'-di-iso-propylphenyl]indenyl)$_2$zirconium dimethyl;
bis(trimethylsilyl)amidoborane(2-n-propyl, 4-[3',5'-di-iso-propylphenyl]indenyl)$_2$zirconium dimethyl
bis(trimethylsilyl)amidoborane(2-iso-propyl, 4-[3',5'-di-iso-propylphenyl]indenyl)$_2$zirconium dimethyl;
bis(trimethylsilyl)amidoborane(2-n-butyl, 4-[3',5'-di-iso-propylphenyl]indenyl)$_2$zirconium dimethyl;
bis(trimethylsilyl)amidoborane(2-iso-butyl, 4-[3',5'-di-iso-propylphenyl]indenyl)$_2$zirconium dimethyl;
bis(trimethylsilyl)amidoborane(2-sec-butyl, 4-[3',5'-di-iso-propylphenyl]indenyl)$_2$zirconium dimethyl;
bis(trimethylsilyl)amidoborane(2-tert-butyl, 4-[3',5'-di-iso-propylphenyl]indenyl)$_2$zirconium dimethyl;
bis(trimethylsilyl)amidoborane(2-methyl, 4-[3',5'-di-phenylphenyl]indenyl)$_2$zirconium dimethyl;
bis(trimethylsilyl)amidoborane(2-ethyl, 4-[3',5'-di-phenylphenyl]indenyl)$_2$zirconium dimethyl;
bis(trimethylsilyl)amidoborane(2-n-propyl, 4-[3',5'-di-phenylphenyl]indenyl)$_2$zirconium dimethyl;
bis(trimethylsilyl)amidoborane(2-iso-propyl, 4-[3',5'-di-phenylphenyl]indenyl)$_2$zirconium dimethyl;
bis(trimethylsilyl)amidoborane(2-n-butyl, 4-[3',5'-di-phenylphenyl]indenyl)$_2$zirconium dimethyl;
bis(trimethylsilyl)amidoborane(2-iso-butyl, 4-[3',5'-di-phenylphenyl]indenyl)$_2$zirconium dimethyl;
bis(trimethylsilyl)amidoborane(2-sec-butyl, 4-[3',5'-di-phenylphenyl]indenyl)$_2$zirconium dimethyl; and
bis(trimethylsilyl)amidoborane(2-tert-butyl, 4-[3',5'-di-phenylphenyl]indenyl)$_2$zirconium dimethyl.

41. A process to polymerize olefins comprising contacting, in a polymerization system, propylene monomers with:

1) a metallocene catalyst compound,
2) an activator,
3) optionally comonomer, and
4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the propylene, any comonomer present, any diluent or solvent present, and the polymer product, and where the propylene monomers are present in the polymerization system at 40 weight % or more, where the polymer produced has a melting point of 145° C. or more and the polymer comprises less than 10 weight % of ethylene.

42. The process of claim 41 wherein the pressure of the polymerization system is less than 125 MPa.

43. The process of claim 41 wherein the temperature is between 140 to 180° C.

44. The process of claim 41 wherein the pressure of the polymerization system is less than 100 MPa, and the temperature is between 140 to 180° C.

45. The process of claim 41 wherein the pressure of the polymerization system is between 15 and 140 MPa.

46. The process of claim 41 wherein the pressure of the polymerization system is between 15 and 50 MPa.

47. The process of claim 41 wherein solvent and or diluent is present in the polymerization system at 0 to 10 wt %.

48. The process of claim 41 wherein the propylene is present in the polymerization system at 55 wt % or more.

49. The process of claim 41 wherein the propylene is present in the polymerization system at 75 wt % or more.

50. The process of claim 41 wherein comonomer is present at 1 to 45 mole %.

51. The process of claim 41 wherein the polymerization medium of the monomer, comonomers, solvents and diluents comprises from 55-100 wt % propylene monomer; from 0 to 45 wt % of a comonomer mixture comprising at least one comonomer selected from ethylene, but-1-ene, hex-1-ene, 4-methylpent-1-ene, dicyclopentadiene, norbornene, $C_4$-$C_{2000}$ α-olefins, $C_4$-$C_{2000}$ α,internal-diolefins, and $C_4$-$C_{2000}$ α,ω-diolefins.

52. The process of claim 41 wherein the comonomer comprises one or more of ethylene, butene, hexene, or octene.

53. The process of claim 41 wherein the polymerization system further comprises a bisamide catalyst compound.

54. The process of claim 41 wherein the polymerization system further comprises a bisimide catalyst compound.

55. The process of claim 41 wherein the catalyst compound is represented by the formula:

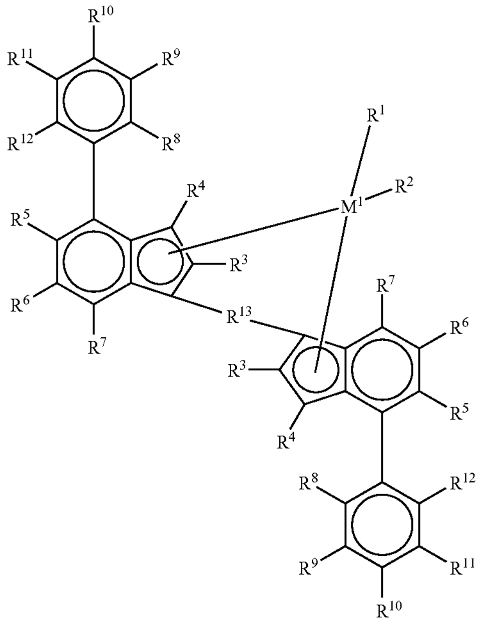

where $M^1$ is selected from titanium, zirconium, hafnium, vanadium, niobium, tantalum, chromium, molybdenum, or tungsten;

$R^1$ and $R^2$ are identical or different and are selected from hydrogen atoms, $C_1$-$C_{10}$ alkyl groups, $C_1$-$C_{10}$ alkoxy groups, $C_6$-$C_{10}$ aryl groups, $C_6$-$C_{10}$ aryloxy groups, $C_2$-$C_{10}$ alkenyl groups, $C_2$-$C_{40}$ alkenyl groups, $C_7$-$C_{40}$ arylalkyl groups, $C_7$-$C_{40}$ alkylaryl groups, $C_8$-$C_{40}$ arylalkenyl groups, OH groups or halogen atoms; or conjugated dienes that are optionally substituted with one or more hydrocarbyl, tri(hydrocarbyl)silyl groups or hydrocarbyl tri(hydrocarbyl)silylhydrocarbyl groups;

$R^3$-$R^{12}$ are the same or different and are selected from hydrogen atoms, halogen atoms, $C_1$-$C_{10}$ halogenated or unhalogenated alkyl groups, $C_6$-$C_{10}$ halogenated or unhalogenated aryl groups, $C_2$-$C_{10}$ halogenated or unhalogenated alkenyl groups, $C_7$-$C_{40}$ halogenated or unhalogenated arylalkyl groups, $C_7$-$C_{40}$ halogenated or unhalogenated alkylaryl groups, $C_8$-$C_{40}$ halogenated or unhalogenated arylalkenyl groups, —NR'$_2$, —SR', —OR', —OSiR'$_3$ or —PR'$_2$ radicals in which R' is one of a halogen atom, a $C_1$-$C_{10}$ alkyl group, or a $C_6$-$C_{10}$ aryl group; or two or more adjacent radicals $R^5$ to $R^7$ together with the atoms connecting them can form one or more rings;

$R^{13}$ is selected from

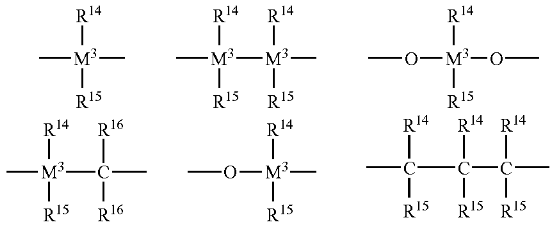

—B($R^{14}$)—, —Al($R^{14}$)—, —Ge—, —Sn—, —O—, —S—, —SO—, —$SO_2$—, —N($R^{14}$)—, —CO—, —P($R^{14}$)— —P(O)($R^{14}$)—, —B(N$R^{14}R^{15}$)— and —B[N(Si$R^{14}R^{15}R^{16}$)$_2$]—, $R^{14}$, $R^{15}$ and $R^{16}$ are each independently selected from hydrogen, halogen, $C_1$-$C_{20}$ alkyl groups, $C_6$-$C_{30}$ aryl groups, $C_1$-$C_{20}$ alkoxy groups, $C_2$-$C_{20}$ alkenyl groups, $C_7$-$C_{40}$ arylalkyl groups, $C_8$-$C_{40}$ arylalkenyl groups and $C_7$-$C_{40}$ alkylaryl groups, or $R^{14}$ and $R^{15}$, together with the atom(s) connecting them, form a ring; and $M^3$ is selected from carbon, silicon, germanium and tin, or $R^{13}$ is represented by the formula:

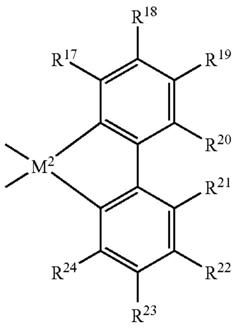

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin.

56. The process claim 41 wherein the catalyst compound comprises two or more of:

μ-dimethyl silylbis(-2-methyl, 4-phenylindenyl)zirconium dichloride,

μ-dimethyl silylbis(-2-methyl, 4-phenylindenyl)zirconium dimethyl, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilyl(tetramethylcyclopentadienyl)(dodecylamido)titanium dimethyl, dimethylsilyl(tetramethylcyclopentadienyl)(dodecylamido)titanium dichloride, dimethylsilylbis(indenyl)hafnium dichloride, dimethylsilylbis(indenyl)hafnium dimethyl, dimethylsilyl bis(2-methylindenyl)zirconium dichloride, dimethylsilyl bis(2-methylindenyl)zirconium dimethyl, dimethylsilyl bis(2-methylfluorenyl)zirconium dichloride, dimethylsilyl bis(2-methylfluorenyl)zirconium dimethyl, dimethylsilyl bis(2-methyl-5,7-propylindenyl)zirconium dichloride, dimethylsilyl bis(2-methyl-5,7-propylindenyl)zirconium dimethyl, dimethylsilyl bis(2-methyl-5-phenylindenyl)zirconium dichloride, dimethylsilyl bis(2-methyl-5-phenylindenyl)zirconium dimethyl, dimethylsilyl bis(2-ethyl-5-phenylindenyl)zirconium dichloride, dimethylsilyl bis(2-ethyl-5-phenylindenyl)zirconium dimethyl, dimethylsilyl bis(2-methyl-5-biphenylindenyl)zirconium dichloride, and dimethylsilyl bis(2-methyl-5-biphenylindenyl)zirconium dimethyl.

57. The process of claim 41 wherein the activator comprises alumoxane.

58. The process of claim 41 wherein the activator comprises a non-coordinating anion.

59. The process of claim 41 wherein the activator comprises N,N-dimethylanilinium tetra(perfluorophenyl)borate and/or triphenylcarbenium tetra(perfluorophenyl)borate.

60. The process of claim 41 wherein the polymerization takes place in a tubular reactor.

61. The process of claim 41 wherein the tubular reactor has a length-to-diameter ratios of 1:1 to 20:1.

62. The process of claim 41 wherein the polymerization takes place in a tubular reactor having a length-to-diameter ratio of 4:1 to 20:1 and the reactor contains up to six different injection positions.

63. The process of claim 41 wherein the polymerization takes place in a tubular reactor having a length of 100-2000 meters and an internal diameter of less than 10 cm.

64. The process of claim 41 wherein the polymerization takes place in a tubular reactor operated in multiple zones.

65. The process claim 41 wherein the polymerization takes place in an autoclave reactor.

66. The process of claim 41 wherein the polymerization takes place in an autoclave reactor having a length-to-diameter ratios of 1:1 to 20:1.

67. The process of claim 41 wherein the polymerization takes place in an autoclave reactor having a length-to-diameter ratio of 4:1 to 20:1 and the reactor contains up to six different injection positions.

68. The process of claim 41 wherein the polymerization takes place in an autoclave reactor operated in multiple zones.

69. The process of claim 41 wherein the process comprises (a) continuously feeding propylene, catalyst compound, and activator to an autoclave reactor; (b) continuously polymerizing the monomers in the reactor under elevated pressure; (c)

continuously removing the polymer/monomer mixture from the reactor; (d) continuously separating monomer from molten polymer; (e) reducing pressure to form a monomer-rich and a polymer-rich phase; and (f) separating monomer from the polymer.

70. The process of claim 41 wherein the polymerization takes place in a loop reactor.

71. The process of claim 41 wherein the polymerization takes place in a loop reactor having a diameter of 41 to 61 cm and a length of 100 to 200 meters.

72. The process of claim 41 wherein the polymerization takes place in a loop reactor where an in-line pump continuously circulates the polymerization system through the loop reactor.

73. The process of claim 41 wherein the process comprises (a) continuously feeding olefin monomers, catalyst compound, and activator to a loop reactor; (b) continuously polymerizing the monomers in the reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the polymer.

74. The process of claim 41 wherein the residence time is less than 5 minutes.

75. The process of claim 41 wherein the activator comprises one or more of trimethylammonium tetraphenylborate,
trisperiluorophenyl borate,
trisperfluoronaphtyl borate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
trimethylammonium tetrakis-(2,3,4,6-tetrafluorophenylborate,
triethylammonium tetrakis-(2,3,4,6-tetrafluorophenyl)borate,
tripropylammonium tetrakis-(2,3,4,6-tetrafluorophenyl) borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate,
N,N-dimethyl-(2,4,6-trimethylanilinium)tetrakis-(2,3,4,6-tetrafluorophenyl)borate,
di-(i-propyl)ammonium tetrakis(pentafluorophenyl)borate,
dicyclohexylammonium tetrakis(pentafluorophenyl)borate,
triphenylphosphonium tetrakis(pentafluorophenyl)borate,
tri(o-tolyl)phosphonium tetrakis(pentafluorophenyl)borate, and
tri(2,6-dimethylphenyl)phosphonium tetrakis(pentafluorophenyl)borate.

76. The process of claim 75 where the pressure of the polymerization system is between 15 and 100 MPa and the temperature is between 140 and 190° C.

77. The process of claim 76 where the pressure of the polymerization system is between 15 and 60 MPa.

78. The process of claim 41 wherein the temperature is 105 to 150° C.

79. The process of claim 41 wherein the temperature is 105 to 140° C.

80. A process to polymerize olefins comprising contacting, in a polymerization system, propylene monomers with:

1) a metallocene catalyst compound,
2) an activator,
3) optionally comonomer, and
4) from 0 to 25 wt % of diluent or solvent in the polymerization system, at a temperature above the cloud point temperature of the polymerization system and a pressure above the cloud point pressure of the polymerization system and between 15 and 200 MPa, where the polymerization system comprises the monomers, any comonomer present, any diluent or solvent present, and the polymer product, and where the propylene monomers are present in the polymerization system at 40 weight % or more, where the polymer produced has a melting point of 70 to 165° C., the polymer comprises less than 10 weight % of ethylene and the polymer has an Mw of 10,000 to 1,000,000, wherein the activator is an alumoxane or a modified alumoxane and the catalyst compound-to-activator molar ratio is from 1:500 to 2:1.

81. The process of claim 18 wherein the polymer produced is a propylene homopolymer.

82. The process of claim 41 wherein the polymer produced is a propylene homopolymer.

83. The process of claim 18 wherein solvent and or diluent is present in the polymerization system at 0 to 10 wt %.

84. The process of claim 18 wherein the propylene is present in the polymerization system at 55 wt % or more.

85. The process of claim 18 wherein the propylene is present in the polymerization system at 75 wt % or more.

86. The process of claim 18 wherein comonomer is present at 1 to 45 mole %.

* * * * *